United States Patent
Kovács et al.

(10) Patent No.: US 11,763,143 B2
(45) Date of Patent: Sep. 19, 2023

(54) ADDING DEEP LEARNING BASED AI CONTROL

(71) Applicant: AIBrain Corporation, Seoul (KR)

(72) Inventors: Dániel László Kovács, Seoul (KR); Jinhwal Lee, Seongnam (KR); Taejun Kang, Seoul (KR); Sichang Yang, Bucheon (KR); Hankyul Kim, Seoul (KR); Hong Shik Shinn, Seoul (KR)

(73) Assignee: AIBrain Corporation

( * ) Notice: Subject to any disclaimer, the term of this patent is extended or adjusted under 35 U.S.C. 154(b) by 1202 days.

(21) Appl. No.: 16/212,161

(22) Filed: Dec. 6, 2018

(65) Prior Publication Data

US 2019/0197402 A1 Jun. 27, 2019

Related U.S. Application Data

(63) Continuation-in-part of application No. 15/956,396, filed on Apr. 18, 2018, and a continuation-in-part of
(Continued)

(51) Int. Cl.
| | |
|---|---|
| *G06N 3/08* | (2023.01) |
| *G06N 3/04* | (2023.01) |
| *A63F 13/60* | (2014.01) |
| *G06N 3/10* | (2006.01) |
| *G06N 3/006* | (2023.01) |
| *G06N 3/045* | (2023.01) |

(52) U.S. Cl.
CPC .............. *G06N 3/08* (2013.01); *A63F 13/60* (2014.09); *G06N 3/006* (2013.01); *G06N 3/04* (2013.01); *G06N 3/045* (2023.01); *G06N 3/105* (2013.01)

(58) Field of Classification Search
CPC .............. G06N 3/08; G06N 3/04; A63F 13/60
See application file for complete search history.

(56) References Cited

U.S. PATENT DOCUMENTS

| | | |
|---|---|---|
| 7,039,654 B1 | 5/2006 | Eder |
| 8,200,594 B1 | 6/2012 | Bleiweiss |
| (Continued) | | |

FOREIGN PATENT DOCUMENTS

| | | |
|---|---|---|
| WO | 2016100973 A1 | 6/2016 |
| WO | 2017159614 | 9/2017 |

OTHER PUBLICATIONS

Kim, Been. Interactive and interpretable machine learning models for human machine collaboration. Diss. Massachusetts Institute of Technology, 2015. (Year: 2015).*
(Continued)

*Primary Examiner* — Markus A. Vasquez
(74) *Attorney, Agent, or Firm* — Van Pelt, Yi & James LLP

(57) ABSTRACT

An encoded artificial intelligence (AI) behavior specification is received. A data generation configuration specification is received. And a deep neural network configuration specification is received. A training data set based on the data generation configuration specification is generated. An AI behavior deep neural network that conforms to the deep neural network configuration specification is trained using at least a subset of the generated training data. The trained AI behavior deep neural network is provided from a remote AI add-in service to a development environment.

20 Claims, 26 Drawing Sheets

Related U.S. Application Data application No. 15/956,636, filed on Apr. 18, 2018, now abandoned.

(60) Provisional application No. 62/596,496, filed on Dec. 8, 2017, provisional application No. 62/487,404, filed on Apr. 19, 2017, provisional application No. 62/487,418, filed on Apr. 19, 2017.

(56) References Cited

U.S. PATENT DOCUMENTS

| | | |
|---|---|---|
| 8,257,173 B2 | 9/2012 | Bergelt |
| 9,022,868 B2 | 5/2015 | Borst |
| 9,318,108 B2 | 4/2016 | Gruber |
| 9,443,192 B1 | 9/2016 | Cosic |
| 9,443,352 B1 | 9/2016 | Glover |
| 10,607,134 B1 | 3/2020 | Cosic |
| 2005/0245303 A1 | 11/2005 | Graepel |
| 2007/0260567 A1 | 11/2007 | Funge |
| 2009/0063373 A1 | 3/2009 | Howard |
| 2009/0079734 A1 | 3/2009 | McDaniel |
| 2009/0204563 A1 | 8/2009 | Gerber |
| 2009/0216691 A1 | 8/2009 | Borzestowski |
| 2011/0016004 A1 | 1/2011 | Loyall |
| 2011/0270794 A1 | 11/2011 | Drory |
| 2012/0221504 A1 | 8/2012 | Rosini |
| 2012/0259891 A1 | 10/2012 | Edoja |
| 2012/0260263 A1 | 10/2012 | Edoja |
| 2014/0349269 A1* | 11/2014 | Canoy ............... G06N 20/00 434/322 |
| 2015/0126286 A1 | 5/2015 | Guo |
| 2015/0324685 A1 | 11/2015 | Bohn et al. |
| 2016/0221903 A1 | 8/2016 | Van Der Heide |
| 2016/0332081 A1* | 11/2016 | Marr ............... A63F 13/63 |
| 2017/0041183 A1 | 2/2017 | Hadad Segev |
| 2017/0078448 A1 | 3/2017 | Overman |
| 2017/0124487 A1 | 5/2017 | Szeto et al. |
| 2017/0136362 A1* | 5/2017 | Bucher ............... A63F 13/798 |
| 2017/0330077 A1 | 11/2017 | Williams |
| 2017/0372227 A1 | 12/2017 | Hosabettu |
| 2018/0032863 A1 | 2/2018 | Graepel |
| 2018/0032864 A1 | 2/2018 | Graepel |
| 2018/0165596 A1 | 6/2018 | Abrams |
| 2018/0218267 A1 | 8/2018 | Halim |
| 2018/0349757 A1* | 12/2018 | Ando ............... G06K 9/6257 |
| 2019/0184286 A1* | 6/2019 | Du ............... A63F 13/67 |
| 2019/0302310 A1 | 10/2019 | Fox |

OTHER PUBLICATIONS

Wikipedia. "Training, validation, and test data sets" article from Feb. 27, 2017. https://en.wikipedia.org/w/index.php?title=Training,_validation,_and_test_data_sets&oldid=767721274. Accessed Aug. 9, 2022. (Year: 2017).*

Kashihara, Koji. "Deep Q learning for traffic simulation in autonomous driving at a highway junction." 2017 IEEE International Conference on Systems, Man, and Cybernetics (SMC). IEEE, 2017. (Year: 2017).*

AI Brain, I NC. various product pages available to the public Mar. 2016. retrieved via Internet Archive from [http://aibrain.com] on [May 28, 2021]. 19 pages. (Year: 2016).

Artificial Conversation Entity entry at chatbots.org, publicly available on Aug. 30, 2011; retrieved via Internet Archive from [http://www.chatbots.org/artificial_conversational_entity/] on [Jun. 3, 2021]. 3 pages (Year: 2011).

Barth Eye et al. A PDDL-based planning architecture to support arcade game playing. F. Dignum et al. (Eds.): Agents for Games and Simulations, LNAI 5920, pp. 170-189, 2009. Springer-Verlag Berlin Heidelberg. (Year: 2009).

Becker et al. Artificial Intelligence Planning with STRIPS, A Gentle Introduction. A blog entry posted Nov. 6, 2015. Retrieved from [http://www.primaryobjects.com] on [Jun. 3, 2021]. 20 pages. (Year: 2015).

Jason Brownlee. "What is Machine Learning" retrieved from [https://machinelearningmastery.com]. Posted Nov. 17, 2013. Retrieved [Jun. 3, 2021]. 7 pages (Year: 2013).

Jonathan Tremplay. Improving Behaviour and Decision Making for Companions in Modern Digital Games. The Doctoral Consortium at All DE 2013 (WS-13-23) Association for the Advancement of Artificial Intelligence (www.aaai.org). pp. 33-36 (Year: 2013).

Maddison et al. Move Evaluation in Go using Deep Convolutional Neural Networks. arXiv: 1412.6564v2 [cs.LG] Apr. 10, 2015. Published as a conference paper at ICLR 2015. 8 pages (Year: 2015).

Osborn et al. Automated Game Design Learning IEEE Conference on Computational Intelligence and Games 2017. 978-1-5386-3233-8/17. pp. 240-247 (Year: 2017).

Wilks et al. Demonstration of a prototype for a Conversational Companion for reminiscing about images. Proceedings of the ACL 2010 System Demonstrations, pp. 72-77, Uppsala, Sweden, Jul. 13, 2010. pp. 72-77. (Year: 2010).

Guo et al. "Deep Learning for Real-Time Atari Game Play Using Offline Monte-Carlo Tree search planning." Part of Advances in Neural Information Processing Systems 27 (NIPS 2014). 9 pages. (Year: 2014).

Jordan Ecarma, "5 Must-See Robots from International CES." News article posted at Auto World News on Jan. 9, 2015. Retrieved from [https://www.autoworldnews.com/articles/5753/20140109/5-must-see-robots-from-ces.htm] on [Oct. 25, 2021]. 2 pages. (Year: 2015).

Samuel Gibbs. "This robot will clean your barbecue, and other bizarre robotics at CES." News article posted at The Guardian on Jan. 9, 2014. Retrieved from [www.theguardian.com/technology/2014/jan/09/bizarre-robotics-ces-2014] on [Oct. 25, 2021].14 pages. (Year: 2014).

Tyche, "The True AI Companion for Kids. Kickstarter campaign." Retrieved from [https://www.kickstarter.com/projects/407592806] on [Oct. 25, 2021]. 28 pages. (Year: 2021).

Tyche, "The True AI Companion for Kids. Kickstarter update" dated Feb. 2, 2016. Retrieved via Internet Archive from [https://www.kickstarter.com/projects/407592806] on [Oct. 25, 2021]. 10 pages. (Year 2016).

Tyche, "The True AI Companion for Kids." http://tyche.club/. Web page published Mar. 1, 2016. Retrieved via Internet Archive on [Oct. 25, 2021]. 3 pages (Year: 2016).

Zhao et al. "Deep Reinforcement Learning with Experience Replay Based on SARSA." 978-1-5090-4240-1/16 © 2016 IEEE. Retrieved via IEE Explore on [Jul. 1, 2021]. 6 pages. (Year: 2016).

Guez et al., "Learning to Search with MCTSnets", Feb. 13, 2018.

Horgan et al., "Distributed Prioritized Experience Replay", Mar. 2, 2018.

Mankowitz et al., "Unicom: Continual Learning with a Universal, Off-policy Agent", Feb. 22, 2018.

Le et al. "Using Synthetic Data to Train Neural Networks is Model-Based Reasoning." In: Cornell University Library, Computer Science, Machine Learning, Mar. 2, 2017., [online] [retrieved on Feb. 12, 2019 (Feb. 2, 2019)] Retrieved from the Internet <URL: https://arxiv.org/abs/1703.00868>, entire document, especially Abstract; p. 2-6.

Garrett et al. "Learning to rank for synthesizing planning heuristics." arXiv preprint arXiv: 1608.01302 (2016). (Year: 2016).

Tapia Garcia et al. "A PDDL-based simulation system." (2015): 81-88. (Year: 2015).

Booth et al. "Mixed-integer and constraint programming techniques for mobile robot task planning." IEEE Robotics and Automation Letters 1.1 (2016): 500-507. (Year: 2016).

* cited by examiner

ADDING DEEP LEARNING BASED AI CONTROL

CROSS REFERENCE TO OTHER APPLICATIONS

This application claims priority to U.S. Provisional Patent Application No. 62/596,496 entitled ADDING GENERAL DEEP LEARNING BASED AI CONTROL OF IN-GAME CHARACTERS filed Dec. 8, 2017 which is incorporated herein by reference for all purposes.

This application is a continuation in part of co-pending U.S. patent application Ser. No. 15/956,636, entitled SCALABLE FRAMEWORK FOR AUTONOMOUS ARTIFICIAL INTELLIGENCE CHARACTERS filed Apr. 18, 2018, which is incorporated herein by reference for all purposes, which claims priority to U.S. Provisional Patent Application No. 62/487,418, entitled BUILDING A SCALABLE TRUE AI GAME WITH FULLY AUTONOMOUS AI CHARACTERS filed Apr. 19, 2017, which is incorporated herein by reference for all purposes, and claims priority to U.S. Provisional Patent Application No. 62/487,404, entitled BUILDING A DOMAIN-INDEPENDENT AND SCALABLE AUTOMATED PLANNING SYSTEM USING DEEP NEURAL NETWORKS filed Apr. 19, 2017, which is incorporated herein by reference for all purposes.

This application is a continuation in part of co-pending U.S. patent application Ser. No. 15/956,396 entitled DOMAIN-INDEPENDENT AND SCALABLE AUTOMATED PLANNING SYSTEM USING DEEP NEURAL NETWORKS filed Apr. 18, 2018, which is incorporated herein by reference for all purposes, which claims priority to U.S. Provisional Patent Application No. 62/487,404, entitled BUILDING A DOMAIN-INDEPENDENT AND SCALABLE AUTOMATED PLANNING SYSTEM USING DEEP NEURAL NETWORKS filed Apr. 19, 2017, which is incorporated herein by reference for all purposes.

BACKGROUND OF THE INVENTION

Many computer-based games use non-playing characters (NPCs) to simulate a dynamic environment. Typically, this is implemented using a decision tree and/or state machine. For example, NPCs and game events are often scripted to cycle between one of several states and are therefore limited in their range of variations. Moreover, multiple NPCs may share the same game logic and as a result will often appear to game players as duplicates of one another. In the case where there are multiple different NPCs, the different NPCs often have only superficial differences between one another and/or are one of a limited number of different variations of game logic. Implementing an NPC that acts independent from other NPCs using traditional artificial intelligence techniques is both processor and memory intensive. Therefore, there exists a need for a framework to support autonomous NPCs that utilizes both artificial intelligence (AI) and is scalable. Unlike traditional non-autonomous NPCs, autonomous AI agent characters may move and act independently from one another. Moreover, autonomous AI agent characters may be incorporated into a computer-based game such that their actions both respond to and also affect the game environment.

The inclusion of in-game characters controlled by deep learning based AI typically requires a game developer to have in-depth AI and deep learning expertise. The configuration of AI models for modeling AI behaviors is burdensome. Training a configured AI model requires a large training data set compatible with the configured model specification and corresponding hardware resources to perform the training. Typically new games have little to no training data since new games usually introduce new AI behaviors and new in-game characters. Therefore there exists a need for an AI tool to integrate autonomous AI agents into a game using a game development environment familiar for game developers and that does not require in-depth AI and deep learning expertise.

BRIEF DESCRIPTION OF THE DRAWINGS

Various embodiments of the invention are disclosed in the following detailed description and the accompanying drawings.

DETAILED DESCRIPTION

Figure 1:
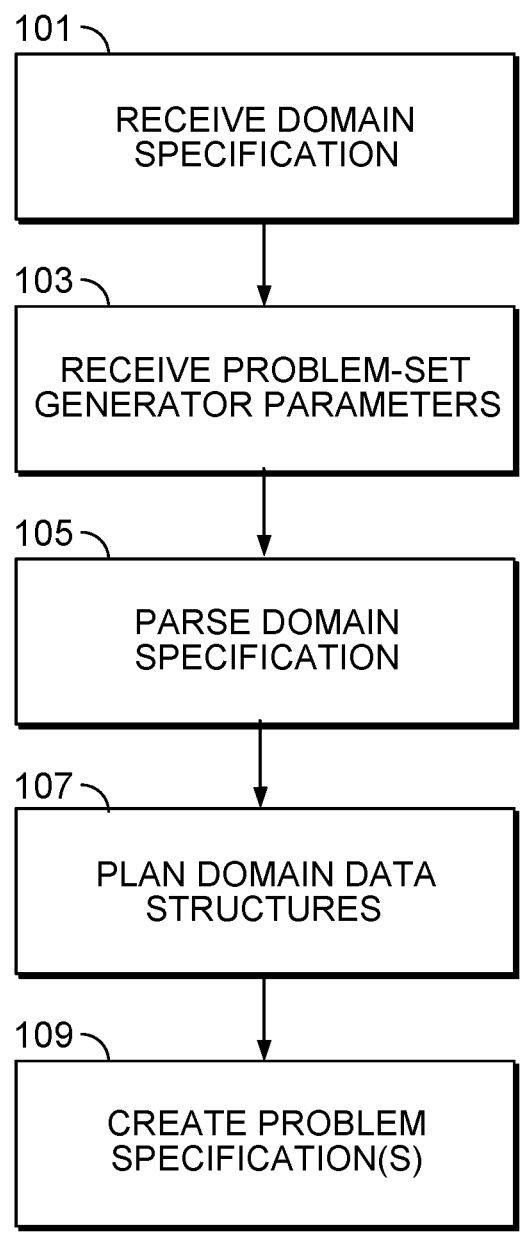
FIG. 1 is a flow diagram illustrating an embodiment of a process for creating a domain-independent automated planning system using neural networks.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for adding deep learning based artificial intelligence (AI) control is disclosed. Using the disclosed system and techniques, non-player characters (NPCs) in a game can be controlled by a trained deep neural network (DNN) to perform realistic behaviors. The ability to add AI-based control using the disclosed techniques improves the game experience without requiring AI experts. In some embodiments, the techniques are used to implement an AI tool that integrates into a game development environment. Game developers (including programmers and designers) accustomed to using game development environments do not need in-depth AI and deep learning experience to incorporate sophisticated AI behaviors. Using the AI tool, the game scenes of a game can be enhanced to add AI-controlled behavior. A DNN is trained on the AI behavior (e.g., using generated training data) and the trained DNN is used to control NPCs. In some embodiments, the AI behavior is encoded and compiled into a format understood by a deep learning training tool. For example, deep learning training tool running on AI servers generates training data and outputs a trained DNN based on a specified AI behavior. The trained DNN can then be incorporated into the game to control one or more in-game characters. The AI behavior modeled by the DNN is used to infer AI actions that are mapped to game actions. In some embodiments, an application programming interface (API) is used for interfacing with the trained DNN and/or AI control logic. Using the API and trained DNN, a game developer can easily add AI-based behaviors and their resulting AI actions to NPCs. For example, a sentry NPC can patrol a building and chase a detected intruder based on the output of a DNN trained to model a behavior that includes patrolling and chasing actions. Examples of game development environments that can support the disclosed system include, but are not limited to, Unity3D, Epic's Unreal Engine, CryTek's CryENGINE, Amazon's Lumberyard, Valve's Source Engine, and EA's Frostbite. The developed game that includes deep learning based AI control can be monetized by the game developer and enjoyed by the players (e.g., customers).

In some embodiments, an AI tool is installed in a game development environment (GDE) used to develop a game such as a computer or console game. The AI tool provides additional menus in the GDE through which functionality provided by the AI tool can be accessed by the game developer. A game developer extends a game composed of one or more game scenes by converting one or more game scenes to AI scenes using the AI tool. Extending a game scene into an AI scene may include setting up an AI scene and defining AI behaviors for the agents, such as non-player characters (NPCs), of the AI scene. In various embodiments, the agents are game objects of the game scene. Setting up an AI scene may include classifying game objects in the scene using the AI tool. In some embodiments, game objects may be defined as agents (AI-controlled) or non-agents (non-AI controlled). For example, some game objects, such as sentry guards, may be classified as AI-controlled agents while other game objects, such a glass door, may not be AI controlled but their properties may influence the AI behavior of an AI-controlled agent. Both agent and non-agents are classified in order for the AI logic and AI tool to interface and interact with them. For example, an AI-controlled sentry agent may vary its AI actions according to an AI behavior when a glass door non-agent is broken and makes a shattering sound. Classifying objects may include specifying properties of the AI objects for the AI logic of the game scene using the AI tool. A game environment may also be created for the AI logic and AI tool to access environmental properties of the game. A game developer can then define the AI behaviors that can be used by the AI agents of the AI scene. An AI behavior is specified and encoded. In some embodiments, the AI behavior specification is compiled. The encoded and/or compiled AI behavior is trained, resulting in a deep neural network (DNN) that implements and realizes the AI behavior. For example, based on different input properties, the DNN can be used to infer an appropriate action result. A DNN can be trained and used to infer AI actions based on the specified AI behavior for an NPC such as a sentry guard. The guard's AI actions may include patrolling an area and chasing any detected intruders. An input property may include whether an intruder is detected and the likely location of the detected intruder. AI actions such as chasing may depend on the NPC's internal memory. For example, each sentry can implement the same AI behavior but each sentry can perform different actions based on its unique context, which may be stored in its own personal memory store. A first sentry may continue patrolling while a second sentry may chase an intruder that the second sentry detects. The sentry chasing an intruder may use a personal memory to store the expected location of the intruder. Since the patrolling sentry has a personal memory separate of the chasing sentry, the patrolling sentry does not know the location of the intruder. In some embodiments, the NPCs can communicate with one another. The chasing sentry can update the patrolling sentry with the location of a detected intruder. Based on the trained DNN, the patrolling sentry may then pursue the intruder using an expected intruder location provided by the other sentry. In some embodiments, a game developer uses an AI application programming interface (API) of the AI tool to interface with the trained DNN. The API may be used to convert inference results such as AI actions into game actions. In some embodiments, the AI behavior is configured in two steps. In the first step, the AI behavior model is configured. In the second step, the training of the AI behavior model is configured. By providing a visual editor or wizard and a simple-to-use API, game developers with little or no AI experience can leverage useful, deep learning based AI behaviors in their games. In some embodiments, the AI tool also provides a subscription mechanism to directly facilitate the monetization of the AI tool and the underlying AI technology.

In various embodiments, the AI tool is integrated into a development environment such as an application or software development environment. For example, the AI tool may be integrated into a development environment for building simulation software. In some embodiments, the AI tool, AI control, and AI application programming interface (API) may be used for managing inventory, simulating traffic, or other appropriate applications. The disclosed AI control techniques are applicable to many different applications in addition to computer games. In some embodiments, an AI tool is integrated into a development environment as an add-on and provides an AI add-on service for solving AI planning problems.

In some embodiments, an AI server receives an encoded artificial intelligence (AI) behavior specification. For example, an AI server receives an encoded AI behavior specification associated with one or more AI agents and game objects configured using an AI tool of a game development environment (GDE). The AI server also receives a data generation configuration specification and a deep neural network (DNN) configuration specification. The AI server generates a training data set based on the data generation configuration specification. For example, in some embodiments, the generated training data is divided into training, validation, and test data. A DNN is created that conforms to the DNN configuration specification and the DNN is trained using at least of subset of the generated training data. The trained AI behavior DNN is then provided from a remote AI add-in service to a development environment. For example, the AI tool of the GDE downloads the trained DNN from an AI service for integrating into a game environment for controlling in-game characters.

A scalable framework for autonomous artificial intelligence (AI) characters is disclosed. For example, multiple autonomous AI agent computer characters, including non-player characters (NPCs), may be implemented in a game using the disclosed AI framework. In some embodiments, the autonomous AI NPCs operate consistent to a belief, desire, and intent model. An autonomous AI character receives sensor inputs. For example, the autonomous AI character detects movement, voices, and obstacles in the game environment. Based on the sensory input, the character updates its set of beliefs. For example, an autonomous AI character constructs a set of beliefs that are based on facts, including observed facts from its sensors, that correspond to its understanding of the game world. Facts may include its position and positions of other NPCs, objects, obstacles, etc. in the game world. Its beliefs may also include it's understanding of the beliefs of other NPCs. In addition to a set of beliefs, the autonomous AI character identifies one or more goals. Goals may include game objectives such as traveling from one location to another, speaking with the game player to inform her or him of relevant information, refueling a vehicle to increase its potential range, etc. Using a machine learning model, the autonomous AI character's actions are automatically determined by solving an AI planning problem constructed from the character's beliefs and desires. For example, an AI planning problem is constructed using a domain and problem description corresponding to the NPC's beliefs and desires. The solution is solved by applying a trained machine learning model such as one utilizing a deep convolutional neural network (DCNN). In various embodiments, the actions of the solved solution correspond to the character's intent. Unlike traditional NPCs, autonomous AI characters can each construct and process their own belief, desire, and intent model to act independently of one another with a variety of non-scripted responses. By utilizing a machine learning to determine the next action, the autonomous AI character framework is scalable and a large number of autonomous AI NPCs can exist simultaneously in the same game environment without exceeding resource limitations of the game hardware.

In some embodiments, a scalable framework for autonomous artificial intelligence (AI) characters provides independent intelligence for each character and can create plans for each of the characters to move and act intelligently. Each character refers to its respective surrounding environment to infer a proper plan for the current situation. In various embodiments, at least several elements are considered when determining the next action. When a character performs an action, the action affects and changes the game environment and the beliefs of the character. In various embodiments, a player can achieve the goal of the game by upgrading its quotient, which in some embodiments, is the ultimate goal of the game. Even when a character moves to another position, the AI framework processes the revised situation and may be utilized to calculate time, the current status of the character, external environment conditions, and so on. These various input data, among others, are used for creating new AI problem. The solution plan for the AI problem is used to implement the next action of the character. In some embodiments, the scalable framework for autonomous AI characters is utilized in the Futurable life simulation game.

In some embodiments, a computer-based game built using a scalable framework for autonomous artificial intelligence (AI) characters has many benefits. Such a game allows the artificial intelligence to be at the center of the game play. All objects in the environment that have a visual and/or auditory feature can be translated semantically by each autonomous AI non-player character (NPC) and can be used by an NPC to understand its environment. By incorporating AI into the game play, the game play includes novel, dynamic, and non-scripted play. Game play that is less predictable is more exciting and highly re-playable. Since NPCs are autonomous and their actions are driven by an AI system, they do not need to be constrained to a fixed set of behaviors and can instead evolve in time with the game environment. Autonomous AI characters are able to perceive natural language speech input, visual input, or any other sensory input including interactions with other NPCs. In some embodiments, speech input is processed using natural language processing so players can interact with AI characters using natural languages. Each autonomous AI character can process perceived input and store it in an individual memory. The characters can then individually perform deep reasoning to determine what action to perform next. In some embodiments, each NPC has a personal agent memory for historical and learned knowledge.

In some embodiments, a scalable artificial intelligence (AI) framework is achieved by using a machine learning model. For example, a machine learning model is used to determine the actions of each autonomous AI character based on the individual character's input, beliefs, and/or goals. In some embodiments, each character has a set of beliefs and desires. For example, a character may have a set of beliefs that make up the facts the character believes are true for its view of the game world. Each character may also have a set of desires that make up its goals or objectives. As a character senses the world, it processes the sensory input and uses it for problem discovery. For example, an AI problem is constructed based on the character's life goals and beliefs as informed by its sensory inputs. In this manner, an autonomous AI character incrementally learns about the world model. Its responses are then based on solving an AI planning problem using the current game environment. The actions performed are dynamic behavior and based in time with an unpredictable, changing game environment.

In some embodiments, one or more sensory inputs of an autonomous artificial intelligence (AI) computer character are received. For example, an autonomous AI non-player character (NPC) receives visual and audio input such as detecting movement of other objects in the game environment and/or recognizing voice input from other users. Using a computer processor, one or more beliefs of the autonomous AI computer character are determined. For example, the autonomous AI NPC determines a set of beliefs such as the NPC's belief regarding a detected object. Additional beliefs may correspond to beliefs about itself, other game players, other NPCs, and/or obstacles in the game environment. One or more goals of the autonomous AI computer character are identified. For example, the autonomous AI NPC determines a set of goals such as advancing from the NPC's current location to a goal location and retrieving an object once the NPC arrives at the goal destination. Using a machine learning model, an action of the autonomous AI computer character is automatically determined based at least in part on the one or more sensory inputs, the one or more beliefs, and the one or more goals of the autonomous AI computer character. For example, using a machine learning model such as a deep convolutional neural network (DCNN), a solution, such as moving forward a certain distance, is determined based on the sensory inputs, the beliefs, and the goals of the autonomous AI NPC. In various embodiments, the solution may include multiple actions such as movement and speaking actions. In various embodiments, the scalable framework for autonomous AI characters utilizes a domain-independent and scalable automated planning system using deep neural networks.

A domain-independent and scalable automated planning system using deep neural networks is disclosed. For example, an automated planning system is built by training a machine learning model, such as a deep neural network, using an automated planning system. An initial problem domain is first specified using a domain planning language. The domain specification is then parsed and using problem-set generator parameters, one or more problem sets corresponding to the domain are generated. Domain-specific features are extracted using the domain specification, generated problem sets, and extraction parameters to create training input vectors for a machine learning model. The domain specification and generated problem sets are solved using an automated planner. The first action from each solution plan is extracted and encoded to create output vectors that correspond to the input vectors. The input and output vectors are used as data sets to train, test, and validate the machine learning model. In some embodiments, a deep neural network (DNN) is utilized by encoding the input vector as a pixel-based image. In some embodiments, the DNN is a convolutional DNN (CDNN). Once trained, the machine learning model can be applied to artificial intelligence planning problems described by a domain and problem specification. Features of a problem are extracted using a domain specification, a problem specification, and extraction parameters, and provided as input to the trained machine learning model. The output result from the trained model is decoded to a domain-specific action and applied as the next action.

In various embodiments, a specification of a problem specified using an artificial intelligence (AI) planning language is received. For example, a problem specification using a Planning Domain Definition Language (PDDL) or Multi-Agent PDDL (MA-PDDL) specification can be received that describes an artificial intelligence (AI) planning problem. Using a computer processor, machine learning features are determined using the specification of the problem specified using the artificial intelligence planning language. For example, machine learning features are extracted based on a PDDL or MA-PDDL problem description. Using the determined machine learning features and a trained machine learning model, a machine learning model result is determined, wherein the machine learning model is trained to approximate an automated planner. For example, a machine learning model using a deep neural network (DNN) such as a convolutional DNN (CDNN) is created and trained using results from an automated AI planner. Results from applying the trained machine learning model approximate the results of the automated AI planner. Based on the machine learning model result, an action to perform is determined. For example, the machine learning result is translated to an action or policy that is performed. In various embodiments, the action or policy moves the state of the AI problem closer to the intended goal from an initial state.

Using the disclosed invention, a domain-independent, lightweight, scalable, deep neural network (DNN) based automated artificial intelligence (AI) planning solution can be provided for multiple application domains. The solution can be utilized to enhance the intelligence of an application, such as the intelligence of non-player characters (NPCs) in a game. In various embodiments, DNNs are utilized for domain-independent, automated AI planning. In various scenarios, automated, domain-independent, DNN-based AI planning allows for increased performance and requires reduced resources compared to traditional automated planning techniques. For example, using the disclosure automated AI planner solution, large numbers of DNN-based AI planners can run locally and simultaneously. For example, thousands of DNN-based AI planners can run simultaneously on resource (CPU, memory, etc.) limited devices. In some embodiments, the disclosed invention is implemented to run on mobile devices such as smartphones.

In various embodiments, enabling resource-limited devices, such as smartphones, with lightweight Artificial Intelligence (AI) planning capabilities, boosts the intelligence of the software (including the operating system and/or applications) running on the devices. In some embodiments, having a large number of fully autonomous AI planners can provide increased distributed computation such as a more realistic and more detailed city simulation.

In some embodiments, the disclosed invention provides an automated planning implementation that is scalable and application domain-independent by using deep neural networks (DNNs) including convolutional DNNs (CDNNs). In various embodiments, domain independence is achieved by utilizing an AI problem specification such as the Multi-Agent (MA) extension of the Planning Domain Definition Language (PDDL) specification to describe AI problems in a domain-independent fashion. In various embodiments, a domain-independent automated planner is applicable to more than one domain. For example, the planner may be applied to the game of Chess, Go, as well as additional domains including production-line scheduling for different forms of manufacturing. In contrast, the usefulness of automated planners that are limited to a single domain is severely restricted. Using a domain-independent approach, the disclosed invention may be applied to a wide variety of domains and is useful for a variety of applications including robot control, chatbots, and computer games, among others.

FIG. 1 is a flow diagram illustrating an embodiment of a process for creating a domain-independent automated planning system using neural networks. In the example, one or more problem specifications are created from a provided domain specification and problem generator parameters. The resulting problem specification(s) may be utilized to create an automated AI planning system, as described further with respect to FIG. 3. In various embodiments, the process of FIG. 1 may be performed while offline. For example, the process of FIG. 1 can be performed offline by a server such as a backend server and/or using cloud computing.

At 101, a domain specification is received. In some embodiments, a domain specification is described using a domain specification language (e.g., a version of the Planning Domain Definition Language (PDDL)). In various embodiments, the received domain specification corresponds to a domain model and may include a definition of the domain's requirements, object-type hierarchy, objects, predicates, functions and actions definitions, constraints and preferences, and/or derived predicate definitions, among other information.

At 103, problem-set generator parameters are received. In various embodiments, the problem-set generator parameters correspond to the domain specification received at 101. For example, problem-set generator parameters may include the number of problem specifications to generate, information regarding which portions of the domain specification should be considered, and/or information on how the different portions of the domain specification should be utilized, among other information.

At 105, the domain specification received at 101 is parsed. In some embodiments, the parser utilized is an artificial intelligence (AI) problem description parser. In some embodiments, the parser is a Planning Domain Definition Language (PDDL) parser. In various embodiments, the parser is based on the domain specification language.

At 107, domain data structures are planned. For example, the data structures necessary for creating one or more problem specifications are constructed based on the domain specification. For example, data structures are created that represent different possible actions, domain requirements, hierarchy of object-types, objects, predicates, functions, and/or actions that can have pre-conditions and/or effects (conditional or non-conditional, discrete or continuous, etc.). In some embodiments, the problem specifications correspond to one or more artificial intelligence (AI) problem descriptions. In some embodiments, the data structures are constructed based on a domain model of the domain specification.

At 109, one or more problem specifications are created. In some embodiments, an artificial intelligence (AI) problem specification is created. For example, a problem specification is created using a problem specification language such as a version of the Planning Domain Definition Language (PDDL). In various embodiments, each problem specification is created in accordance to the domain specification received at 101 and to the problem-set parameters received at 103. For example, a problem-set parameter defining the number of problem specifications to create is utilized to determine the number of final problem specifications created. In some embodiments, only a subset of the domain specification is utilized based on the generator parameters. In various embodiments, the final output is a set of AI problem specifications for the received domain specification. In some embodiments, the set of AI problem specifications correspond to a domain model. In some embodiments, each AI problem specification includes a set of objects, the initial state, desired goal(s), metrics, objective functions for metrics constraints, and/or preferences, among other information.

Figure 2:
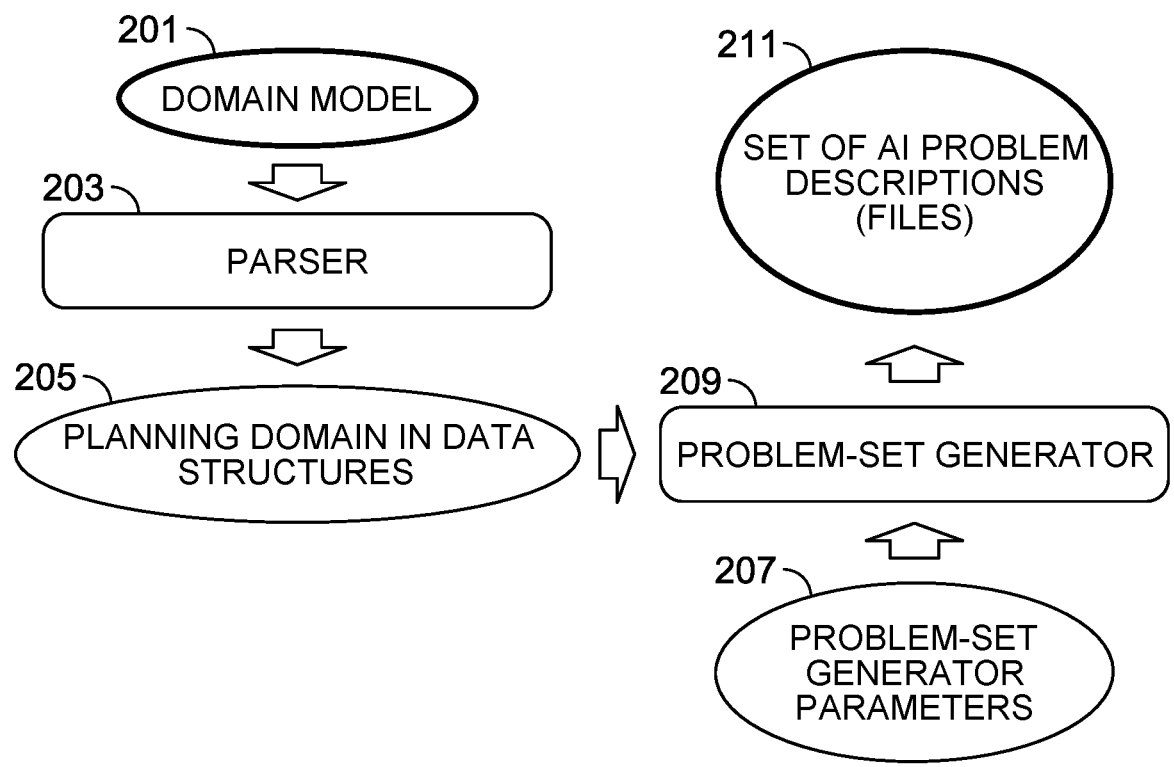
FIG. 2 is a mixed functional and flow diagram illustrating an embodiment of a process for creating a domain-independent automated planning system using neural networks.

FIG. 2 is a mixed functional and flow diagram illustrating an embodiment of a process for creating a domain-independent automated planning system using neural networks. In various embodiments, FIG. 2 is an embodiment for generating a set of artificial intelligence (AI) problems specifications (e.g., Planning Domain Definition Language (PDDL) problems) for a given domain. In some embodiments, the domain can be represented using a PDDL description. At 201, a domain model is provided that describes the problem domain. At 203, a parser is utilized to parse a received domain model. In some embodiments, the domain model is described using a PDDL file such as a DOMAIN.PDDL file. At 205, domain data structures are planned. At 207, problem-set generator parameters are provided that control the generation of problem-sets. At 209, a problem-set generator takes as input the data structures and the problem-set generator parameters. The problem-set generator at 209 generates a set of problem specification files that are a set of problem descriptions corresponding to the problem domain. In some embodiments, the problem specification files are a set of PROBLEM.PDDL files.

In some embodiments, the domain model file at 201 is received at 101 of FIG. 1 and the problem-set generator parameters at 207 are received at 103 of FIG. 1. In some embodiments, the parser of 203 performs the step of 105 of FIG. 1. In some embodiments, the step 205 is performed at 107 of FIG. 1. In some embodiments, the problem-set generator of 209 performs the step of 109 of FIG. 1. In various embodiments, the set of problem specifications of 211 are created at the step of 109 of FIG. 1.

Figure 3:
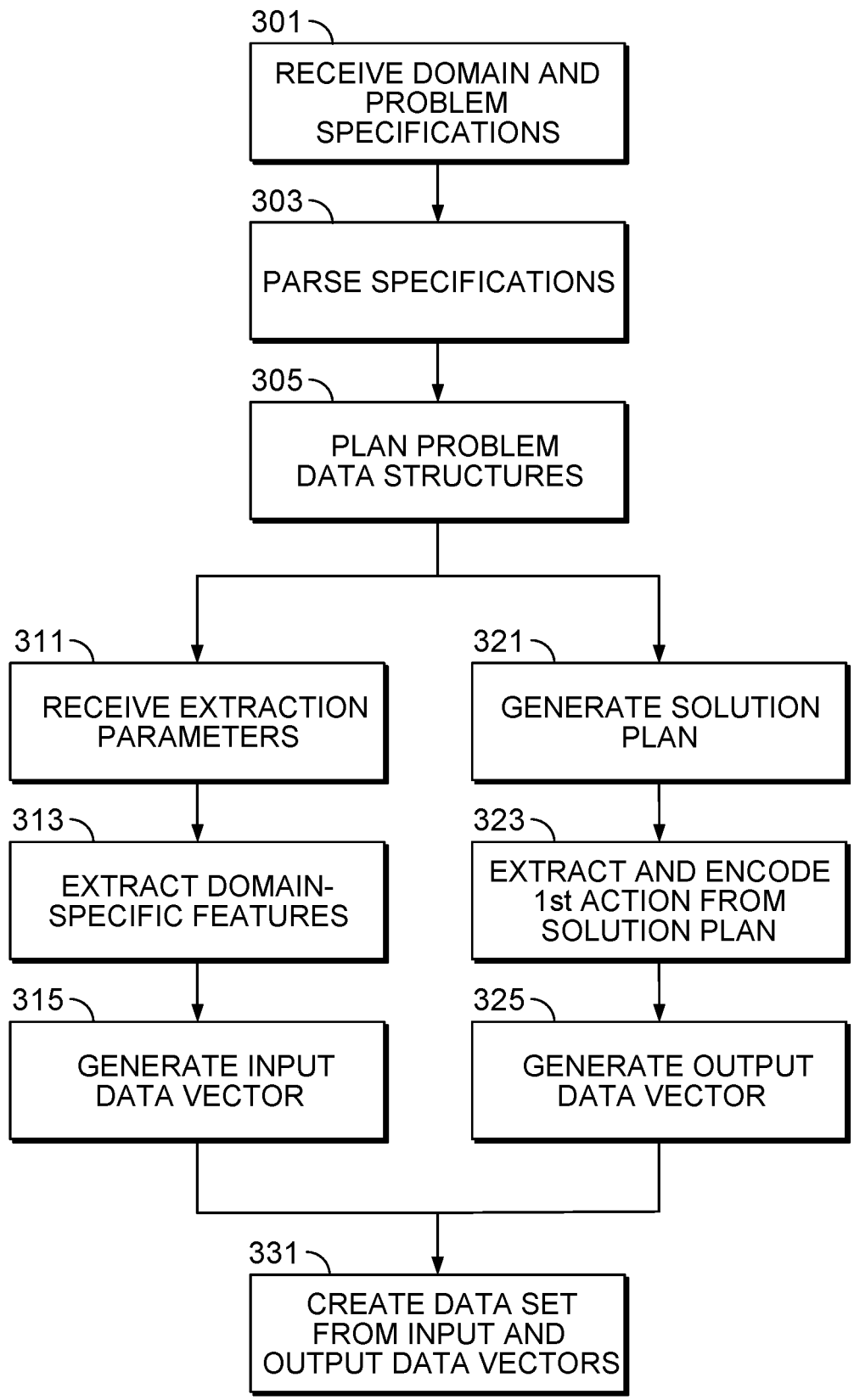
FIG. 3 is a flow diagram illustrating an embodiment of a process for training, testing, and validating data generated for an automated planning system using neural networks.

FIG. 3 is a flow diagram illustrating an embodiment of a process for training, testing, and validating data generated for an automated planning system using neural networks. In the example shown, the process of FIG. 3 utilizes domain and problem specifications to create training data using generated solution plans based on an automated planner. In some embodiments, the training data generated by the process of FIG. 3 utilizes the domain specification received at 101 of FIG. 1 and the problem specifications created at 109 of FIG. 1. In some embodiments, the training data generated by the process of FIG. 3 utilizes the domain specification and generated problem specifications of FIG. 2. In various embodiments, one or more training data points are created using one or more received problem specifications. For example, in various embodiments, the result of the process of FIG. 3 is a training dataset based on each problem specification created at 109 of FIG. 1. In various embodiments, the process of FIG. 3 may be performed while offline.

At 301, domain and problem specifications are received. For example, a domain specification is received and one or more problem specifications associated with the domain are received. In some embodiments, the problem specifications are generated automatically using the domain specification and problem generator parameters. In some embodiments, the specifications are described using a version of the Planning Domain Definition Language (PDDL). In some embodiments, the specifications are Multi-Agent PDDL (MA-PDDL) descriptions that include a domain description and a problem description.

At 303, the specifications received at 301 are parsed. For example, the domain specification received at 301 is parsed and each of the problem specifications received at 301 are parsed. In some embodiments, a parser is used that is capable of parsing Planning Domain Definition Language (PDDL) files. In various embodiments, the specifications are parsed into one or more internal data structures.

At 305, problem data structures are planned. In some embodiments, the planning problem data structures required by the domain and problem specifications are constructed. In some embodiments, the data structures are based on an artificial intelligence (AI) model specified. For example, planning problem data structures are created that represent different possible actions, domain requirements, hierarchy of object-types, objects, predicates, pre-conditions, effects, etc. Processing continues to 311 and 321. In some embodiments, the two different processing paths may be performed in parallel. In some embodiments, the processing is first performed along one path (e.g., steps 311, 313, and 315) and along a second path (e.g., 321, 323, and 325) before converging at step 331. In some embodiments, the order the paths are processed does not matter as long as the two paths converge at step 331.

At 311, extraction parameters are received. For example, extraction parameters are received that correspond to parameters used to extract domain-specific features. In some embodiments, extraction parameters include predicates, functions, additional domain models, problem description elements to include, the number of data-points that should be generated, and/or the resolution and/or structure of inputs, among other information.

At 313, domain-specific features are extracted. In some embodiments, the extraction is performed using a feature extractor. In some embodiments, the feature extractor is an imaginator module. In various embodiments, the feature extractor is specific to the domain and problem specifications received at 301 and extracts features from planning problem data structures. In various embodiments, the feature extractor extracts features based on the parameters provided at 311.

In some embodiments, an imaginator module is a module that takes an artificial intelligence (AI) problem specification (e.g. a Multi-Agent Planning Domain Definition Language (MA-PDDL) description of the domain and problem) as input and translates (e.g., encodes) it into a pixelated image. In various embodiments, an imaginator module generates a set of inputs for deep neural network (DNN) training. In various embodiments, the imaginator module provides the proper inputs for the machine learning model by encoding each AI problem. In various embodiments, the AI problems are continuously updated to reflect the current state of the environment and/or world.

At 315, an input data vector is generated. Using the features extracted at 313, an input vector is generated that will eventually be associated with an output vector. The generated input and associated output vector will be used to train, validate, and test a machine learning model. After generating the input data vector, processing continues to 331.

At 321, a solution plan is generated. In various embodiments, a solution plan is generated for each problem set by utilizing an automated planner. In some embodiments, an off-the-shelf automated planner is utilized. In some embodiments, the planning utilizes a Multi-Agent Planning Domain Definition Language (MA-PDDL) to describe the domain and problem set. In various embodiments, each solution plan is created and stored as a solution plan file. In some embodiments, the solution plan includes action plans.

At 323, the first action from each solution plan generated at 321 is extracted and encoded. In various embodiments, the encoding is based on the machine learning model. For example, in some embodiments, the first action from the solution plan (including a no-op action) is encoded into an output vector by assigning it the number of the neuron that is activated. For example, an activated neuron is assigned a value of 1 and an inactive neuron is assigned a value of 0. In various embodiments, the output vector corresponds to the output layer of a deep neural network (DNN) approximating the automated planner that generated the solution plan(s).

In some embodiments, the output vector is a one-hot vector. In various embodiments, a one-hot vector is a vector with all elements having the value 0 except for a single position that has the value 1. In the previous example, the output vector has values 0 for every element except for the element that corresponds to the designed action (or number). In various embodiments, the number of possible actions determines the length of the vector and the size of the output layer of the machine learning model.

In various embodiments, the output of the deep neural network (DNN) is interpreted. For example, in some embodiments, each output neuron of the DNN can set the probability for selecting the artificial intelligence (AI) action (e.g., a Planning Domain Definition Language (PDDL) action instance) associated to that neuron.

At 325, an output data vector is generated. Using the extracted and encoded first action from 323, an output vector is generated that will be associated with an input vector. The generated output and associated input vector will be used to train, validate, and test a machine learning model. After generating the output data vector, processing continues to 331.

At 331, a data set is created from the input data vector generated at 315 and the output data vector generated at 325. In various embodiments, the data set is a training corpus for training a machine learning model. In some embodiments, the data set is utilized to train, validate, and test the model. In some embodiments, the input vector is encoded as a pixel-based image. For example, a deep neural network (DNN) machine learning model may be utilized by encoding the input vector as an image and using the image as input to the DNN. In some embodiments, the DNN is a convolutional DNN (CDNN).

Figure 4:
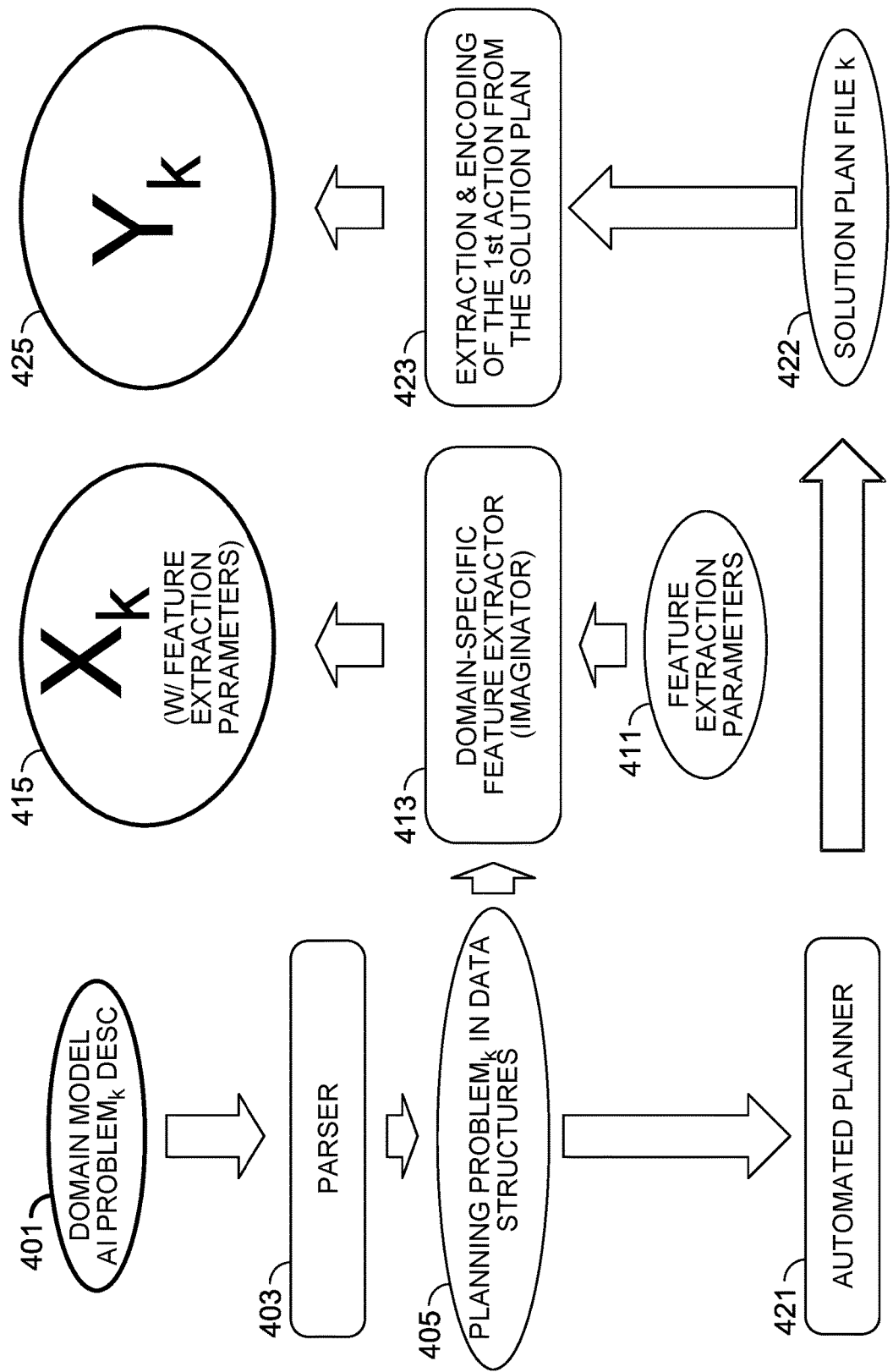
FIG. 4 is a mixed functional and flow diagram illustrating an embodiment of a process for training, testing, and validating data generated for an automated planning system using neural networks.

FIG. 4 is a mixed functional and flow diagram illustrating an embodiment of a process for training, testing, and validating data generated for an automated planning system using neural networks. In various embodiments, FIG. 4 describes a process and components for generating the training, test, and validation data for deep neural network (DNN) training. For example, a set of (Xk, Yk) data-points, where Xk and Yk are both vectors, for every k problem in the problem set, is generated using the process and components of FIG. 4.

At 401, a domain model and k number of artificial intelligence (AI) problem files are provided (e.g., AI problem-k description files). In some embodiments, the files utilize a Multi-Agent (MA) extension of the Planning Domain Definition Language (PDDL) specification for describing a planning problem in a domain-independent manner. At 403, a parser is utilized to parse the received domain model and AI problem-k descriptions. At 405, problem data structures are planned for each of the k problems corresponding to the problem descriptions. At 411, feature extraction parameters are provided. At 413, a domain-specific feature extractor is utilized to extract features from the k planning problem data structures. In some embodiments, the domain-specific feature extractor is an imaginator module. In some embodiments, an imaginator module is used to generate X-k inputs for deep neural network (DNN) training. At 415, a set of X-k data points is generated using the feature extraction parameters at 411 and the domain-specific feature extractor of 413. At 421, an automated planner is utilized to generate a solution to each of the domain and problem specifications. At 422, a solution plan file is generated for each problem file. In some embodiments, k solution plans are generated. At 423, the first action from each solution plan is extracted and encoded. At 425, a set of Y-k data points is generated from the extracted and encoded first actions of each solution file.

In some embodiments, the files provided at 401 are received at 301 of FIG. 3 and the feature extraction parameters provided at 411 are received at 311 of FIG. 3. In some embodiments, the parser of 403 performs the step of 303 of FIG. 3. In some embodiments, the step 405 is performed at 305 of FIG. 3. In some embodiments, the domain-specific feature extractor of 413 performs the step of 313 of FIG. 3. In some embodiments, the set of X-k data points generated at 415 is generated at 315 of FIG. 3. In some embodiments, the automated planner of 421 performs the step of 321 of FIG. 3 and the generated solution plan files of 422 are generated at step 321 of FIG. 3. In some embodiments, the step of 423 is performed at 323 of FIG. 3. In some embodiments, the set of Y-k data points generated at 425 is generated at 325 of FIG. 3. In some embodiments, each Y-k vector is a one-hot vector where each element has the value 0 except for the desired action that has the value 1. In various embodiments, the set of (Xk, Yk) data points is utilized to create a data set at step 331 of FIG. 3 and used for training, testing, and validating a machine learning model.

Figure 5:
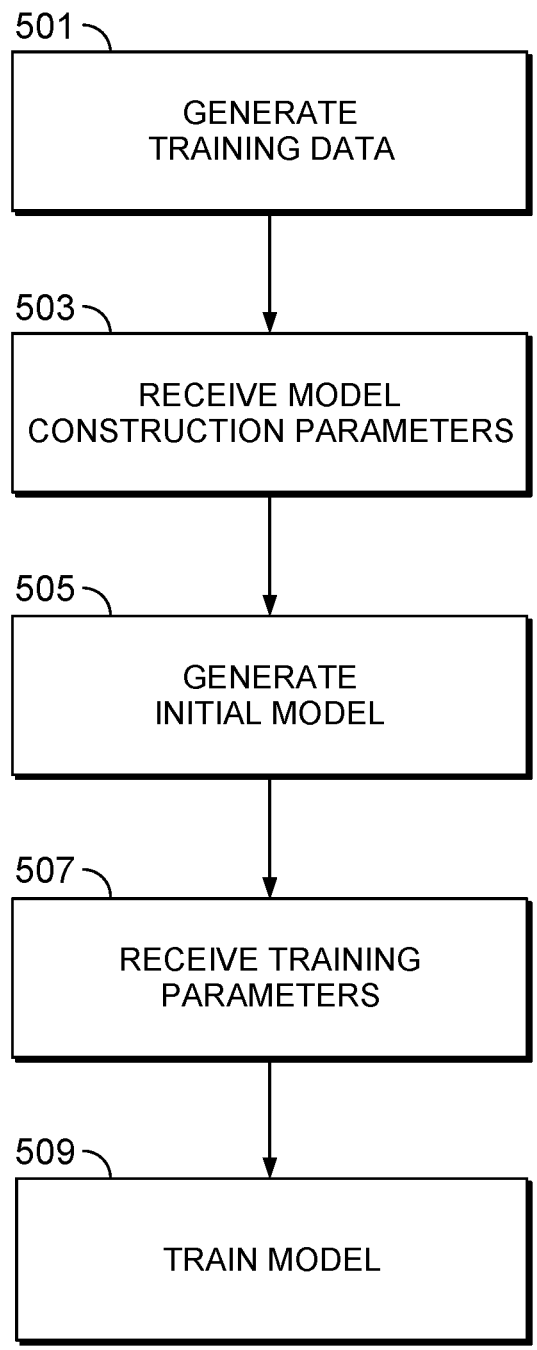
FIG. 5 is a flow diagram illustrating an embodiment of a process for training a machine learning model for an automated planning system.

FIG. 5 is a flow diagram illustrating an embodiment of a process for training a machine learning model for an automated planning system. For example, a machine learning model is generated based on a desired machine learning structure and trained using specified training parameters. In some embodiments, the data corpus used to train the machine learning model is created using the process of FIG. 3 and/or using the process and components of FIG. 4. In some embodiments, the model is implemented using a deep neural network (DNN). In various embodiments, the process of FIG. 5 may be performed while offline.

At 501, training data is generated. In some embodiments, the training data is a set of input and output values. In various embodiments, the machine learning model is trained with the data set generated by the process of FIG. 3. For example, the data set of input and output vectors created at step 331 of FIG. 3 is used as the training data. In some embodiments, the training data is created using the process and components of FIG. 4.

At 503, model construction parameters are received. In various embodiments, machine learning model parameters are used to configure the construction of the model. For example, parameters may be used to specify the number of layers, the model size, the input size, and the output size, among other parameters. For example, deep neural network (DNN) parameters may be used to specify a model compatible with the training data generated at 501. In various embodiments, the input layer of the generated model is configured to receive generated images of the data set (e.g., the set of X-k data of 415 of FIG. 4) and the output layer of the DNN is configured to have the proper number of neurons as referenced by the output vector data (e.g., the set of Y-k data of 425 of FIG. 4). In various embodiments, the construction parameters specify the size of the input layer as the number of pixels in an input image when the images are provided to the generated model by systematically concatenating their lines.

At 505, an initial machine learning model is generated. Based on the construction parameters received at 503, the model is constructed. As described above, in some embodiments, the model is a neural network such as a deep neural network (DNN). Alternative machine learning models may also be used as appropriate. For example, in some embodiments, the machine learning model uses long-short term memory (LSTM) networks and/or recurrent neural networks (RNNs). In some embodiments, the type of neural network is a perception neural network such as a multi-layer perceptron (MLP) neural network. In some embodiments, the machine learning model uses a support vector machine (SVM) model.

At 507, training parameters are received. In various embodiments, the training parameters are used to configure the training of the model generated at 505. For example, training parameters may specify which subset of the training data is utilized for training, validation, and/or testing. In some embodiments, the training parameters include parameters for configuring the training algorithm. For example, parameters may include the number of epochs; the proportions of training, test, and validation data in the generated data-set; stop criteria; learning rate; and/or other appropriate hyperparameters.

At 509, the model generated is trained. For example, based on the parameters received at 507, the model generated at 505 is trained using the training data generated at 501. In some embodiments, the training includes validating and testing the trained model. In various embodiments, the result of step 509 is a trained machine learning model, such as a trained deep neural network (DNN) that approximates an automated artificial intelligence (AI) planner. In some embodiments, the automated AI planner that the DNN approximates is automated planner 421 of FIG. 4. In various embodiments, the training performed is supervised, offline training.

Figure 6:
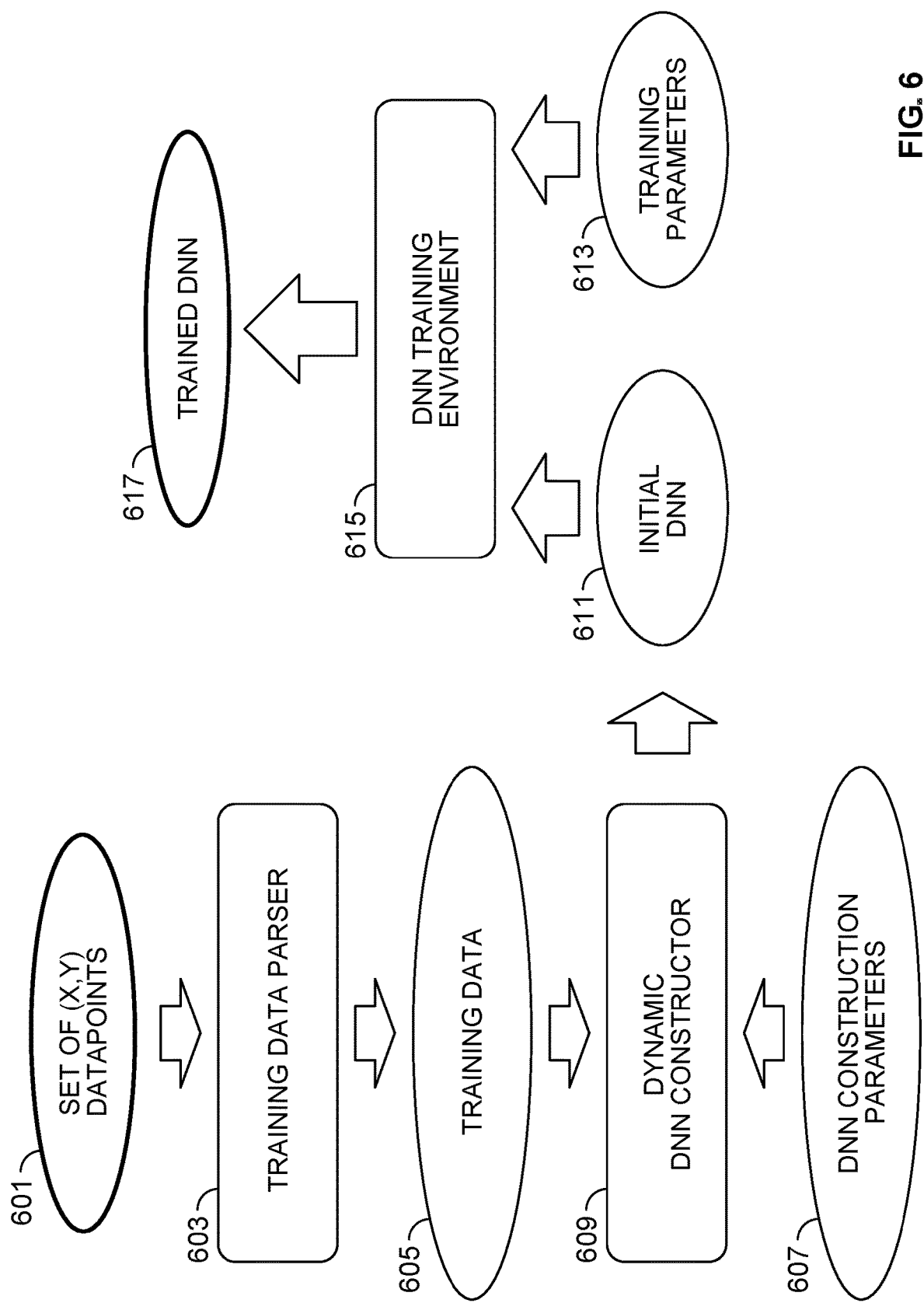
FIG. 6 is a mixed functional and flow diagram illustrating an embodiment of a process for training a machine learning model for an automated planning system.

FIG. 6 is a mixed functional and flow diagram illustrating an embodiment of a process for training a machine learning model for an automated planning system. In the example shown, the machine learning model is a deep neural network (DNN). In some embodiments, the machine learning model is a convolutional DNN (CDNN). At 601, a set of (X, Y) data points is provided. In some embodiments, the data points are the data points generated by the process of FIG. 3 and/or the process and components of FIG. 4. At 603, a training data parser parses the received data points. At 605, training data is provided based on the parsing of the training data parser of 603. At 607, DNN construction parameters are provided. At 609, a dynamic DNN constructor generates an initial DNN using at least the DNN construction parameters of 607. At 611, an initial DNN is generated. At 613, training parameters are provided. At 615, a DNN training environment is utilized to train the initial DNN of 611 based on the initial DNN of 611 and the training parameters of 613. At 617, a trained DNN is produced.

In some embodiments, the set of (X, Y) data points of 601 and the training data of 605 are generated at 501 of FIG. 5 and the training data parser of 603 performs step 501 of FIG. 5. In some embodiments, the DNN construction parameters of 607 are received at 503 of FIG. 5. In some embodiments, the dynamic DNN constructor of 609 is used to perform step 505 of FIG. 5. In some embodiments, the training parameters of 613 are received at step 507 of FIG. 5 to generate the initial DNN of 611. In some embodiments, the DNN training environment of 615 performs step 509 of FIG. 5 using the initial DNN of 611 and the training parameters of 613. In some embodiments, the trained DNN of 617 is the result of step 509 of FIG. 5.

Figure 7:
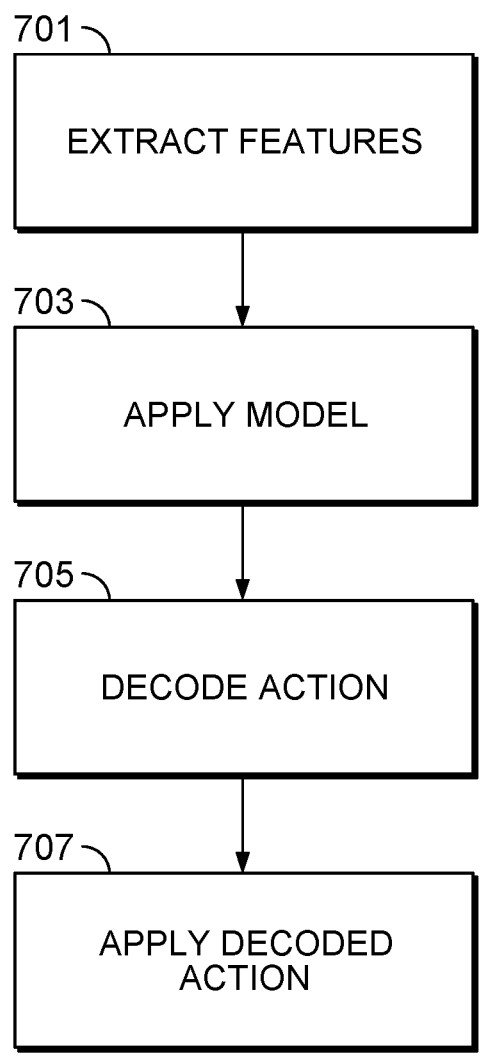
FIG. 7 is a flow diagram illustrating an embodiment of a process for applying a trained machine learning model for automated planning.

FIG. 7 is a flow diagram illustrating an embodiment of a process for applying a trained machine learning model for automated planning. In various embodiments, the process of FIG. 7 is performed while online and relies on the machine learning model trained using the process of FIG. 5 and/or the process and components of FIG. 6. In some embodiments, the process of FIG. 7 may be used for reactive planning for a given domain. For example, non-player characters (NPCs) may be controlled in a computer game using the process of FIG. 7.

In some embodiments, the process of FIG. 7 is performed on a client for automated planning. For example, a client-side device such as a mobile device can implement automated planning using the process of FIG. 7 on a trained deep neural network (DNN). Unlike traditional automated artificial intelligence (AI) planners, the process of FIG. 7 allows for the creation of a lightweight planner that can run concurrently with many other planners. By utilizing a trained machine learning model, the automated AI planning is lightweight, more scalable, and requires fewer computational resources such as CPU cycles and memory. For example, multiple planners can run concurrently on a single device compared to traditional AI planning utilizing traditional planning techniques. In various embodiments, the process of FIG. 7 may be utilized to implement fully autonomous behavior for agents such as robots and non-player characters (NPCs) in a game.

In some embodiments, the process of FIG. 7 may be utilized by an autonomous vehicle to reach a desired goal, such as traveling from location A to location B. The vehicle autonomously plans its actions to achieve its goal of traveling from location A to location B. The plan may involve not only path-planning (i.e., planning of movement), but also planning other activities, such as fueling, oil-change, cleaning, charging, exploration, etc. As other examples, an Autonomous Underwater Vehicle (AUV), an Unmanned Aerial Vehicle (UAV), a deep-space spacecraft, and/or a planetary rover may perform a given task (e.g., achieve a goal or multiple goals) by scheduling and executing actions autonomously. Similarly, the process of FIG. 7 may be utilized not only for robotic and hardware agents but also for software agents including electronic commerce modules, web crawlers, intelligent personal computers, non-player characters in computer games, etc. The application of the process of FIG. 7 may be utilized to determine the appropriate action for each step of the solution needed to reach a particular artificial intelligence (AI) planning goal.

At 701, features are extracted. For example, domain-specific features are extracted from planning problem data structures. In various embodiments, the planning problem data structures represent a particular artificial intelligence (AI) planning problem. In some embodiments, the problem is specified using a domain and problem specification. For example, a domain and problem specification may be described using a Planning Domain Definition Language (PDDL) specification. In various embodiments, the planning problem data structures are constructed as described with respect to FIG. 3 and in particular with respect to steps 301, 303, and 305 of FIG. 3. For example, the planning problem data structures may be created by parsing a domain and problem specification. In various embodiments, the parsing of the specifications is performed only once for each set of specifications and the planning problem data structures are modified after the execution of each AI action, such as a PDDL action. In some embodiments, the problem is encoded using a Multi-Agent (MA) extension of PDDL that describes the planning problems in a domain-independent manner. At 701, the encoded MA-PDDL is decoded and features are extracted. In some embodiments, the problem is encoded as an AI model. The AI Model is decoded and features are extracted.

In various embodiments, the features are extracted as an input vector to a machine learning model. In various embodiments, the features are extracted as described with respect to FIG. 3 and in particular steps 311 and 313 of FIG. 3. For example, extraction parameters are received to configure the extraction of domain-specific features. In some embodiments, the features are extracted using an imaginator module as described above with respect to FIG. 3. In various embodiments, the imaginator module provides the proper inputs for the machine learning model by encoding each domain and problem description. In some embodiments, the features are extracted using the same framework relied on for training the model.

At 703, the trained machine learning model is applied. In some embodiments, the machine learning model is implemented using a deep neural network (DNN) and receives as input a pixel-based image. In some embodiments, the input image is a serialized image created by concatenating the rows of the image together. In various embodiments, the output result of 703 is an encoded action that can be applied to the current problem. In various embodiments, the application of the model approximates an automated artificial intelligence (AI) planner that relies on traditional AI planning techniques.

At 705, an action is decoded. For example, the action created as a result of applying the model at 703 is decoded. In various embodiments, the action is decoded into an artificial intelligence (AI) action, e.g. a Planning Domain Definition Language (PDDL) action. In some embodiments, a deep neural network (DNN) is utilized and the output of the DNN is translated back (e.g., decoded) into a parameterized action (e.g., sequence). In some embodiments, the output of the DNN may be a vector of floating point numbers, such as doubles, between 0.0 and 1.0. The action is selected based on the maximal output element of the DNN output vector. In some embodiments, the output selected requires that the respective grounded action is actually executable. In some embodiments, a grounded action may have parameters. In the event a grounded action has parameters, the parameters cannot be variables and must have a value. In various embodiments, all parameters must have a value and be executable in the world and/or environment. For example, a grounded action can be: MOVE FROM-HOME TO-WORK where MOVE is the action-name and FROM-HOME and TO-WORK are the values and/or the two parameters of the action. When executed, an agent such as a non-player character (NPC) moves from home to work.

At 707, the decoded action is applied. In various embodiments, the decoded action is a Planning Domain Definition Language (PDDL) action that is applied to the artificial intelligence (AI) planning problem. For example, the action may be to move an autonomous vehicle a certain distance. As another example, the action may be applied to a non-player character (NPC) in a computer game.

In various embodiments, once the action is applied at 707, the next action may be determined by repeating the process of FIG. 7 (not shown). In some embodiments, features may be extracted at 701 by modifying the planning problem data structures without the need to parse the specification files again (not shown). In some embodiments, the problem descriptions are continuously updated to reflect the current state (not shown).

Figure 8:
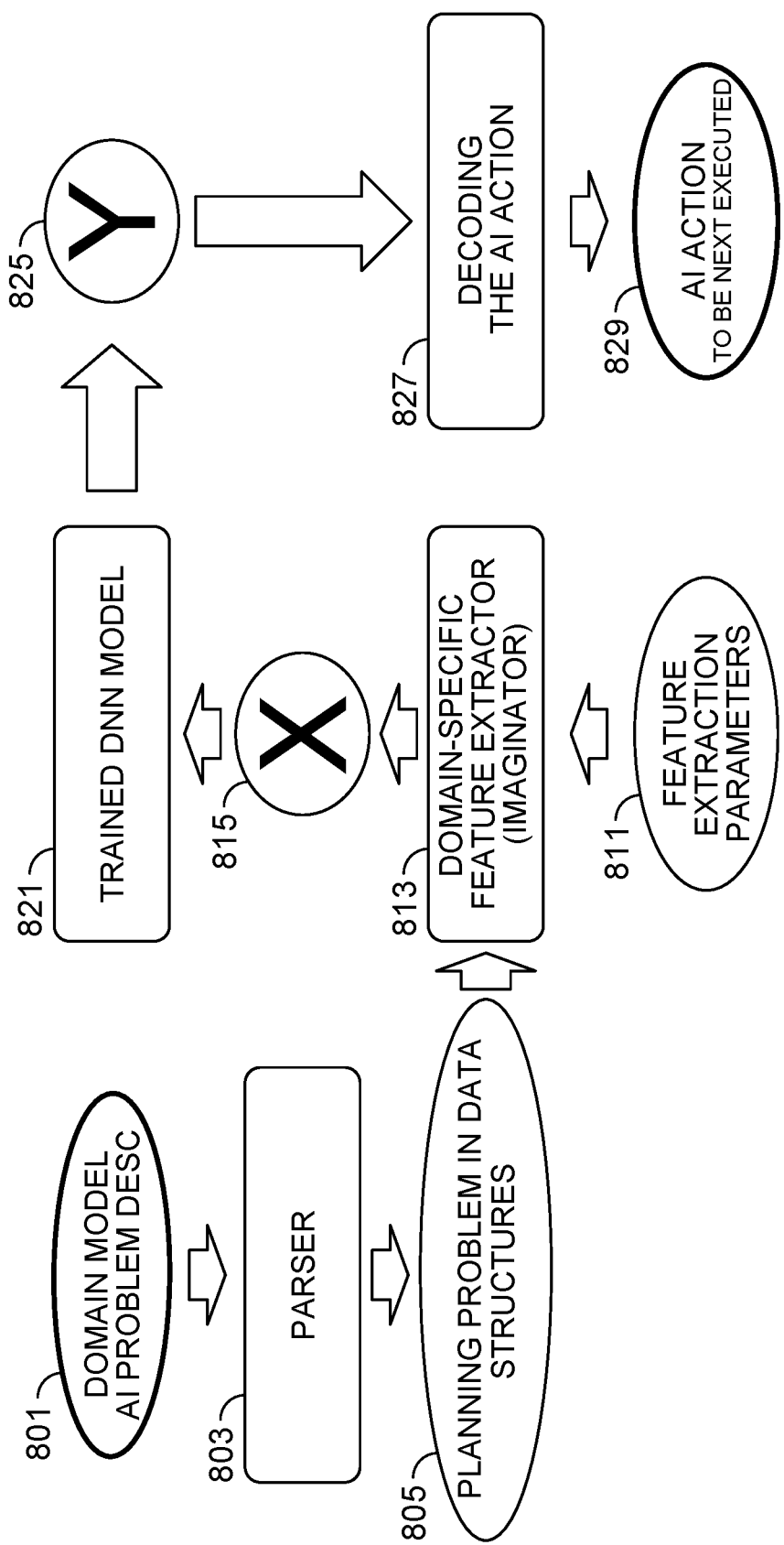
FIG. 8 is a mixed functional and flow diagram illustrating an embodiment of a process for applying a trained machine learning model for automated planning.

FIG. 8 is a mixed functional and flow diagram illustrating an embodiment of a process for applying a trained machine learning model for automated planning. In various embodiments, the process of FIG. 8 is performed while online. For example, the process of FIG. 8 is performed in real-time to determine the next action of a non-playing character (NPC) in a game. In various embodiments, the trained deep neural network (DNN) used in FIG. 8 is the trained deep neural network (DNN) of FIG. 6.

At 801, a domain model and an artificial intelligence (AI) problem description are provided. In some embodiments, the files are domain and problem specifications described using the Planning Domain Definition Language (PDDL) specification. At 803, a parser is utilized to parse a received domain model and AI problem description. In some embodiments, the parser at 803 is a PDDL parser. At 805, problem data structures are planned. At 811, feature extraction parameters are provided. At 813, a domain-specific feature extractor is utilized to extract features from the planning problem data structures. In some embodiments, the domain-specific feature extractor is an imaginator module. At 815, an input vector is generated using the feature extraction parameters at 811 and the domain-specific feature extractor of 813. At 821, a trained DNN model receives and applies the input vector of 815. At 825, an output vector is determined as a result of applying the trained DNN model of 821 to the input vector of 815. At 827, the output vector of 825 is decoded. In some embodiments, the decoded result is an AI action. In some embodiments, the decoded result is a PDDL action. At 829, an AI action is prepared for execution. For example, in some embodiments, the AI action is the next action to apply for solving the described problem for the described domain. In some embodiments, a parsing step is performed a single time for each domain and problem pair by the parser of 803. To determine subsequent actions, in some embodiments, the planning problem data structures of 805 are modified in runtime after the execution of the AI action of 829.

In some embodiments, the steps and components 801, 803, 805, 811, and 813 are performed and/or utilized at step 701 of FIG. 7 and the input vector of 815 is the result of performing step 701 of FIG. 7. In some embodiments, the input vector of 815 is provided as input to the trained DNN model of 821 at step 703 of FIG. 7 and the output vector of 825 is the result of performing step 703 of FIG. 7. In some embodiments, step 827 is performed at step 705 of FIG. 7 and results in the decoded AI action of 829. In some embodiments, the AI action of 829 is applied at step 707 of FIG. 7.

Figure 9:
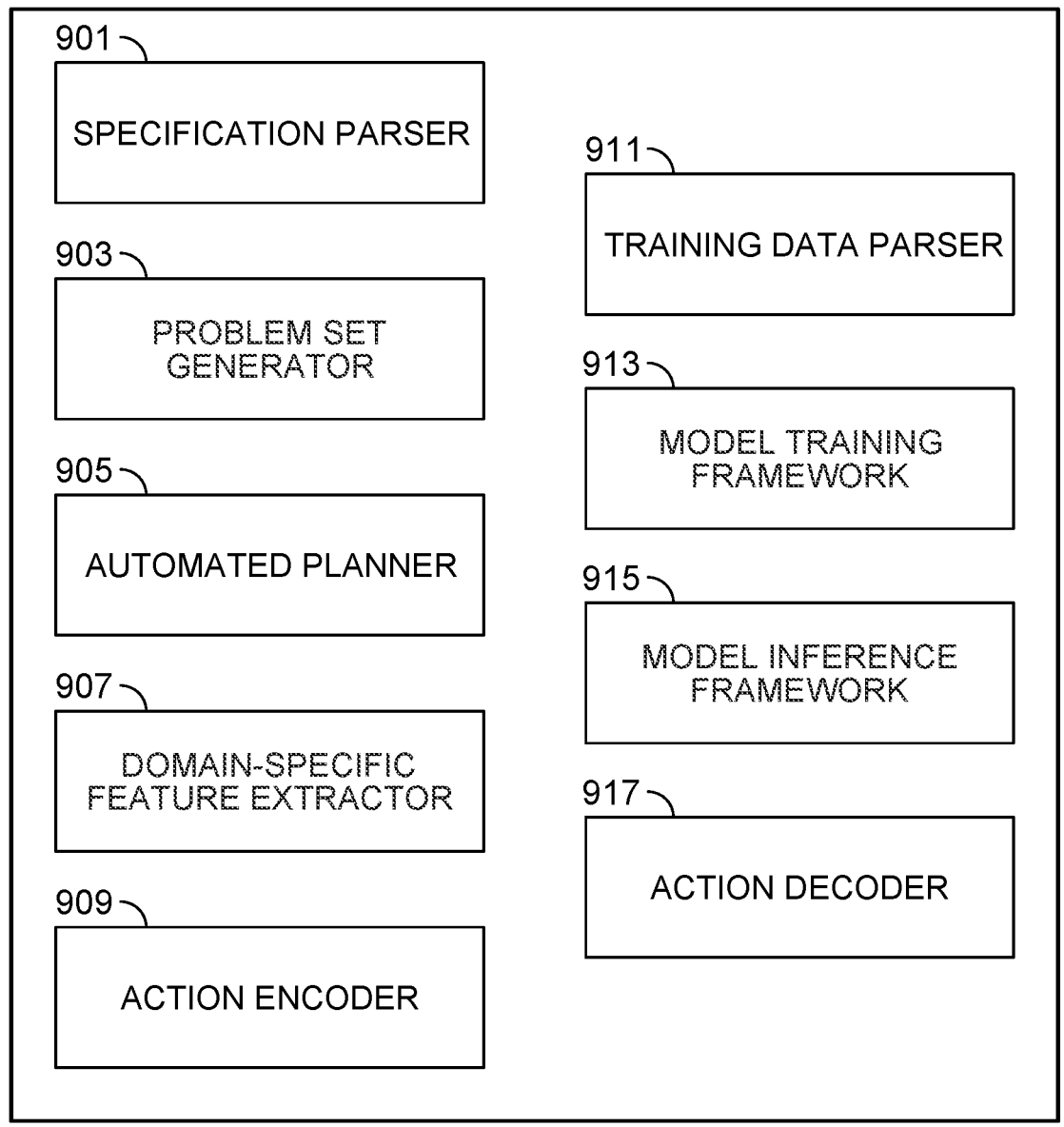
FIG. 9 is a functional diagram illustrating an embodiment of a domain-independent automated planning system using neural networks.

FIG. 9 is a functional diagram illustrating an embodiment of a domain-independent automated planning system using neural networks. Automated planning system 900 includes various subsystems including specification parser 901, problem-set generator 903, automated planner 905, domain-specific feature extractor 907, action encoder 909, training data parser 911, model training framework 913, model inference framework 915, and action decoder 917. In various embodiments, the functional components shown may be used to implement the processes and components of FIGS. 1-8. Additional functionality, such as connectivity between functional components is not shown. In some embodiments, the functional components may be implemented using one or more programmed computer systems. For example, the processes of FIGS. 1, 3, 5, and 7 may be performed using one or more computer processors of one or more programming computer systems. In some embodiments, various subsystems may be implemented on different programming computer systems. For example, subsystems associated with training a machine learning model may be implemented on a server and/or using a server-side implementation and the application of the trained machine learning model may be implemented on a client device or using a client-side implementation. In some embodiments, one or more subsystems may exist on both the client and server side implementations.

In some embodiments, specification parser 901 performs the step of 105 of FIGS. 1 and/or 303 of FIG. 3. In some embodiments, specification parser 901 is utilized in performing the step of 701 of FIG. 7. In some embodiments, specification parser 901 is the parser of 203 of FIG. 2, 403 of FIG. 4, and/or 803 of FIG. 8. In some embodiments, problem-set generator 903 performs the step of 109 of FIG. 1 and/or is the problem-set generator of 209 of FIG. 2. In some embodiments, automated planner 905 performs the step of 321 of FIG. 3 and/or is the automated planner of 421 of FIG. 4. In some embodiments, domain-specific feature extractor 907 performs the step of 313 of FIGS. 3 and/or 701 of FIG. 7. In some embodiments, domain-specific feature extractor 907 is the domain-specific feature extractor of 413 of FIGS. 4 and/or 813 of FIG. 8. In some embodiments, domain-specific feature extractor 907 is implemented using an imaginator module. In some embodiments, action encoder 909 performs the step of 323 of FIGS. 3 and/or 423 of FIG. 4. In some embodiments, training data parser 911 is the training data parser of 603 of FIG. 6 and may be used in performing the step of 501 of FIG. 5. In some embodiments, model training framework 913 is utilized in performing the steps of FIG. 5 and FIG. 6. In some embodiments, model training framework 913 is utilized to perform at least the steps 505, 507, and 509 of FIG. 5. In some embodiments, model training framework 913 includes the DNN training environment of 615 of FIG. 6. In some embodiments, model inference framework 915 is utilized to perform the steps of FIG. 7 and FIG. 8 and includes the trained DNN model of 821 of FIG. 8. In some embodiments, action decoder 917 performs the step of 707 of FIGS. 7 and/or 827 of FIG. 8.

The automated planning system shown in FIG. 9 is but an example of a system suitable for use with the various embodiments disclosed herein. Other automated planning systems suitable for such use can include additional or fewer subsystems. Other systems having different functional configurations of subsystems can also be utilized.

Figure 10:
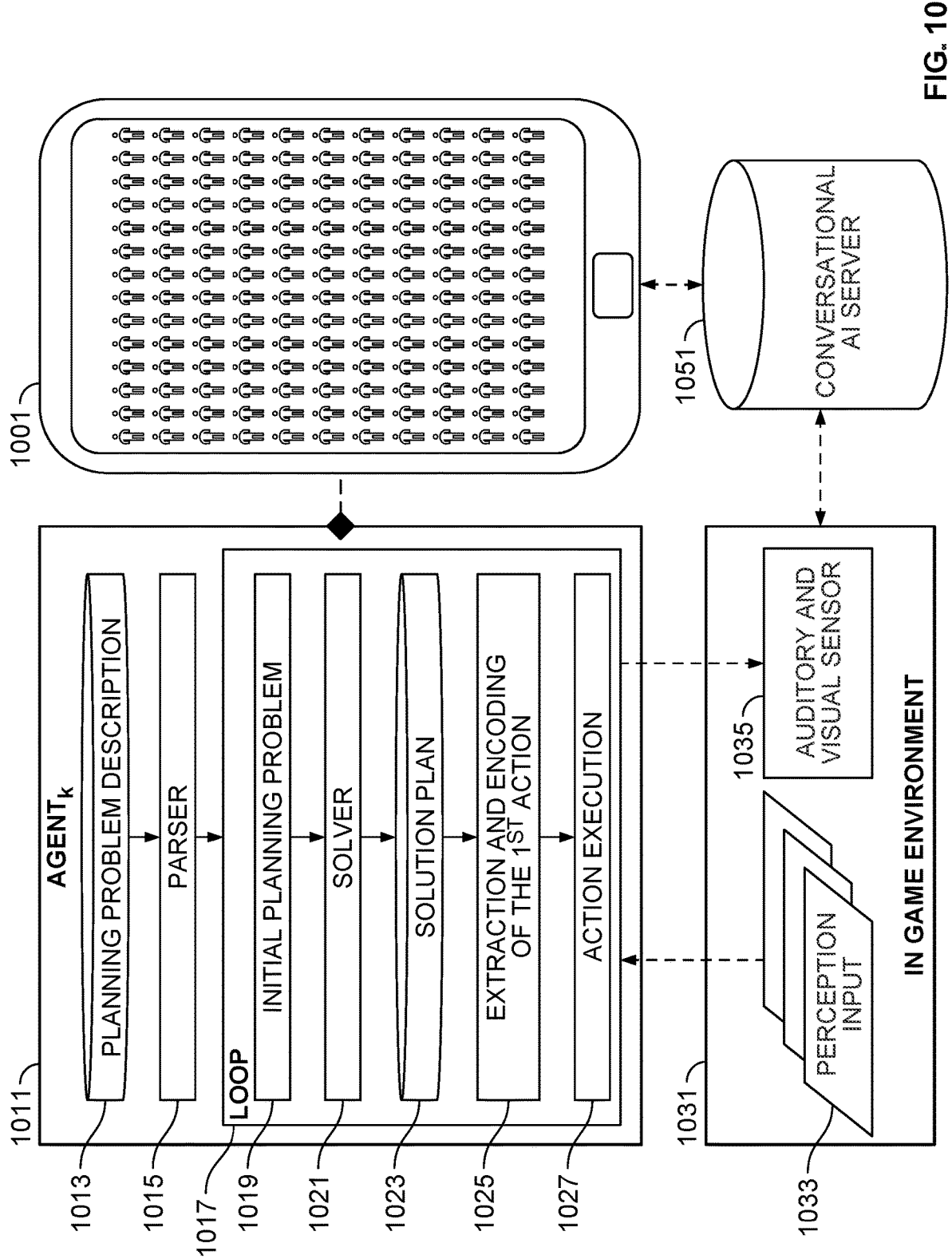
FIG. 10 is a block diagram illustrating an embodiment of a scalable framework for autonomous artificial intelligence (AI) characters.

FIG. 10 is a block diagram illustrating an embodiment of a scalable framework for autonomous artificial intelligence (AI) characters. In the example shown, a scalable framework for autonomous AI characters includes game device 1001, AI game component 1011, in-game environment 1031, and conversational AI server 1051. Game device 1001 is a device for interacting with a computer-based game. In some embodiments, game device 1001 is a smartphone, a tablet, and/or another computing device. In some embodiments, game device 1001 is an interface device for a computer-based game and additional processing is provided by a backend server. In various embodiments, the computer-based game includes one or more autonomous AI characters including non-player characters (NPCs). In various embodiments, AI game component 1011 interfaces with in-game environment 1031 and in-game environment 1031 interfaces with conversational AI server 1051. In some embodiments, game device 1001 utilizes AI game component 1011 and conversational AI server 1051.

In the example shown, artificial intelligence (AI) game component 1011 represents the AI game component for a particular agent such as a non-player character (NPC). In various embodiments, one or more AI game components run simultaneously for a particular computer-based game as part of a scalable framework for autonomous AI characters. For example, a single AI game component, such as AI game component 1011, runs for each agent or NPC. In the example shown, AI game component 1011 corresponds to the k-th agent out of at least a k number of agents. AI game component 1011 includes planning problem description 1013, parser 1015, and AI loop 1017. AI loop 1017 includes initial planning problem 1019, solver 1021, solution plan 1023, first action extractor and encoder 1025, and action executor 1027. In various embodiments, each NPC is implemented as an agent.

In some embodiments, an autonomous artificial intelligence (AI) character performs the sequential loop of AI loop 1017 to achieve one or more goals for the AI character. As part of AI game component 1011, planning problem description 1013 describes an AI planning problem. In some embodiments, planning problem description 1013 is a problem and domain description and may be predefined in a set of description files. For example, in some embodiments, planning problem description 1013 includes a problem domain referring to information that defines the problem, such as an initial problem, and constraints to the solution. In various embodiments, the constraints are part of the problem. In some embodiments, planning problem description 1013 further includes goals that the problem owner wishes to achieve, context within which the problem exists, and/or rules that define essential functions or other aspects of any solution product. In various embodiments, planning problem description 1013 represents the environment in which a solution will have to operate, as well as the problem itself. In some embodiments, the domain description includes initial variables of a game and definitions of actions. In some embodiments, the definitions of actions do not change during the lifespan of the game.

In some embodiments, parser 1015 is a planning problem parser and used to parse planning problem description 1013. In various embodiments, initial planning problem 1019 is created by parsing planning problem description 1013 with parser 1015. In various embodiments, initial planning problem 1019 is an AI planning problem and may include a pre-parsed domain and problem. In the example shown, parser 1015 passes a parsed domain and problem into AI loop 1017 as initial planning problem 1019

In some embodiments, artificial intelligence (AI) loop 1017 is run until a goal is achieved and begins by searching for an AI planning problem such as initial planning problem 1019. Solver 1021 is used to generate a solution, such as a solution plan 1023, to the provided AI planning problem, such as initial planning problem 1019. In various embodiments, during the first iteration of AI loop 1017, the AI planning problem is initial planning problem 1019. On subsequent iterations, changes to the game environment may be reflected by changing the problem and updating the data structures corresponding to the AI problem. For example, after an initial iteration of AI loop 1017, the problem data structure is revised to address changes to the game that influence the current problem. For each iteration of AI loop 1017, solver 1021 solves the revised problem (reflected by the changes in the problem data structures) to find a best action list for the current state. In various embodiments, solver 1021 generates a plan and corresponding actions to achieve one or more goals defined by the problem. In some embodiments, the target of these actions is to achieve an ultimate goal included in the domain. In some embodiments, solver 1021 utilizes a light-weight deep neural network (DNN) planner. In some embodiments, solver 1021 utilizes a deep convolutional neural network (DCNN).

In some embodiments, solution plan 1023 is stored in a solution plan repository (not shown in FIG. 10). In various embodiments, each iteration of artificial intelligence (AI) loop 1017 potentially generates a new solution that may be stored in a solution plan repository. In some embodiments, a solution plan repository stores trained solution plans for agent or non-player character (NPC) behaviors. In various embodiments, solver 1021 may retrieve a previously saved solution from the solution plan repository when encountering a previously solved problem. The inclusion of a solution plan repository improves the scalability of the AI framework by reducing memory consumption and processing requirements. For example, a solution plan repository helps to determine a solution plan and choose an optimal action from one of thousands (or more) of different potential cases in real time. In some embodiments, each context-based action of an agent or NPC solution requires processing power and memory resources that can be reduced when utilizing a solution plan repository. In some embodiments, a solution plan repository is implemented using a backing database. In some embodiments, a solution plan repository is implemented using a memory graph data structure and stores at least the problem, solution, and context for each solved problem.

During each iteration of artificial intelligence (AI) loop 1017, the first action of solution plan 1023 is extracted and encoded using first action extractor and encoder 1025. The extracted action is executed using action executor 1027. For example, the action may include a movement action, a speaking action, an action to end a conversation, etc. In various embodiments, since each non-player character (NPC) is an agent and utilizes its own AI game component 1011, each NPC acts as an individual. For example, each NPC in a life simulation game lives its own life that may include working, sleeping, eating, going to school, going to the gym, etc. by performing its actions from its own action list of its corresponding solution plan. In various embodiments, the actions performed by NPCs influence the game environment and in turn the environment also influences the NPCs during the next iteration of AI loop 1017.

In some embodiments, the game environment is encapsulated by in-game environment 1031. In-game environment 1031 includes at least perception input 1033 and auditory and visual sensor 1035. In some embodiments, in-game environment 1031 includes additional environmental context parameters not shown that may be utilized as input to AI game component 1011 and/or detected by game environment sensors. For example, in-game environment 1031 may include network communication (not shown) including chat messages. In some embodiments, a visual and/or sound element is identified as a percept. In some embodiments, auditory and visual sensor 1035 detects changes to in-game environment 1031. In some embodiments, changes to in-game environment 1031, including auditory and visual changes detected by auditory and visual sensor 1035, relevant to an AI character, are encoded into perception input 1033 and used as input to AI game component 1011 including input to AI loop 1017. In some embodiments, perception input 1033 is prepared at certain intervals of a game, for example, during each iteration of a game loop.

In various embodiments, conversational artificial intelligence (AI) server 1051 is utilized by a computer-based game to store, process, and/or transmit conversations between game entities including between players such as a mix of human players and/or non-player characters (NPCs). For example, one NPC may communicate with another using conversational AI server 1051. As another example, two human players may communicate with one another via conversational AI server 1051. As yet another example, two human players may communicate with multiple NPCs via conversational AI server 1051. In various embodiments, dialog of a conversation is processed as the auditory input and/or output for each participant of the conversation. For example, an autonomous AI NPC receives and sends auditory input via conversational AI server 1051 and in-game environment 1031. Using at least conversational AI server 1051, a player of game device 1001 can initiate and even interrupt a conversation with one or more autonomous AI NPCs.

In some embodiments, the scalable framework for autonomous artificial intelligence (AI) characters of FIG. 10 is used to implement the Futurable life simulation game. In some embodiments, Futurable is driven by a lightweight deep neural network planner called NeuralPlanner. In some embodiments, each agent or non-player character (NPC) in a Futurable simulation game includes a planner, a reasoner, and its own planning problem description to generate a context-based action for the agent or NPC. In some embodiments, Futurable additionally utilizes a solution plan repository to improve autonomy and scalability.

In some embodiments, FIGS. 1-9 relate to a lightweight artificial intelligence (AI) framework for implementing AI game component 1011 and/or AI loop 1017. In some embodiments, solver 1021 is trained as described by FIGS. 1-6 and used to solve AI planning problems as described by FIGS. 7 and 8.

Figure 11:
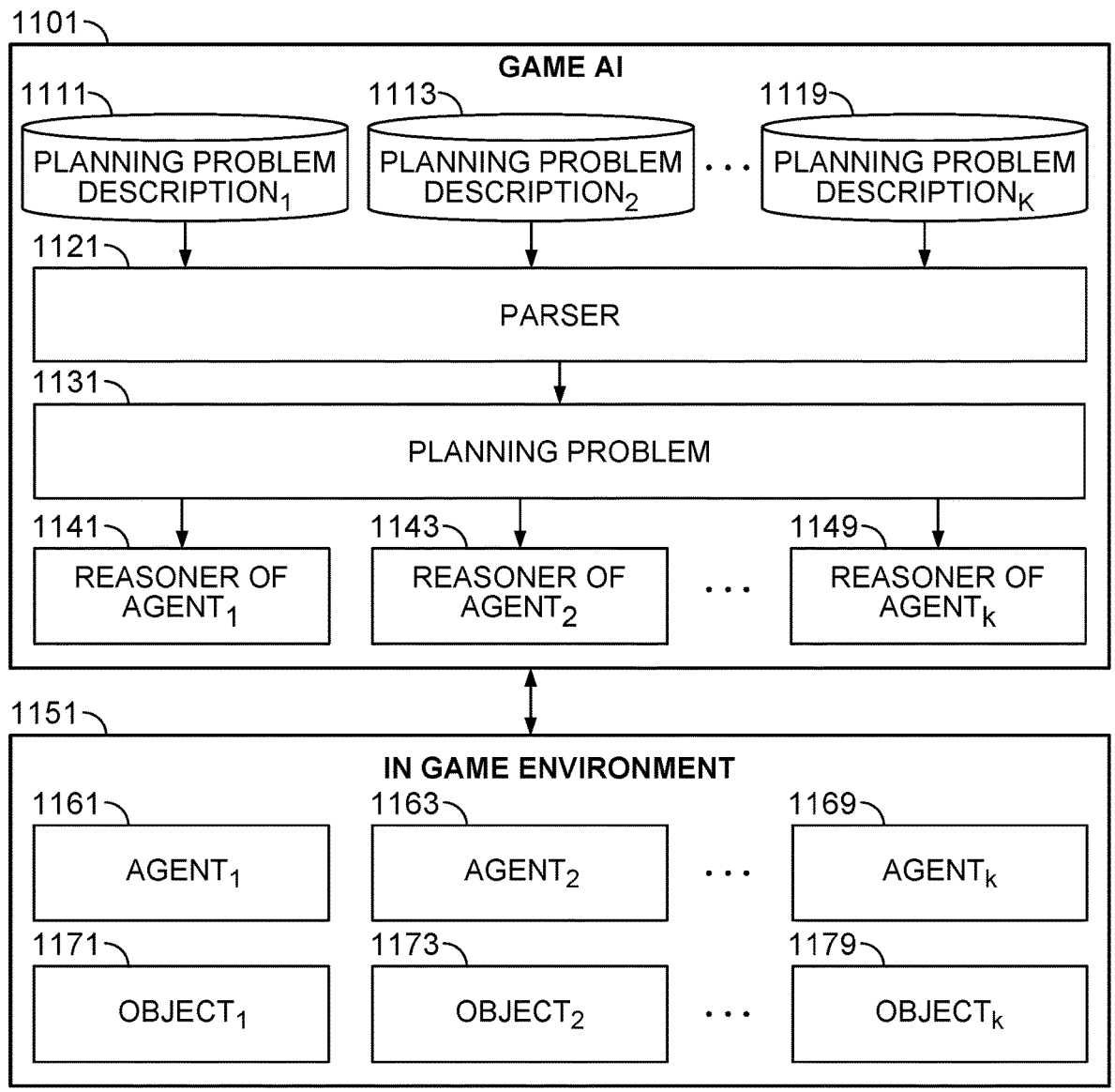
FIG. 11 is a block diagram illustrating an embodiment of a scalable framework for autonomous artificial intelligence (AI) characters.

FIG. 11 is a block diagram illustrating an embodiment of a scalable framework for autonomous artificial intelligence (AI) characters. For example, the scalable framework of FIG. 11 may be used to determine in-game actions for autonomous AI agents, such as non-player characters (NPCs), based on the in-game environment. In the example shown, the scalable framework for autonomous AI characters of FIG. 11 includes game AI platform 1101 and in-game environment 1151. Game AI platform 1101 includes one or more planning problem descriptions (e.g., numbered 1 through k) including planning problem descriptions 1111, 1113, and 1119, parser 1121, planning problem 1131, and one or more agent reasoners (e.g., numbered 1 through k) including agent reasoners 1141, 1143, and 1149. In-game environment 1151 includes one or more agents (e.g., numbered 1 through k) including agents 1161, 1163, and 1169 and one or more objects (e.g., numbered 1 through k) including objects 1171, 1173, and 1179. In various embodiments, each NPC is implemented as an agent.

In some embodiments, parser 1121 reads and parses planning problem descriptions, such as planning problem descriptions 1111, 1113, and 1119, for each agent to generate a planning problem. In some embodiments, each planning problem description is an AI planning problem description. In the example shown, each agent 1 through k has its own corresponding AI planner, such as agent reasoners 1141, 1143, and 1149, for solving an AI planning problem. In some embodiments, an agent corresponds to each NPC. Since each agent has its own planner, each agent can read the corresponding planning problem, generate a plan, and execute the plan for its own problem. In various embodiments, each AI planning problem includes the situation that the agent (or NPC) wants to solve.

In some embodiments, parser 1121 reads a planning problem description and is utilized to generate a planning problem for solving an AI problem. The reasoner for each agent will process the problem and generates the actions for the current problem. The resulting actions change the game environment including game objects and also each agent. These changes are reflected by in-game environment 1151. Similarly, interactions between non-player character (NPC) agents and game objects also change the game environment and are reflected by in-game environment 1151. These environmental changes affect the AI planning problem and are reflected by updating and/or generating a new problem description.

In some embodiments, in-game environment 1151 stores the current game environment context for game entities, such as non-player character (NPC) agents and objects. For example, agents 1161, 1163, and 1169 as well as objects 1171, 1173, and 1179 store updated contexts including in game environment contexts relevant to each entity based on changes to the game environment. In various embodiments, the updated contexts reflect the current status of the game environment.

In some embodiments, each non-player character (NPC) agent includes its own reasoner, such as one of agent reasoner 1141, 1143, or 1149, and thus the generated solutions and corresponding actions of the solutions can occur and be performed concurrently. In some embodiments, an agent reasoner searches for an appropriate action from a solution plan repository as described with respect to FIG. 10.

In various embodiments, the result of an agent reasoner such as agent reasoners 1141, 1143, and 1149 is a list of actions (not shown). In some embodiments, the list of actions is stored in an action pool (not shown), which is used by runners (not shown) to run the action. In some embodiments, the runners are part of an action executor (not shown) as described with respect to action executor 1027 of FIG. 10. In some embodiments, the action of an NPC agent can influence the objects in the game environment. For example, an NPC can move an object, carry an object, and/or consume an object, etc. These changes may influence the agent performing the action on the object as well as other agents in the game. For example, in response to a box moving from one position to another, in the event the box is significant in the planning of an autonomous AI NPC, the autonomous AI NPC will detect that the box has moved and its next determined action will reflect the moving of the box.

In some embodiments, FIGS. 1-9 relate to a lightweight artificial intelligence (AI) framework for implementing game AI platform 1101. In some embodiments, agent reasoners 1141, 1143, or 1149 are trained as described by FIGS. 1-6 and used to solve AI planning problems such as planning problem 1131 as described by FIGS. 7 and 8. In some embodiments, game AI platform 1101 includes one or more AI game components such as AI game component 1011 of FIG. 10. In some embodiments, planning problem descriptions 1111, 1113, and/or 1119 are planning problem description 1013 of FIG. 10 and parser 1121 is parser 1015 of FIG. 10. In some embodiments, planning problem 1131 is initial planning problem 1019 of FIG. 10. In some embodiments, each of agent reasoners 1141, 1143, and 1149 is at least solver 1021 of FIG. 10. In various embodiments, each of agent reasoners 1141, 1143, and 1149 generates solution plan 1023 of FIG. 10. In some embodiments, in-game environment 1151 is in-game environment 1031 of FIG. 10.

Figure 12:
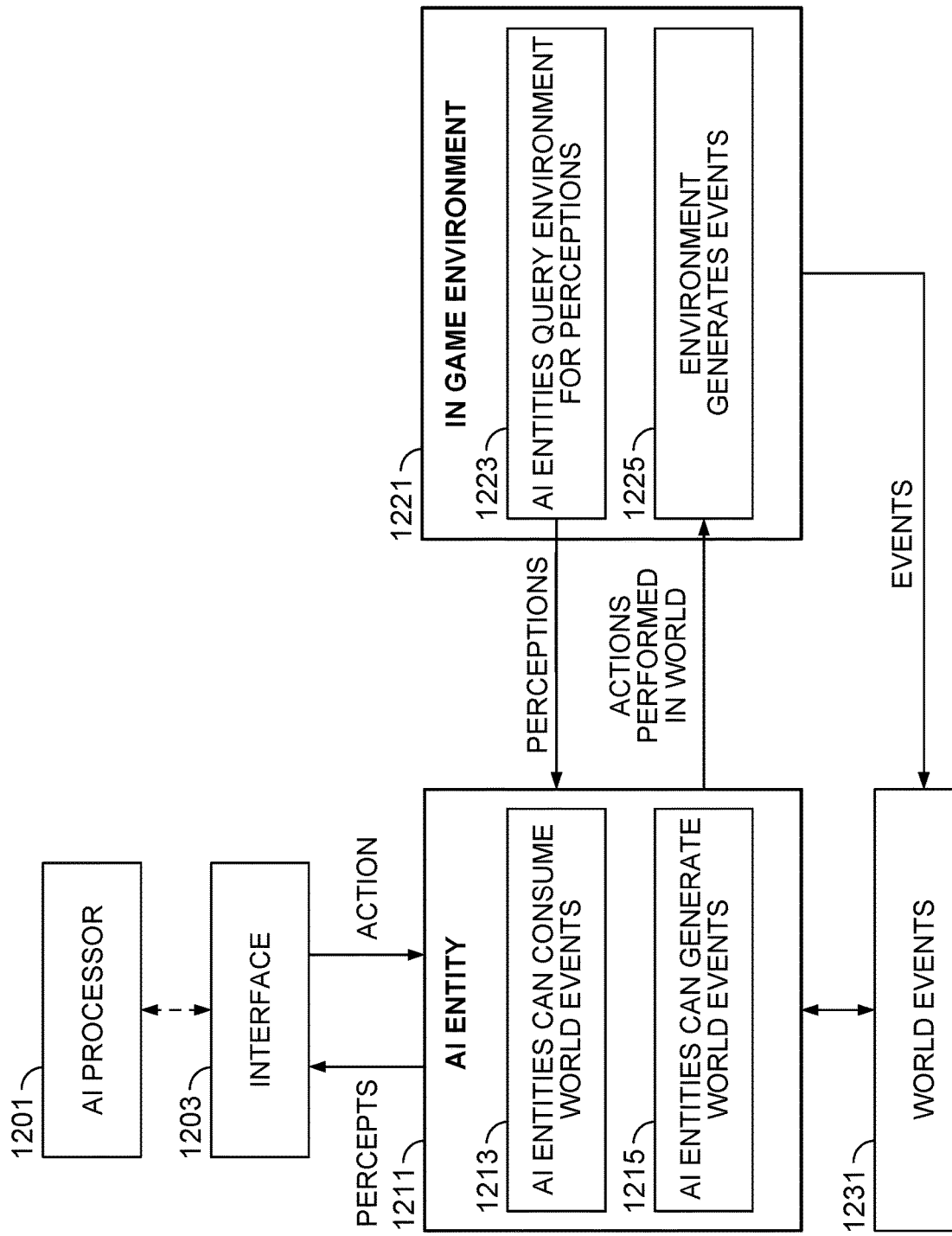
FIG. 12 is a block diagram illustrating information flow for an embodiment of a scalable framework for autonomous artificial intelligence (AI) characters.

FIG. 12 is a block diagram illustrating information flow for an embodiment of a scalable framework for autonomous artificial intelligence (AI) characters. In some embodiments, the diagram of FIG. 12 corresponds to the implementation used by a game application with autonomous AI characters. The diagram of FIG. 12 includes AI processor 1201, interface 1203, AI entity 1211, in-game environment 1221, and world events 1231.

In some embodiments, artificial intelligence (AI) entity 1211 is a representation of an AI object in a game. In some embodiments, the representation is an AI-based representation. In various embodiments, each AI entity, including autonomous AI characters, has a corresponding AI entity. In some embodiments, each type of AI object in the game will correspond to an agent or non-player character (NPC). In various embodiments, AI entity 1211 is controlled by an AI library via interface 1203. For example, an AI library may be a library of AI functionality implemented on an AI processor such as AI processor 1201. In some embodiments, the AI library is a centralized library. In the example shown, AI entity 1211 sends percepts to interface 1203 and receives actions from interface 1203. In various embodiments, the percepts and actions are communicated to/from AI processor 1201. For example, AI processor 1201 determines actions based on the received percepts. As labeled in FIG. 12, in some embodiments, AI entity 1211 includes world event properties 1213 and 1215 and is capable of consuming and generating world events such as world events 1231.

In some embodiments, in-game environment 1221 includes properties 1223 and 1225. In-game environment 1221 provides AI entity 1211 perceptions (e.g., based on a query) and in-game environment 1221 generates world events based on received actions from AI entity 1211. For example, in-game environment 1221 receives a list of actions performed by an AI entity represented by AI entity 1211. In some embodiments, the generated world events are world events 1231.

In some embodiments, an autonomous artificial intelligence (AI) non-player character (NPC) perceives itself and its local environment. For example, the AI entity corresponding to the NPC, such as AI entity 1211, receives perceptions of the game environment (e.g., from in-game environment 1221) and sends the perceptions to an AI processor, such as AI processor 1201 via interface 1203, to generate an appropriate action based on the current context. In response, the AI entity, such as AI entity 1211, receives an action to be performed by the NPC and generates world events, such as world events 1231.

In some embodiments, FIGS. 1-9 relate to a lightweight artificial intelligence (AI) framework for implementing AI processor 1201. In some embodiments, AI processor 1201 is trained as described by FIGS. 1-6 and used to solve AI planning problems as described by FIGS. 7 and 8. In some embodiments, AI processor 1201 is game AI component 1011 and/or AI loop 1017 of FIG. 10. In some embodiments, AI processor 1201 is game AI platform 1101 of FIG. 11. In some embodiments, in-game environment 1221 is in-game environment 1031 of FIGS. 10 and/or 1151 of FIG. 11.

Figure 13:
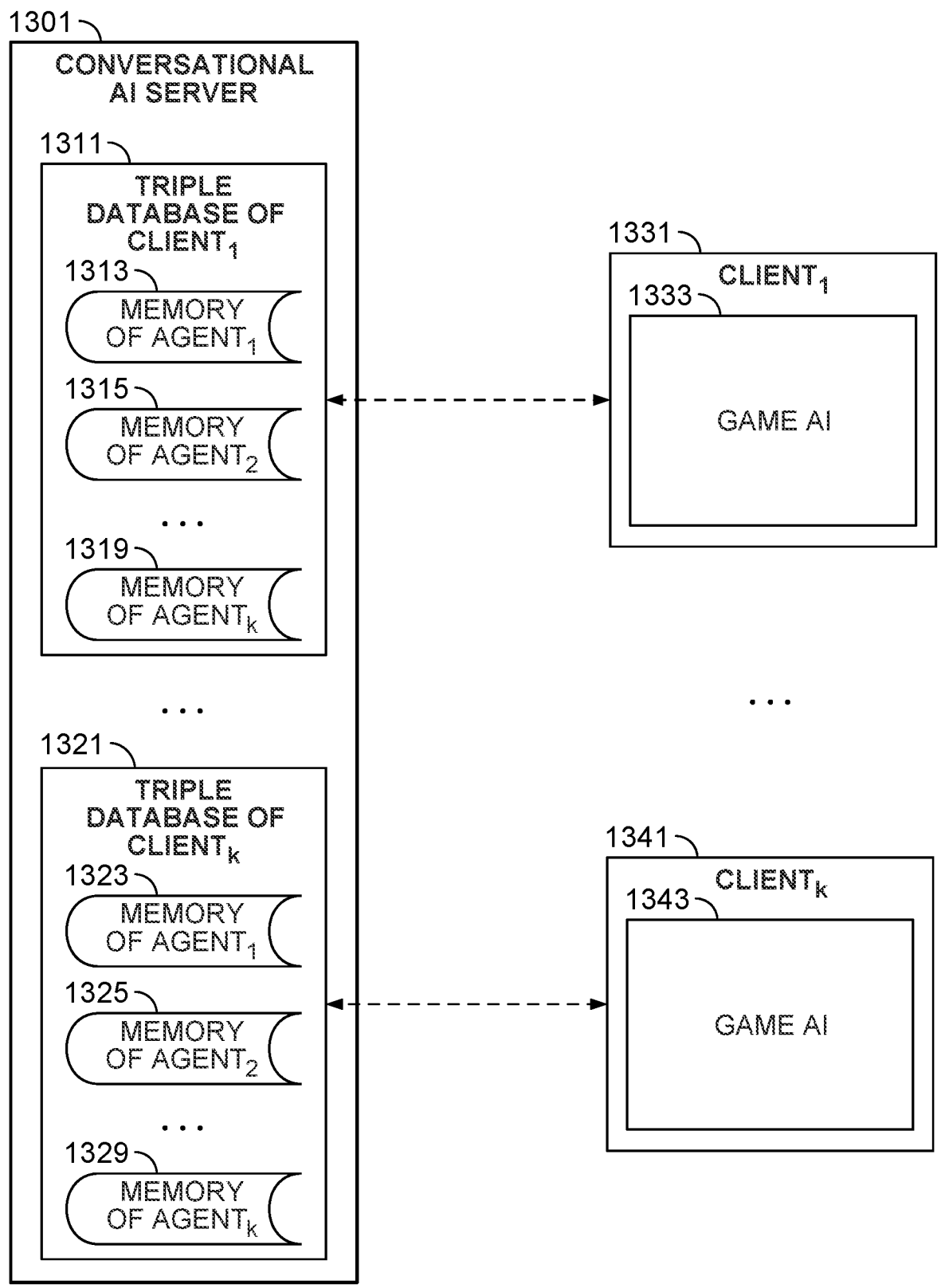
FIG. 13 is a block diagram illustrating client/server components for an embodiment of a scalable framework for autonomous artificial intelligence (AI) characters.

FIG. 13 is a block diagram illustrating client/server components for an embodiment of a scalable framework for autonomous artificial intelligence (AI) characters. In the example shown, the embodiment of a scalable AI framework includes conversational AI server 1301 and clients 1331 and 1341. Conversational AI server 1301 includes triple databases for each client including triple databases 1311 and 1321 for clients 1331 and 1341, respectively. Triple database 1311 includes memories of agents including memories of agents 1313, 1315, and 1319 corresponding to agents 1, 2, and k. Triple database 1321 includes memories of agents including memories of agents 1323, 1325, and 1329 corresponding to agents 1, 2, and k. Clients 1331 and 1341 include game AIs 1333 and 1343, respectively.

In some embodiments, each client, including clients 1331 and 1341, connect to a different triple database (triple database 1311 and 1321, respectively, for clients 1331 and 1341) of conversational artificial intelligence (AI) server 1301. Each triple database 1311 and 1321 saves agent information corresponding to its respective client. By allowing multiple triple databases, each player has a different experience of the game. For example, each player has a different game experience from a single player game aspect.

In some embodiments, triple databases 1311 and 1321 are databases for storage and retrieval of triples through semantic queries. In some embodiments, triple databases 1311 and 1321 are triple-stores and purpose-built databases. In various embodiments, a triple is a set of three entities that codify a statement about semantic data in the form of a subject-predicate-object expression. For example, "John is 35" and "John knows Gordon" are each subject-predicate-object triples.

In the example shown, each memory of agent 1313, 1315, 1319, 1323, 1325, and 1329 has core information regarding the respective agent such as the agent's name, age, etc. In various embodiments, a player can talk to an agent. In various embodiments, each agent is a non-player character (NPC). Using a triple database, a player can talk with one or more NPC agents and the NPC agents will remember the newly learned information from the conversation. The information includes at least the sentences spoken and may include other information whether game related or not. When a new user starts a game, the information saved can be initialized and/or reset. Once saved for that user, the information may be kept and read whenever that user resumes the game, for example, after stopping the game and later resuming it from the last played state. In some embodiments, all saved information is saved using a triple format for each NPC agent in a triple database. In some embodiments, each player associated with a client can only access the game via the client's own saved memory store (e.g., triple database). For example, a client cannot access another client's triple database and therefore cannot access the saved knowledge of NPCs of another client.

In some embodiments, FIGS. 1-9 relate to a lightweight artificial intelligence (AI) framework for implementing game AIs 1333 and 1343. In some embodiments, game AIs 1333 and 1343 are trained as described by FIGS. 1-6 and used to solve AI planning problems as described by FIGS. 7 and 8. In some embodiments, game AIs 1333 and 1343 correspond to game AI component 1011 and/or AI loop 1017 of FIG. 10. In some embodiments, game AIs 1333 and 1343 are game AI platform 1101 of FIG. 11 and/or AI processor 1201 of FIG. 12. In some embodiments, conversational artificial intelligence (AI) server 1301 is conversational AI server 1051 of FIG. 10.

Figure 14:
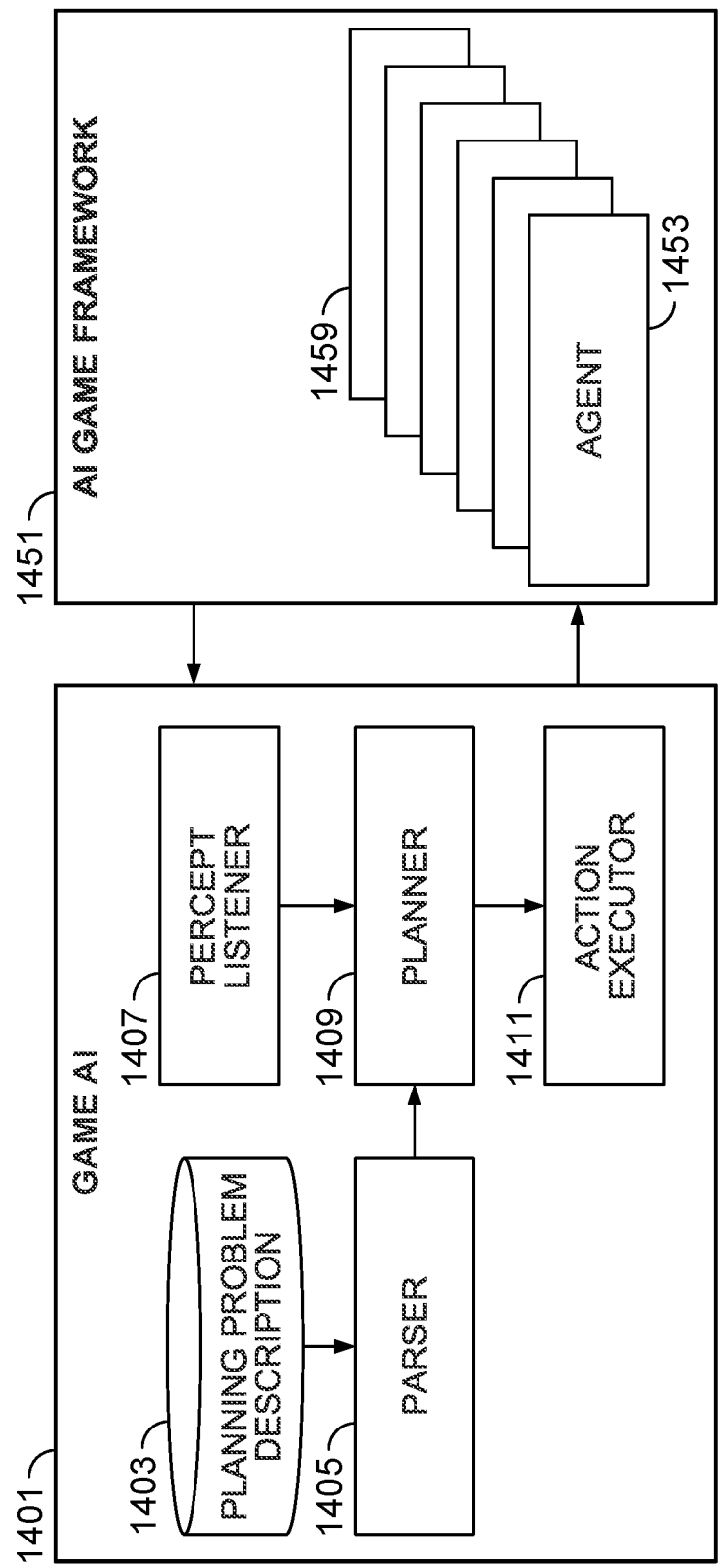
FIG. 14 is a block diagram illustrating components and communications for an embodiment of a scalable framework for autonomous artificial intelligence (AI) characters.

FIG. 14 is a block diagram illustrating components and communications for an embodiment of a scalable framework for autonomous artificial intelligence (AI) characters. In some embodiments, the communications shown in FIG. 14 are between a game AI component and a AI game framework and demonstrate an embodiment of the communication architecture for propagating changes in a scalable AI framework for a computer-based game environment. In the example shown, game AI component 1401 is communicatively connected to AI game framework 1451. Game AI component 1401 includes planning problem description 1403, parser 1405, percept listener 1407, planner 1409, and action executor 1411. AI game framework 1451 includes one or more agents and their associated context and state. AI game framework 1451 includes, for example, agents 1453 and 1459, among other agents shown but not numbered in the diagram of FIG. 14. In some embodiments, AI game framework 1451 is a non-player character (NPC) AI game framework and the agents of AI game framework 1451 are NPC agents.

In the example shown, game artificial intelligence (AI) component 1401 continuously generates AI problems and solutions. For example, for each iteration, game AI component 1401 generates and/or updates planning problem description 1403. Parser 1405 parses planning problem description 1403 to create an AI planning problem that planner 1409 solves. Action executor 1411 executes one or more actions of the solution. In some embodiments, percept listener 1407 receives input events from AI game framework 1451. For example, percept listener 1407 receives inputs such as audio and visual input events from AI game framework 1451 via a communication channel. In some embodiments, percept listener 1407 feeds the received input as input to planner 1409 to reflect an updated game environment. In various embodiments, the actions executed by action executor 1411 are received as input events to AI game framework 1451 and the agents of AI game framework 1451 are updated. For example, agents of AI game framework 1451, including agents 1453 and 1459, are updated based on the actions executed by of action executor 1411.

In some embodiments, when game artificial intelligence (AI) component 1401 generates a problem, creates a solution, and performs an action based on the solution, the performed action impacts the game environment and the agents of AI game framework 1451 such as agents 1453 and 1459. In some embodiments, agents, such as agents 1453 and 1459, receive environmental influences in a form of a percept.

In some embodiments, actions and/or changes corresponding to game objects change the game environment. For example, an action may result in the creation of a random sound or noise that can be heard by other characters. As another example, characters may hear a random sound or noise and react to it. As another example, a specific object's state in the game will impact the game environment. In various embodiments, these external changes can influence game artificial intelligence (AI) component 1401 and its action results by receiving input events via percept listener 1407. Input from percept listener 1407 has an effect on the generation of an AI plan, which directly changes the result of planner 1409. In this manner, AI game framework 1451 and game AI component 1401 influence each another.

In some embodiments, the Futurable game framework uses AI game framework 1451. In some embodiments, FIGS. 1-9 relate to a lightweight artificial intelligence (AI) framework for implementing game AI component 1401. In some embodiments, AI component 1401 is trained as described by FIGS. 1-6 and used to solve AI planning problems as described by FIGS. 7 and 8. In some embodiments, game AI component 1401 is game AI component 1011 and/or AI loop 1017 of FIG. 10. In some embodiments, game AI component 1401 is game AI platform 1101 of FIG. 11, AI processor 1201 of FIG. 12, and/or game AIs 1333 and 1343 of FIG. 13. In some embodiments, agents of AI game framework 1451, such as agents 1453 and 1459, utilize a triple database such as triple databases 1311 and 1321, to store context and state associated with each agent.

Figure 15:
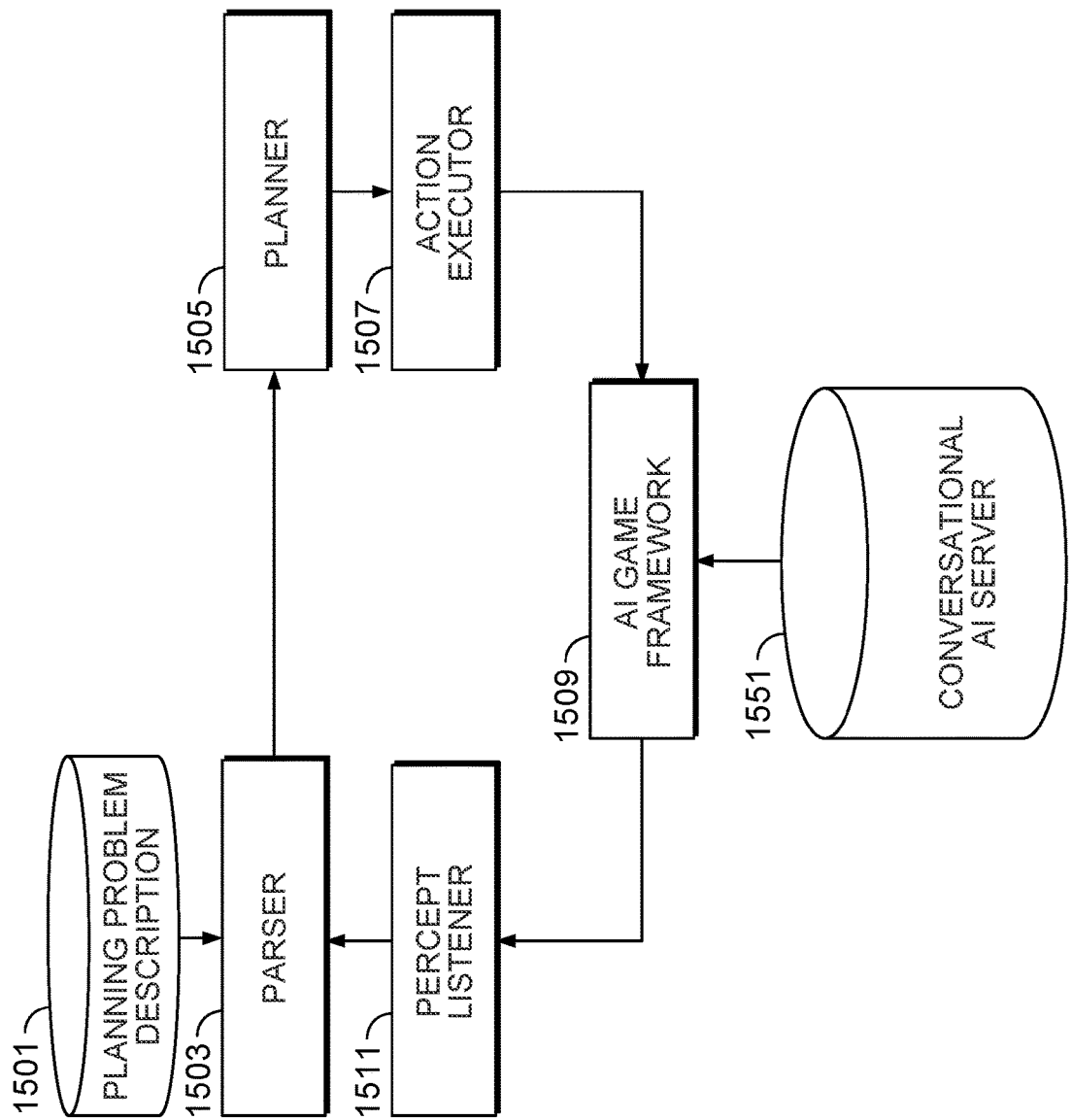
FIG. 15 is a block diagram illustrating the data flow between components of an embodiment of a scalable framework for autonomous artificial intelligence (AI) characters.

FIG. 15 is a block diagram illustrating the data flow between components of an embodiment of a scalable framework for autonomous artificial intelligence (AI) characters. In some embodiments, the data flow of FIG. 15 illustrates how a conversational AI server affects the game environment. In the example shown, the scalable AI framework of FIG. 15 includes planning problem description 1501, parser 1503, planner 1505, action executor 1507, AI game framework 1509, percept listener 1511, and conversational AI server 1551.

In some embodiments, actions are executed as a result of environmental changes and the executed actions will influence the game environment. For example, actions are executed by action executor 1507 as a result of changes related to artificial intelligence (AI) game framework 1509 and detected by percept listener 1511. Once executed, the actions of action executor 1507 in turn impact AI game framework 1509. In various embodiments, in addition to environmental changes from AI framework 1509 and actions executed by action executor 1507, conversations also impact the game environment. In some embodiments, a percept includes conversations and can change AI planning problems and plans. For example, in the way random sounds or noises can impact the game environment, so can conversations.

In the example shown, conversational artificial intelligence (AI) server 1551 feeds into AI game framework 1509. By coupling conversational AI server 1551 with AI game framework 1509, agents (or NPCs) of AI game framework 1509 receive conversation input and update their context and state based on the conversations of conversational AI server 1551. In some embodiments, each conversation of conversational AI server 1551 affects the sender and receiver agents. For example, in some embodiments, all participants of a conversation are impacted by a conversation. As another example, when NPC1 talks to NPC2, the information of NPC1 affects the belief of NPC2. NPC2 updates its belief and generates a new plan to reach a new goal. At the same time, NPC1 updates its belief that it provided information to NPC2. In some embodiments, beliefs are used to represent the informational state of the agent. In some embodiments, the informational state of an agent is the agent's understanding or beliefs about the world and includes its beliefs about itself and other agents. In some embodiments, beliefs can include inference rules and allow forward chaining that results in new beliefs. In some embodiments, a belief system is used to represent an agent's understanding of the world. A belief may be held by the agent to be true but the belief itself may not necessarily be true and may change in the future. For example, NPC1 has a true belief that NPC2 is awake. However, at a later time, NPC2 is now asleep. Absent other input, with respect to NPC1, NPC1 still believes that NPC2 is awake even though the belief is no longer true.

In some embodiments, a player and a non-player character (NPC) agent can communicate using natural language. In some embodiments, NPCs can share information with one another. In various embodiments, the conversation between a player and an NPC can change the game. For example, a conversation between a player and an NPC changes the game environment including the NPC's understanding of the game world. In some scenarios, in the event NPCs share information with one another, for example, NPC1 shares information of a conversation with the player with NPC2, a receiving NPC, such as NPC2, can use the shared information to determine its next action. In some embodiments, when a character determines its next action set it can refer to the statements shared with it by other NPCs and/or by the player.

In some embodiments, the game framework used in the Futurable life simulation game uses artificial intelligence (AI) game framework 1509. In some embodiments, conversational artificial intelligence (AI) server 1551 is conversational AI server 1051 of FIG. 10 and 1301 of FIG. 13. In some embodiments, planning problem description 1501, parser 1503, planner 1505, action executor 1507, AI game framework 1509, and percept listener 1511 are implemented using game AI component 1401 and AI game framework 1451 of FIG. 14 using their respective corresponding components, planning problem description 1403, parser 1405, planner 1409, action executor 1411, AI game framework 1451, and percept listener 1407. In some embodiments, FIGS. 1-9 relate to a lightweight artificial intelligence (AI) framework for implementing the data flow of FIG. 15. In some embodiments, planner 1505 is trained as described by FIGS. 1-6 and used to solve AI planning problems as described by FIGS. 7 and 8. In some embodiments, game AI component 1011 and/or AI loop 1017 of FIG. 10, game AI platform 1101 of FIG. 11, AI processor 1201 of FIG. 12, and/or game AIs 1333 and 1343 of FIG. 13 are used to implement the data flow of FIG. 15.

Figure 16:
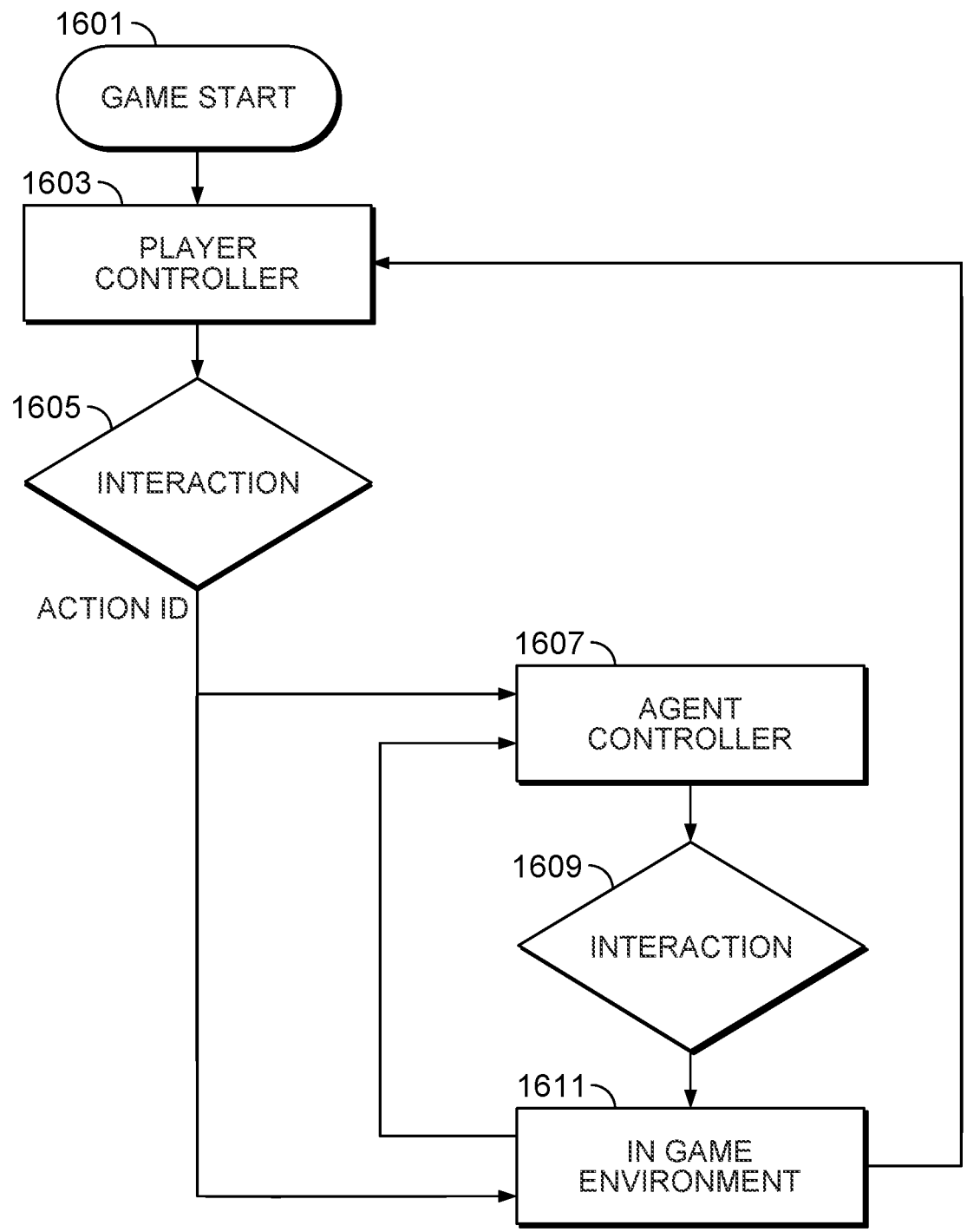
FIG. 16 is a flowchart illustrating an embodiment of a game flow process for a player agent.

FIG. 16 is a flowchart illustrating an embodiment of a game flow process for a player agent. In some embodiments, the game flow of FIG. 16 reflects how a player and an agent, such as a non-player character (NPC) agent, interact with one another to impact the game environment. For example, a human player can change the environment and will influence NPC agents and their actions. The change in an agent's game environment results in a new AI problem and plan. In various embodiments, the results plan and subsequent actions are in response to the change in the game caused by the human player.

At 1601, a game starts. For example, a player starts a new game.

At 1603, a player controller receives input from a player and from the in-game environment at 1611. For example, a human player controls her or his player agent by touching the screen to interact with the game environment. As another example, in-game environment inputs are received that may include objects that have moved, obstacles that are detected, non-player character (NPC) agent actions, etc.

At 1605, a player agent interaction is performed. For example, an action based on the player controller at 1603 using human player and in-game environment inputs is performed.

At 1607, the agent controller receives input from the interaction at 1605 and the in-game environment at 1611. In various embodiments, the agent controller detects changes to the agent's environment. For example, changes may be the result of an agent's action(s), a player's action(s), and/or other non-player character (NPC) actions, among others. In some embodiments, agent controller is an NPC controller. For example, an NPC agent controller detects input from the player and/or other NPC agents. As another example, an NPC detects an action executed by the player and other NPC agents. In some embodiments, the agent controller detects its own actions and/or results of interactions initiated by itself.

At 1609, an interaction is performed. For example, a non-player character (NPC) agent performs an interaction based on input from agent controller at 1607. In some embodiments, the interaction is associated with the percept-belief update-planning-action sequence of FIG. 17. In some embodiments, an interaction at 1609 may include updating an agent's belief set based on sensor inputs. In some embodiments, the interaction may include taking the best action to reach a goal based on the updated belief set. For example, in the event an Agent A is in the room with an air conditioner turned on and another agent or player turns off the air conditioner, the properties of the air conditioner in Agent A's belief set are updated to reflect that change in the status of the air conditioner. For example, Agent A may update its belief set to reflect that the air conditioner is now off. In some embodiments, a condition associated with a belief is updated from "air conditioner: on" to "air conditioner: off." In the event Agent A senses that the air conditioner is off and the temperature is rising, Agent A can infer that the air conditioner affects the temperature. In the event Agent A has a constraint that it cannot sleep when the temperature is high then Agent A may perform a "turn on air conditioner" action to turn on the air conditioner. In various embodiments, this precept-belief update-planning-action sequence is described in further detail with respect to FIGS. 17-19.

At 1611, the in-game environment is updated based on the player interaction at 1605 and the interaction at 1609. For example, a player interaction at 1605 and/or an agent interaction at 1609 results in an updated in-game environment. The updated in-game environment is fed back to the player controller at 1603 and the agent controller at 1607.

In some embodiments, the Futurable life simulation game utilizes the player agent game flow of FIG. 16. In some scenarios, the player agent is the main environment changer in a Futurable game. For example, the player agent will repeatedly execute actions that influence the game environment and result in a new AI planning problem, which in turn influences the game. In various embodiments, a player's interactions include moving, talking, and interacting with objects, among others. Each of the resulting actions can change the game flow and/or an NPC agent's action.

In some embodiments, FIGS. 1-9 relate to a lightweight artificial intelligence (AI) framework for implementing the agent logic of FIG. 16. In some embodiments, the planning performed at 1615 uses a lightweight AI framework and is trained as described by FIGS. 1-6 and used to solve AI planning problems as described by FIGS. 7 and 8. In various embodiments, the agent logic utilizes the autonomous AI framework of FIGS. 11-15. In some embodiments, the agent determines what action to execute based on AI loop 1017 of FIG. 10, game AI platform 1101 of FIG. 11, AI processor 1201 of FIG. 12, and/or game AIs 1333 and 1343 of FIG. 13. In some embodiments, the in-game environment at 1611 corresponds to in-game environment 1031 of FIG. 10, 1151 of FIG. 11, and/or 1221 of FIG. 12.

Figure 17:
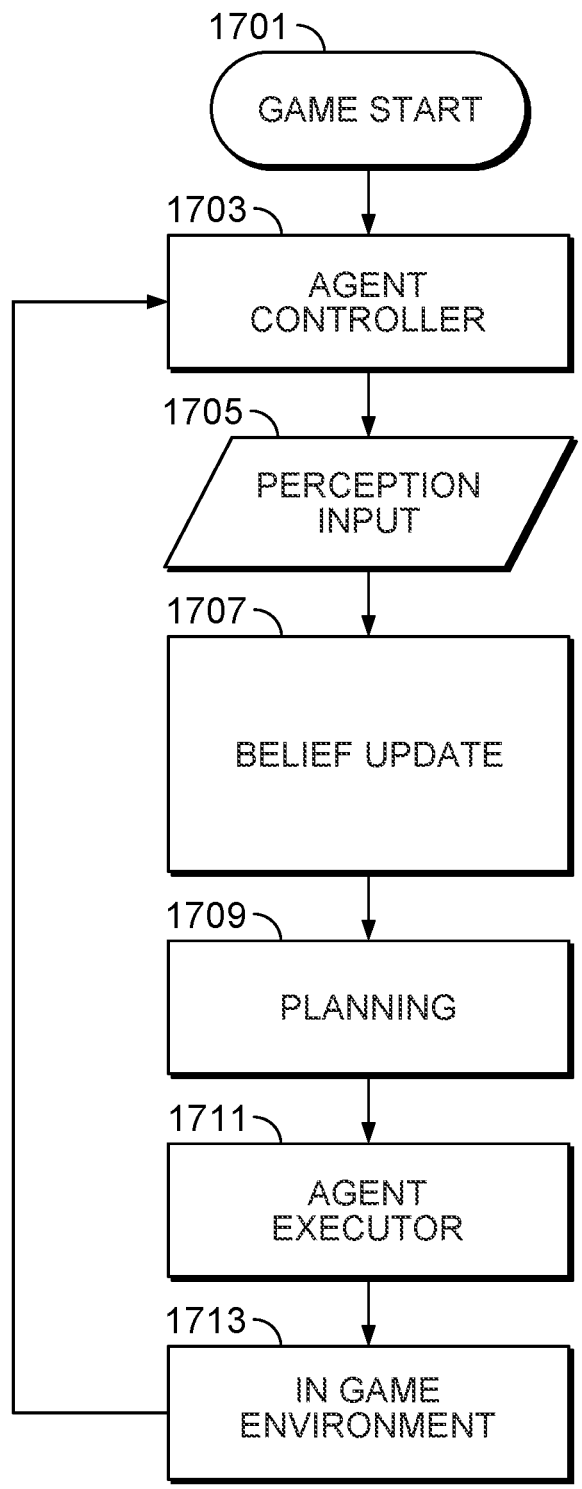
FIG. 17 is a flowchart illustrating an embodiment of a process for implementing an autonomous artificial intelligence (AI) character.

FIG. 17 is a flowchart illustrating an embodiment of a process for implementing an autonomous artificial intelligence (AI) character. In some embodiments, a non-player character (NPC) agent in a computer-based game environment is implemented using an autonomous AI character or agent. In various embodiments, an NPC is not a playable agent. Instead it continues to operate based on its initial AI plans. For example, in some embodiments, an initial AI plan is described using an initial problem and domain specification. In some embodiments, in the event the human player does not interact with the game, an NPC performs the same job(s) and pre-designed routine(s) over and over again. In some embodiments, an NPC's action(s) can change as the time in the game passes. In various embodiments, in the event a change is initiated from a source other than the NPC, the changes are recognized by the NPC and will be received as a percept. These changes will result in an updated AI problem and as a result new AI plans will be generated. In various embodiments, the flowchart of FIG. 17 describes a precept-belief update-planning-action sequence of an autonomous AI agent.

At 1701, a game starts. For example, a new game is started by a user or an administrator of the game.

At 1703, an agent controller is processed. For example, an agent controller may be initialized and an initial artificial intelligence (AI) planning problem for an agent is parsed and an initial AI plan is constructed. In some embodiments, an initial set of beliefs for the agent is created. In some embodiments, the agent controller is updated based on the in-game environment of 1713. In some embodiments, the agent controller is a non-player character (NPC) controller or an NPC agent controller.

At 1705, perception input is received. For example, a perception input is created based on sensor input such as visual and/or audio input. As another example, in some embodiments, one or more changes in the in-game environment at 1713 are detected as visual and/or audio changes via the agent controller of 1703 and a perception input is created to reflect the detected changes.

At 1707, a belief is updated. For example, a belief is updated and/or added based on the perception input at 1705.

At 1709, planning is performed. For example, artificial intelligence (AI) planning is performed to solve an AI planning problem based on the updated set of beliefs at 1707.

At 1711, an action is executed. For example, an action executor at 1711 executes the first action of a solution plan to the artificial intelligence (AI) planning problem.

At 1713, the in-game environment is updated. For example, based on the action executed at 1711, the in-game environment is updated to reflect the action and/or consequences of the action. For example, the non-player character (NPC) agent may have consumed an object, moved an object, moved to a new location, etc. The updated in-game environment at 1713 and/or changes to the in-game environment at 1713 are used for perception input at 1705. In some embodiments, the transition from perception input at 1705 to the in-game environment at 1713 via belief update 1707, planning 1709, and action executor 1711 form an autonomous AI agent loop.

In some embodiments, FIGS. 1-9 relate to a lightweight artificial intelligence (AI) framework for implementing the process of FIG. 17. In some embodiments, the planning performed at 1709 uses a lightweight AI framework and is trained as described by FIGS. 1-6 and used to solve AI planning problems as described by FIGS. 7 and 8. In various embodiments, the process of FIG. 17 utilizes the autonomous AI framework of FIGS. 11-16. In some embodiments, the flow described by FIG. 17 is performed by AI loop 1017 of FIG. 10, game AI platform 1101 of FIG. 11, AI processor 1201 of FIG. 12, game AIs 1333 and 1343 of FIG. 13, and/or game AI component 1401 of FIG. 14. In some embodiments, the in-game environment at 1713 corresponds to in-game environment 1031 of FIG. 10, 1151 of FIG. 11, 1221 of FIG. 12, and/or 1611 of FIG. 16. In some embodiments, the agent controller of 1703 is the agent controller of 1607 of FIG. 16.

Figure 18:
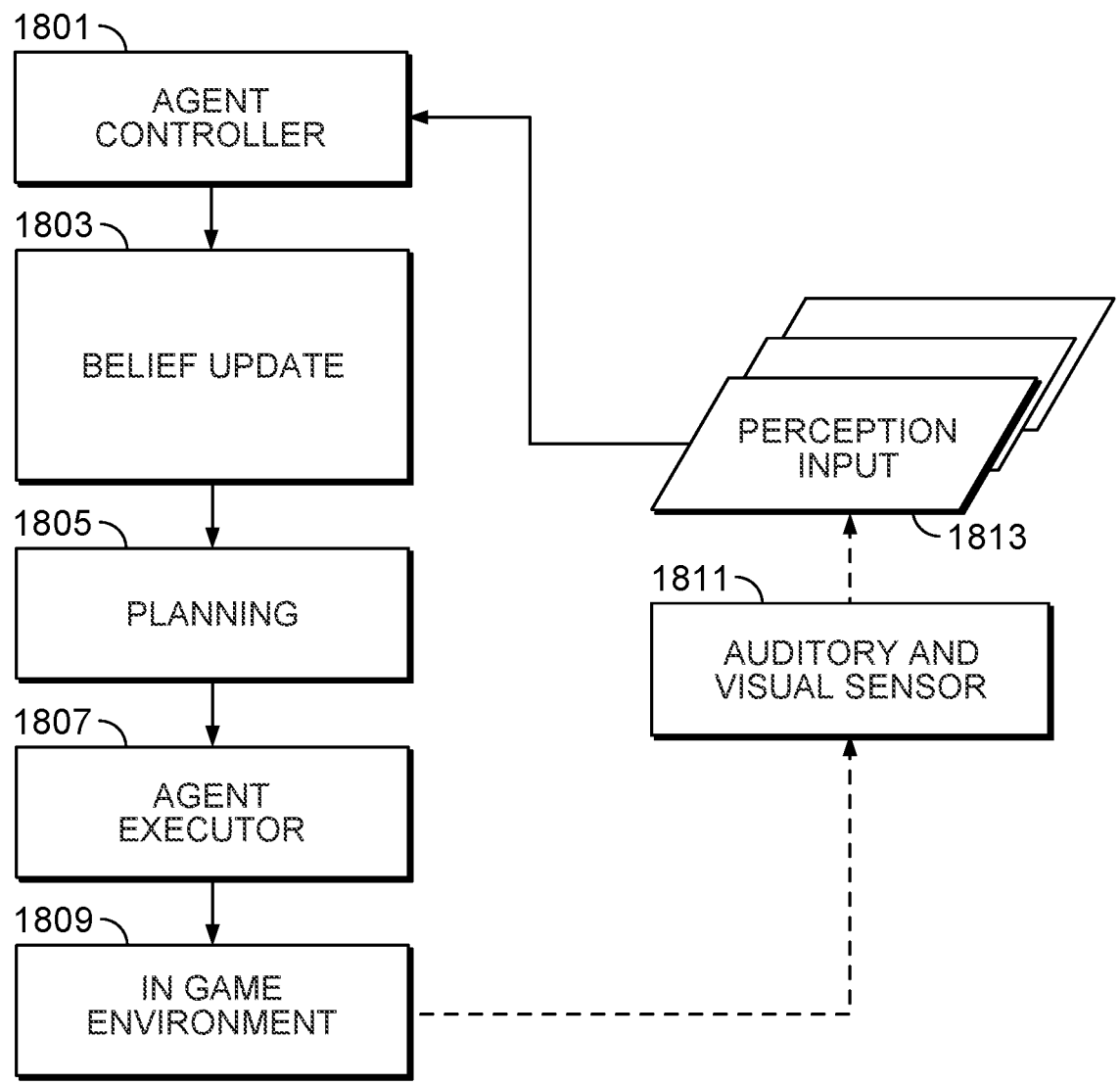
FIG. 18 is a flowchart illustrating an embodiment of a process for implementing an autonomous artificial intelligence (AI) character that responds to percepts.

FIG. 18 is a flowchart illustrating an embodiment of a process for implementing an autonomous artificial intelligence (AI) character that responds to percepts. For example, the process of FIG. 18 illustrates how percepts affect the process of AI planning and reasoning. In the event a game environment is changed, an autonomous AI character such as a non-player character (NPC) receives percepts corresponding to the changes and modifies its set of beliefs. The change in the belief set changes the AI planning problem and results in a new AI plan, a new action that is executed, and eventually causes another change to the game environment.

In some embodiments, a sensor module includes auditory and visual sensors to perceive auditory and visual changes. In some embodiments, an auditory percept is a sound that occurs near or in the surrounding environment of the character. The sound includes not only the sound of a conversation between characters (for example, a conversation between a player and a non-player character (NPC) or between two NPCs, etc.), but also noises such as footsteps, wind, rain, and thunder, among others. In various embodiments, the target object (i.e., the source of sound) should be within a certain range or threshold of the autonomous artificial intelligence (AI) computer character. In the event the source of a sound is generated outside the range of an autonomous AI character, the character cannot hear the sound or use it as a source that changes its AI planning problem. In some embodiments, a visual percept is a visible object in the surrounding environment of the character. The visual percept should also be within a certain range or threshold to function as a percept. In some embodiments, a sensory detection property belief is utilized to determine whether an input event, such as an auditory or visual event, is detected. For example, a sensory detection property belief may be a threshold range that a sound can be heard and/or an object can be seen. In some embodiments, a sensory detection property belief is a visibility property used to determine whether an object is visible from the perspective of a character. In some embodiments, a sensory detection property belief is a hearing property used to determine whether a sound is audible from the perspective of a character.

In the flowchart of FIG. 18, the steps of an agent controller at 1801, belief update at 1803, planning at 1805, action executor at 1807, in-game environment at 1809, and perception input at 1813 utilize the process of FIG. 17 and their similarly named steps and/or components. The flowchart of FIG. 18 includes an auditory and visual sensor at 1811 that detects audible and/or visual changes in the in-game environment at 1809. In some embodiments, the changes are one or more percepts. In various embodiments, perception input at 1813 is created based on the detected audible and/or visual changes. The perception input at 1813 is used to update the agent's belief set at 1803.

In some embodiments, FIGS. 1-9 relate to a lightweight artificial intelligence (AI) framework for implementing the process of FIG. 18. In some embodiments, the planning performed at 1805 uses a lightweight AI framework and is trained as described by FIGS. 1-6 and used to solve AI planning problems as described by FIGS. 7 and 8. In various embodiments, the process of FIG. 18 utilizes the autonomous AI framework of FIGS. 11-17. In some embodiments, the flow described by FIG. 18 is performed by AI loop 1017 of FIG. 10, game AI platform 1101 of FIG. 11, AI processor 1201 of FIG. 12, game AIs 1333 and 1343 of FIG. 13, and/or game AI component 1401 of FIG. 14. In some embodiments, the in-game environment at 1809 corresponds to in-game environment 1031 of FIG. 10, 1151 of FIG. 11, 1221 of FIG. 12, and/or 1611 of FIG. 16. In some embodiments, the agent controller of 1801 is the agent controller of 1607 of FIG. 16.

Figure 19:
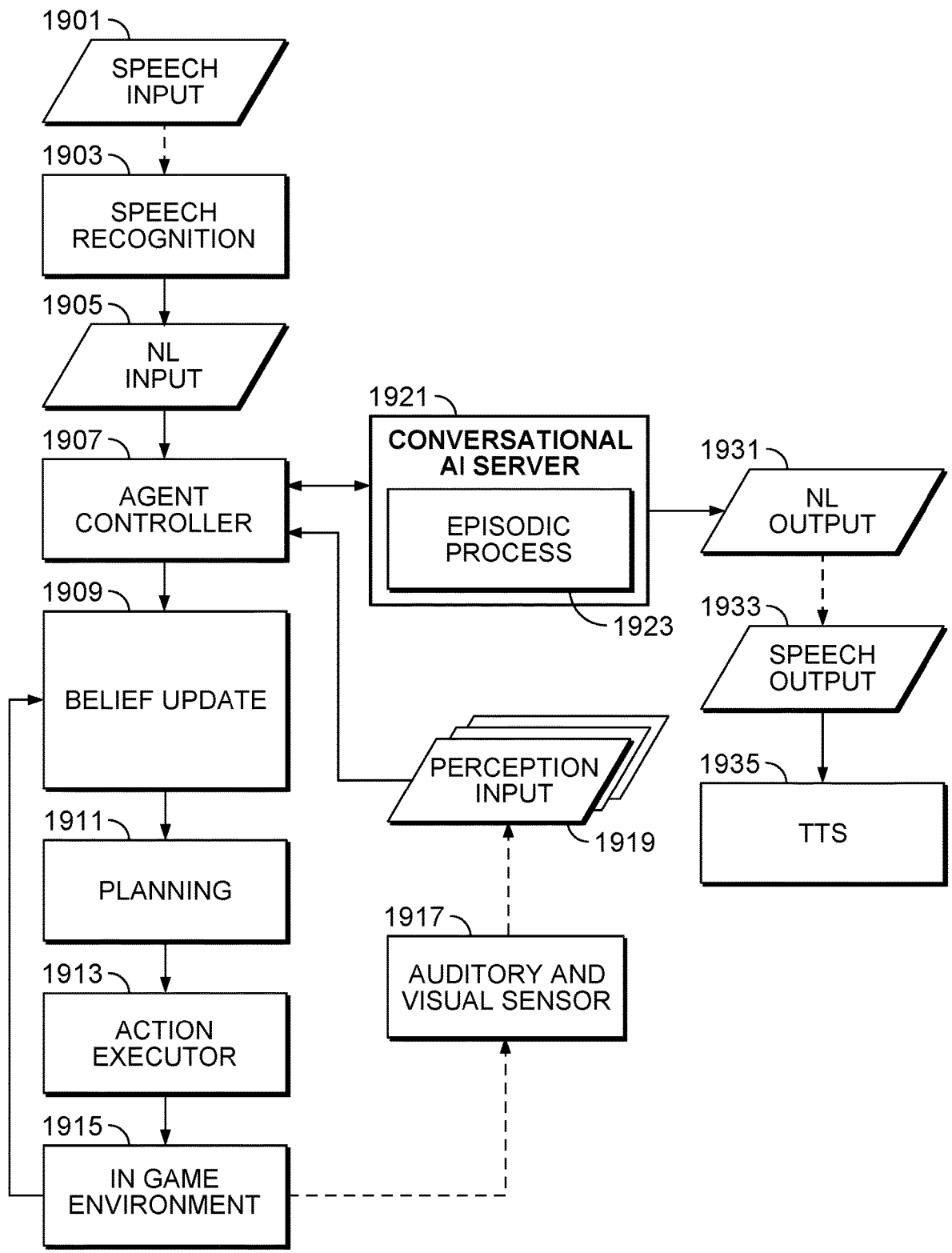
FIG. 19 is a flowchart illustrating an embodiment of a process for implementing an autonomous artificial intelligence (AI) character that responds to natural language input.

FIG. 19 is a flowchart illustrating an embodiment of a process for implementing an autonomous artificial intelligence (AI) character that responds to natural language input. In some embodiments, the process of FIG. 19 is used to process natural languages spoken to and/or heard by an autonomous AI non-player character (NPC). In various embodiments, a player can interact with an autonomous AI NPC using natural languages. For example, the Futurable life simulation game utilizes the process of FIG. 19 to allow players to interact with NPC agents using natural languages. When a player talks or inputs a sentence to an NPC, the game system recognizes the provided input and utilizes a conversational AI server to process the voice input and provide an answer. In some embodiments, a text-based answer is converted to voice speech using a text-to-speech technique. In some embodiments, the answer is provided both in text and audibly. For example, in some embodiments, an audible version of the answer is provided using a text-to-speech technique while the text is displayed on a game device display. In some embodiments, these changes also influence the flow of the game, which causes a belief update and subsequent changes to the game environment.

The flowchart of FIG. 19 builds on the flowchart of FIG. 18. The steps of agent controller at 1907, belief update at 1909, planning at 1911, action executor at 1913, in-game environment at 1915, auditory and visual sensor at 1917, and perception input at 1919 utilize the process of FIG. 18 and their similarly named steps and/or components. The flowchart of FIG. 19 includes additional steps and/or components speech input at 1901, speech recognition at 1903, natural language (NL) input at 1905, conversational artificial intelligence (AI) server at 1921, natural language (NL) output at 1931, speech output at 1933, and text-to-speech (TTS) at 1935. In addition, conversational AI server 1921 includes episodic process at 1923.

At 1901, speech input is received. For example, a user speaks to an autonomous artificial intelligence (AI) character. In some scenarios, the speech is a query, a declaration, or another type of speech. In some embodiments, a player uses a microphone on the device to send verbal sentences.

At 1903, speech input is recognized. For example, the speech input of 1901 is recognized as human speech and converted to the natural language input of 1905. In some embodiments, the speech input of 1901 is converted into natural language speech parts and sent to the game framework. In some embodiments, the output of speech recognition is a natural language input created by processing the speech input of 1901 with a speech recognition and natural language understanding module.

At 1905, natural language (NL) input is received. For example, the output of speech recognition at 1903 is a natural language input. In some embodiments, the speech is converted to natural language input so that it can be used to update the belief set of the agent and to determine possible actions.

At 1907, an agent controller receives the natural language (NL) input of 1905, responses from the conversational artificial intelligence (AI) server of 1921, and perception input of 1919. In various embodiments, the agent controller updates the agent functionality based on the received natural language input as well as answers to the natural language input as processed by the conversational AI server of 1921 and perception input. In some embodiments, the natural language input is then fed to the conversational AI server of 1921 and the belief update of 1909. In some embodiments, natural language speech segments are sent to the conversational AI server of 1921 with the identity (e.g., name or user identifier, etc.) of the agent. In some embodiments, the conversational AI server of 1921 generates an answer received by the agent controller for the natural language input sentences. In some embodiments, the agent controller is a non-player character (NPC) controller or an NPC agent controller.

At 1909, a belief is updated. For example, a belief is updated based on the natural language (NL) input of 1905 (as processed by the agent controller of 1907) as well as the in-game environment of 1915. In the example shown, the output of agent controller 1907 and the in-game environment of 1915 can influence the belief set of the agent. In some embodiments, the changes to the environment that occur during a conversation are used to update the agent's set of beliefs. In various embodiments, any changes to the belief set can change the artificial intelligence (AI) planning problem and the resulting actions of the agent's action list.

At 1921, a conversational artificial intelligence (AI) server processes the natural language input. In some embodiments, the input is stored using the episodic process of 1923 in a memory of an agent such as a non-player character (NPC) agent. In some embodiments, the conversational AI server processes the input and generates an answer response that is provided to the agent controller of 1907. In some embodiments, the natural language input sentences are received as speech segments and include an agent identifier. In the event the input sentence contains specific data, including basic information, the conversational AI server updates the saved information. In some embodiments, information received by the conversational AI server is stored using the episodic process of 1923 in an individual memory associated with the agent. In various embodiments, the generated response is returned as an input to the game via the agent controller of 1907 and/or detected by the auditory and visual sensor of 1917.

At 1931, a natural language (NL) output is generated. Based on the conversational artificial intelligence (AI) server of 1921, a natural language response is created. In some embodiments, a natural language generator creates the natural language output. In some embodiments, grammatical and word substitutions are made to generate an NL output. For example, name and the appropriate pronouns may be substituted for one another.

At 1933, speech output is created. In some embodiments, the natural language (NL) output of 1931 is converted to speech. In some embodiments, the converted speech is in text form. In some embodiments, the text speech is displayed on a device screen of a game device for the player to read.

At 1935, a text-to-speech (TTS) module is applied. For example, the text of the speech output of 1933 is converted to one or more spoken sentences using a TTS module and the resulting audio response is played. In some embodiments, a TTS engine is used to vocalize the speech output of 1933. In various embodiments, the generated speech output returns to the game as an input (not shown) and may influence the in-game environment of 1915. For example, the vocalized speech at 1935 may be detected by the auditory and visual sensor of 1917 and used to create the perception input of 1919.

In some embodiments, FIGS. 1-9 relate to a lightweight artificial intelligence (AI) framework for implementing the process of FIG. 19. In some embodiments, the planning performed at 1911 uses a lightweight AI framework and is trained as described by FIGS. 1-6 and used to solve AI planning problems as described by FIGS. 7 and 8. In various embodiments, the process of FIG. 19 utilizes the autonomous AI framework of FIGS. 11-18. In some embodiments, the flow described by FIG. 19 is performed in part by AI loop 1017 of FIG. 10, game AI platform 1101 of FIG. 11, AI processor 1201 of FIG. 12, game AIs 1333 and 1343 of FIG. 13, and/or game AI component 1401 of FIG. 14. In some embodiments, the in-game environment at 1915 corresponds to in-game environment 1031 of FIG. 10, 1151 of FIG. 11, 1221 of FIG. 12, and/or 1611 of FIG. 16. In some embodiments, conversational AI server 1921 is conversational AI server 1051 of FIG. 10, 1301 of FIG. 13, and/or 1551 of FIG. 15. In some embodiments, the agent controller of 1907 is the agent controller of 1607 of FIG. 16.

Figure 20:
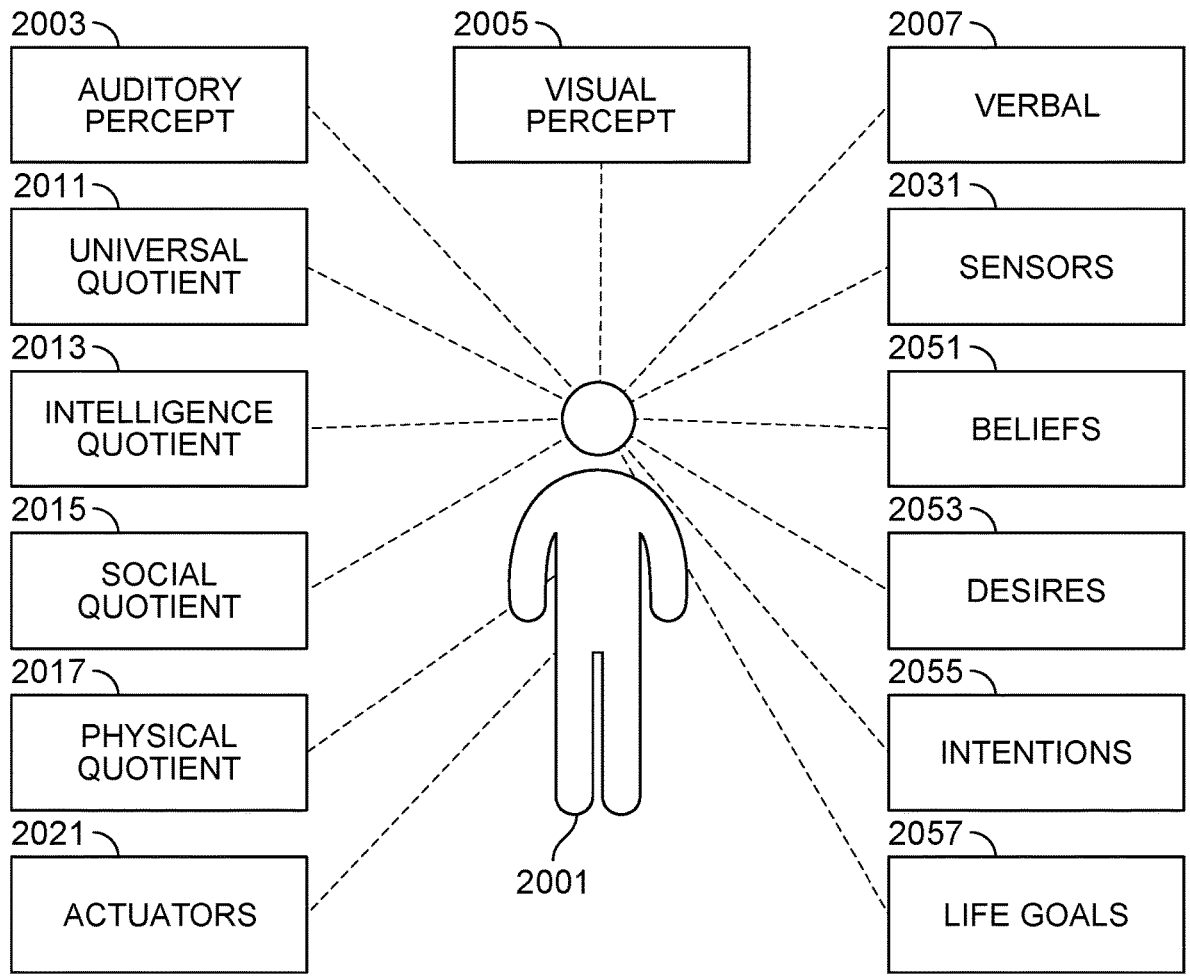
FIG. 20 is a block diagram illustrating an exemplary set of factors utilized by an embodiment of a computer-based game using autonomous artificial intelligence (AI) characters.

FIG. 20 is a block diagram illustrating an exemplary set of factors utilized by an embodiment of a computer-based game using autonomous artificial intelligence (AI) characters. In some embodiments, the Futurable life simulation game utilizes the factors of FIG. 20. In some embodiments, percepts and quotients are essential for changing the game environment. These elements update the AI problem of the autonomous AI character and result in changes to the AI plan solution that is executed to solve the goals set forth by the autonomous AI character. In various scenarios, this sequence continues until the autonomous AI character's life goal is reached.

In the example shown, autonomous AI character 2001 is influenced by the factors auditory percept 2003, visual percept 2005, verbal 2007, universal quotient 2011, intelligence quotient 2013, social quotient 2015, physical quotient 2017, actuators 2021, sensors 2031, beliefs 2051, desires 2053, intentions 2055, and life goals 2057.

In some embodiments, auditory percept 2003 is a percept of a sound and may include conversations between a player and a non-player character (NPC), between an NPC and an NPC, and surrounding noises.

In some embodiments, visual percept 2005 is a percept of a visual that may be determined by the distance of the object from the character.

In some embodiments, verbal 2007 is a verbal factor based on talk from a player to the non-player character (NPC).

In some embodiments, universal quotient 2011 is a universal index of the autonomous artificial intelligence (AI) character. In some embodiments, universal quotient 2011 is the sum of intelligence quotient 2013, social quotient 2015, and physical quotient 2017. In some embodiments, universal quotient 2011 includes additional indices not factored into intelligence quotient 2013, social quotient 2015, and physical quotient 2017 such as additional quotients not displayed in the exemplary embodiment.

In some embodiments, intelligence quotient 2013 is an intelligence index of the autonomous artificial intelligence (AI) character. In some embodiments, intelligence quotient 2013 can be increased by studying.

In some embodiments, social quotient 2015 is a social index of the autonomous artificial intelligence (AI) character. In some embodiments, social quotient 2015 can be increased by engaging in conversations.

In some embodiments, physical quotient 2017 is a physical index of the autonomous artificial intelligence (AI) character. In some embodiments, physical quotient 2017 can be increased by working or training.

In some embodiments, actuators 2021 are factors from agents including non-player characters (NPCs) and autonomous artificial intelligence (AI) characters that play an action from a calculated action list.

In some embodiments, sensors 2031 are sensors associated with the autonomous artificial intelligence (AI) character. In some embodiments, the sensors are the character's own sensors that detect input such as audio and visual input. In some embodiments, sensors of an autonomous AI character sense both sound and visual percepts. For example, sensors of AI non-player characters (NPCs) in the Futurable life simulation game sense both sound and visual percepts.

In some embodiments, beliefs 2051 are problems that can be edited with percepts and interaction. In some embodiments, desires 2053 are required objectives that need to be accomplished for life goals 2057. In some embodiments, desires 2053 are smaller objectives or sub-objectives of life goals 2057. In some embodiments, intentions 2055 are a plan and corresponding actions to achieve desires 2053. In some embodiments, life goals 2057 are the ultimate goals a character wants to achieve. In various embodiments, both human players and autonomous artificial intelligence (AI) characters have a life goal. In some embodiments, one or more life goals may be held by a player and/or autonomous AI character.

In some embodiments, FIGS. 1-9 relate to a lightweight artificial intelligence (AI) framework for processing the factors of FIG. 20. In some embodiments, the factors of FIG. 20 are used to train a machine learning model as described by FIGS. 1-6 and used in solving AI planning problems as described by FIGS. 7 and 8. In various embodiments, the factors of FIG. 20 are utilized by the autonomous AI framework of FIGS. 11-19. In some embodiments, the factors of FIG. 20 are utilized by AI loop 1017 of FIG. 10, game AI platform 1101 of FIG. 11, AI processor 1201 of FIG. 12, game AIs 1333 and 1343 of FIG. 13, and/or game AI component 1401 of FIG. 14. In some embodiments, the factors of FIG. 20 impact the in-game environment as reflected by in-game environment 1031 of FIG. 10, 1151 of FIG. 11, 1221 of FIG. 12, 1611 of FIG. 16, 1713 of FIG. 17, 1809 of FIG. 18, and/or 1915 of FIG. 19.

Game Features Possible with a Scalable Framework for Autonomous Artificial Intelligence (AI) Characters In some embodiments, FIGS. 1-20 may be utilized to create a computer-based game with multiple autonomous artificial intelligence (AI) characters. For example, a computer-based game can be created with the following game features using a scalable framework for autonomous artificial intelligence (AI) characters. In various embodiments, the autonomous AI characters are implemented using autonomous AI agents. For example, a non-player character (NPC) can be implemented using an autonomous AI NPC agent.

Life-simulation artificial intelligence (AI) game—The goal of the game is to experience AI simulation for a better future. Players explore a virtual world and receive various experiences for survival. Actions that the player performs may affect the life-goal of other autonomous AI characters and also the world-state. A game that is more flexible and where players can experience various situations is possible using a scalable framework for autonomous artificial intelligence (AI) characters.

Full autonomy—The non-player characters (NPCs) are autonomous and make individual life-goal driven decisions, while also possibly sharing information with each other. This autonomy allows NPCs to adapt to the environment and differentiate their actions. For example, environmental changes include: objects moved to another position, specific noise from their surroundings, conversation with others, etc.

Conversational artificial intelligence (AI)—Players and non-player characters (NPCs) communicate with each other in natural language and NPCs can share their own information with each other. Conversations between players and NPCs can change the game situation. An autonomous AI character can obtain data from another autonomous AI character via one or more conversations. The newly learned information may be used to determine the autonomous AI character's next actions. When determining the next action set, an autonomous AI character can refer to the learned information such as the statement shared from a conversation with another NPC.

Highly scalable—A deep learning artificial intelligence (AI) framework that is lightweight allows scaling the number of simultaneously active non-player characters (NPCs) to a large number (e.g., at least hundreds of NPCs) even on commonly available hardware such as a regular cellphone. In addition to a variety of hardware devices, the disclosed scalable framework for autonomous AI characters is compatible with many different platforms and devices. For example, the Futurable AI system can be used in games on many different platforms and with many different devices. The AI engine within Futurable utilizes the disclosed scalable AI framework and is compatible with a variety of different target platforms and devices.

Intelligent user interface (UI)—A dynamic natural language-based graphical user interface (GUI) automatically and most ergonomically adapts to a dynamically changing game context and artificial intelligence problems that constantly change based on changes in the game state. In various embodiments, a GUI utilizing dynamic natural language is both ergonomic and adaptable to a variety of game scenarios. For example, in some embodiments, a player can invoke a GUI menu without touching the screen by saying the word "menu." In addition, in various embodiments, fewer objects are displayed on the GUI as touch targets are not needed since the GUI is voice activated. In some embodiments, a minimum number of objects will be displayed based on the context of the current game situation.

Autonomous Elements and Features Possible with a Scalable Framework for Autonomous Artificial Intelligence (AI) Characters In some embodiments, the following autonomous elements and features are possible with a scalable framework for autonomous artificial intelligence (AI) characters. The following elements are properties of intelligent agents such as autonomous AI characters. In some embodiments, the Futurable life simulation game includes one or more of the following autonomous features. In some embodiments, FIGS. 1-20 may be utilized to create a computer-based game with the following autonomous elements and features.

In some embodiments, modules for supporting autonomous elements and features include: domain & initial problem parser, conversational artificial intelligence (AI) server, planner, action executor, and percept listener. In various embodiments, the modules are described above with respect to FIGS. 1-20.

Artificial Intelligence (AI) System using a Scalable Framework for Autonomous AI Characters In some embodiments, the disclosed scalable framework for autonomous artificial intelligence (AI) characters is used to create an embodiment of an AI system. For example, the Futurable life simulation game utilizes an embodiment of the AI system. In some embodiments, the AI system is a lightweight system and used to create non-player characters (NPCs) that are autonomous AI NPCs.

In some embodiments, all non-player characters (NPCs) act based on an artificial intelligence (AI) system. In some embodiments, each character of the AI system is seen as an agent, who wants to achieve a goal. In various embodiments, the AI system allows each NPC to have its own purpose(s). To achieve that purpose, each NPC continuously senses changes in its environment and adapts its AI plan solutions. In some embodiments, each NPC keeps sensing around while creating plans.

In some embodiments, each non-player character (NPC) has its own information that is saved into an information store and used as data for deciding its own actions. To decide an NPC's next action, an NPC may have its own goals that it wants to achieve. In various embodiments, the goals of an NPC influence the NPC's actions. In some embodiments, each NPC has its own plan for reaching its own goal(s).

In some embodiments, when a non-player character (NPC) is out of actions from its action list to execute, the NPC detects whether there are changes to its environmental information. In the event changes exist, the artificial intelligence (AI) system will refer to the new data to create a new problem based on the existing problem and domain. The new problem is used to create a new action set for the NPC.

In some embodiments, the artificial intelligence (AI) system includes a sequence that makes state changes for each NPC. For example, an NPC changes from its current state to its next state as it advances towards a goal. In some embodiments, each NPC of the AI system can support having a different state, different state changes, and different action set changes.

Non-player character (NPC) game elements

In some embodiments, the autonomous artificial intelligence (AI) non-player characters (NPCs) implemented using a scalable framework for autonomous AI characters have the following properties that may be exhibited as game elements. For example, using the disclosed AI game system, the following elements are associated with the current state of each NPC and/or the information the NPC has. In some embodiments, the information is used to determine the next action of the NPC and includes both internal and external information. As an example implementation of autonomous AI NPCs, the Futurable life simulation game incorporates autonomous AI NPCs that utilize both external and internal information.

External Information

In some embodiments, each autonomous artificial intelligence (AI) non-player character (NPC) keeps sensing its surroundings and adapts to its current information. For example, external information can dynamically change the NPC's action. In some embodiments, different external information will result in a different next action for the character despite the same NPC having the same internal information. For example, in the event an NPC's internal information is unchanged, a change to its external information can result in a new AI planning problem and resulting action.

In some embodiments, the external information is a percept. In some embodiments, a percept includes a visual percept and/or audio percept. For example, an audio percept may include a percept that is heard by a non-player character (NPC). As another example, in Futurable, external information may be referenced with a percept and may include visual and hearing percepts.

In some embodiments, a visual percept is based on what an autonomous artificial intelligence (AI) non-player character (NPC) sees and includes objects and other characters in the game within a certain range of the character. In some embodiments, a visual percept includes human eyes, for example, that may be used to represent a player character in the game.

In some embodiments, a hearing percept is based on what an autonomous artificial intelligence (AI) non-player character (NPC) hears and includes conversations, noise, environmental sounds, etc.

Internal Information

In some embodiments, one or more elements are stored in an information store and used as properties of an autonomous artificial intelligence (AI) non-player character (NPC). In some embodiments, these properties are used for determining the NPC's next action. In some embodiments, the information store is an individual information store for the NPC.

In some embodiments, one or more quotients determine the current state of an autonomous artificial intelligence (AI) non-player character (NPC). In various embodiments, percepts are environmental and situational elements in a game and are used to determine the next action for a situation. In some embodiments, a quotient is a fixed and decisive belief. In some embodiments, each NPC has one or more quotient properties. Example quotients include physical quotient (PQ), intelligence quotient (IQ), and social quotient (SQ). In some embodiments, a universal quotient (UQ) is an overall quotient state of an NPC. In some embodiments, each NPC has the four quotients PQ, IQ, SQ, and UQ. In some embodiments, a quotient can change over time based on experiences and the corresponding belief is updated.

In some embodiments, physical quotient (PQ) is the strength of a character and determines movement, hunger, tiredness, and other appropriate properties. In some embodiments, in the event a character has a PQ of zero, the character is dead or will die. In some embodiments, PQ can be increased by eating, resting, and/or sleeping.

In some embodiments, intelligence quotient (IQ) is an overall intelligence of a character. In some embodiments, IQ utilizes standardized measurements for intelligence. In some embodiments, a character can increase her or his IQ scores by studying.

In some embodiments, social quotient (SQ) is an index of relativeness among characters and represents the level of sociality for a character.

In some embodiments, a universal quotient (UQ) is the total index of all the quotients and may be used to refer to the overall score of a character. In some embodiments, the purpose of the game is to maximize the UQ for the player agent.

Example Benefits

In some embodiments, a computer-based game using a scalable framework for autonomous artificial intelligence (AI) characters includes many benefits for players. For example, a player can influence all non-player characters (NPCs) since each NPC is an autonomous AI character. A player can also talk to and interrupt an NPC. The interaction can change the next action performed by the NPC. Since all NPCs are autonomous AI characters, players experience different situations each time they play the game. For example, in some embodiments, all characters are automatic and environmentally adaptive so players can experience a different situation for each trial of the game played.

In some embodiments, a game using a scalable framework for autonomous artificial intelligence (AI) characters includes many benefits for developers. For example, developers can easily change initial AI circumstances and/or conditions for actions. In some embodiments, a domain and initial problem specification results in the initial plan and next actions for each AI non-player character (NPC). In some embodiments, the initial plan is the foundation for the next action of an NPC. In various embodiments, it is easier to create new actions despite a changing and dynamic game environment when using the disclosed AI framework. For example, all predictable changes in a game may be given a code and/or enumerated. In some embodiments, each predictable change corresponds to an intention of the game developers. In some embodiments, developers can make status conditions and/or actions for all intended and/or unintended situations.

Figure 21:
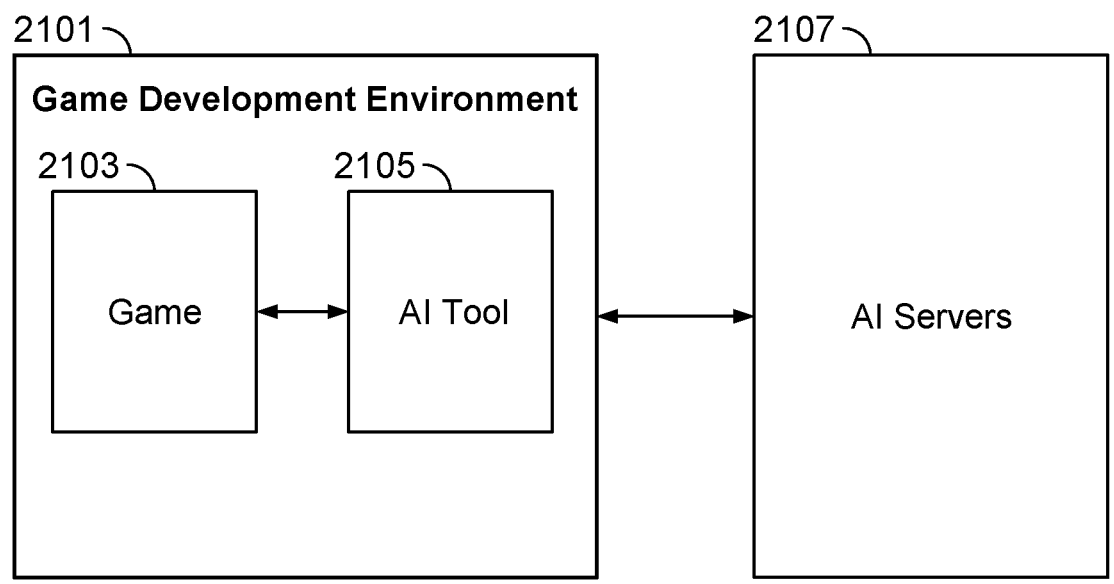
FIG. 21 is a block diagram illustrating an embodiment of a development platform for adding deep learning based artificial intelligence (AI) control.

FIG. 21 is a block diagram illustrating an embodiment of a development platform for adding deep learning based artificial intelligence (AI) control. The development platform of FIG. 21 includes game development environment (GDE) 2101 and AI servers 2107. GDE 2101 includes game 2103 being developed within GDE 2101 and AI tool 2105 used to add AI control for in-game characters. In various embodiments, GDE 2101 is used to create a three-dimensional game (world) environment for game 2103 and to populate the environment with game objects. AI servers 2107 are used to train a deep neural network (DNN) on one or more AI behaviors specified using AI tool 2105. GDE 2101 and AI servers 2107 may communicate over a network such as the Internet or other appropriate network. AI servers 2107 are one or more servers that provide training data generation and deep learning processing. In some embodiments, AI tool 2105 is installed in GDE 2101 to allow game 2103 to leverage advanced AI behaviors. AI tool 2105 and AI servers 2107 may be provided by a third-party and the AI control and AI engine may be offered as a third-party add-on AI service. In some embodiments, the AI service is a subscription service offered to paid subscribers with limited features for free subscribers. In some embodiments, the ability to train an AI model requires a subscription to the AI add-on service. In various embodiments, free users may utilize the AI service but are required to acknowledge the use of the service to end-users. For example, AI tool 2105 may be a plug-in installed in GDE 2101. Examples of GDE 2101 include, but are not limited to, Unity3D, Epic's Unreal Engine, CryTek's CryENGINE, Amazon's Lumberyard, Valve's Source Engine, and EA's Frostbite. In some embodiments, the AI controlled in-game characters utilize the techniques described with respect to FIGS. 1-20 for autonomous AI characters. In some embodiments, the AI behavior is modeled using a domain-independent and scalable automated planning system using DNNs as described with respect to FIGS. 1-20.

In some embodiments, game developers including programmers and designers utilize game development environment (GDE) 2101 to build a game such as game 2103. Game 2103 includes one or more game scenes where each scene may include one or more game objects. GDE 2101 may be a visual editor and AI tool 2105 may be a visual AI tool to enhance a game scene and its game objects into an AI scene with AI agents and AI non-agents. In some embodiments, the AI agents perform AI behaviors specified using AI tool 2105. In some embodiments, AI tool 2105 includes an application programming interface (API) for interfacing AI logic and a trained deep neural network (DNN) with game 2103. AI tool 2105 sends an encoded and/or compiled set of AI behaviors specified using AI tool 2105 to AI servers 2107. In some embodiments, AI servers 2107 generate training data, perform DNN training, and provide a trained DNN realizing the specified AI behaviors to GDE 2101 and AI tool 2105 for use by the game logic of game 2103. The trained DNN can be used to control multiple aspects of game 2103 including non-player characters (NPCs), a questing system, an automated game master, and event generation, among others.

In some embodiments, the connection between GDE 2101 and AI servers 2107 is a subscription service. For example, a game developer needs an active subscription in order to utilize AI servers 2107 with AI tool 2105, to utilized a trained DNN with game 2103, and/or to perform additional server-side processing (such as national language processing and natural language understanding for conversational AI). AI servers 2107 may confirm the validity of a game developer's subscription before performing additional deep-learning or AI processing including deep-learning training and conversational AI processing. In some embodiments, an active subscription is verified during the life of game 2103 and not only during the development of game 2103 using GDE 2101. For example, in some embodiments, more complex deep learning or AI processing is required by a game and AI servers 2107 are used to perform server-side AI functionality. Prior to using AI servers 2107, an active subscription may be validated.

Figure 22:
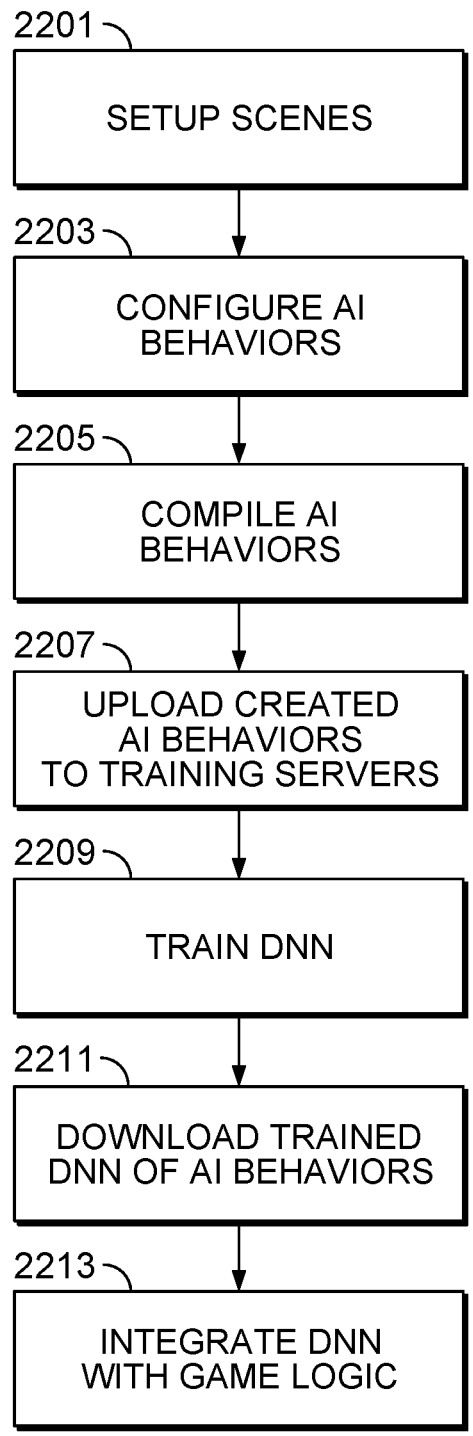
FIG. 22 is a flowchart illustrating an embodiment of a process for adding deep learning based artificial intelligence (AI) control.

FIG. 22 is a flowchart illustrating an embodiment of a process for adding deep learning based artificial intelligence (AI) control. The process of FIG. 22 may be performed using the development platform of FIG. 21 including using a game development environment, an AI tool, and AI servers on a game. In some embodiments, the process utilizes game development environment 2101, AI tool 2105, and AI servers 2107 on game 2103 of FIG. 21.

At 2201, one or more scenes of a game are setup. In some embodiments, a game is developed using a game development environment to create one or more game scenes. The scenes may correspond to a particular level or a room of a game. Each game scene is made up of game objects, which may include non-player characters (NPCs), game objects in the game scene, and one or more players, etc. To add deep learning artificial intelligence (AI) control of in-game characters, such as NPCs, a game scene is enhanced into an AI scene. An AI scene utilizes deep learning based AI to control AI agents. Game objects are mapped to AI entity types. AI entity types may be AI agents that perform AI behaviors or AI non-agents. AI non-agents may inform AI agents and influence the AI behaviors that the AI agents perform. Similarly, an AI game environment is created and associated with the game environment. The AI environment is created to reflect the game environment and its properties from the perspective of the AI logic and can influence the AI behavior of AI agents.

At 2203, one or more AI behaviors are configured. In some embodiments, configuring the AI behaviors involves two steps: configuring the AI behavior model and configuring the training of the model. In various embodiments, to configure the AI behavior model, an AI behavior is specified for one or more AI agents to perform. The relevant AI entity types and properties are linked with the respective AI behavior. Initial beliefs and goals are defined for the created AI behavior. In some embodiments, a set of processing percept rules are defined. These rules may be used to determine how inputs, such as sensor inputs, are mapped to an AI agent's beliefs. An AI behavior can be configured to include one or more AI actions. To influence the game world, the AI actions are mapped to game actions. In some embodiments, an AI agent may have multiple AI behaviors but may only operate under one AI behavior at a time. Once the AI behavior model is configured, the AI training is configured. In some embodiments, the training configuration includes configuring the generation of training data, configuring the encoding of the AI model, and setting up the deep neural network (DNN) parameters.

At 2205, one or more AI behaviors are compiled. The AI behaviors configured at 2203 are compiled and encoded into a format that can be sent for training. In some embodiments, the AI behaviors are compiled to ensure that each configured AI behavior is valid. For example, mappings between game and AI perspectives must be valid and consistent. A successful compilation helps ensure that an AI behavior model can successfully realize the intended AI behavior to control in-game AI agent.

At 2207, created AI behaviors are uploaded to training servers. In some embodiments, one or more AI behaviors successfully configured and compiled are encoded into a transport-compatible format and sent to AI servers for training. In some embodiments, the training servers are AI servers 2107 of FIG. 21. In various embodiments, a created AI behavior is encoded into an encoded AI behavior specification. In some embodiments, the encoded AI behavior specification includes a specification of an AI problem specified using an AI planning language. For example, the AI planning language may include a domain description and a problem description. In some embodiments, the AI planning language is a domain-independent language. In various embodiments, a created AI behavior specifies one or more AI actions, one or more beliefs, one or more percept processing rules, and one or more game actions. In some embodiments, the created AI behavior also specifies one or more goals.

At 2209, a deep neural network (DNN) is trained using the received AI behaviors and training configuration parameters. In some embodiments, the training includes generating training data including training, validation, and test data. The result of training includes a trained DNN modeling a configured AI behavior. In some embodiments, a DNN is created and trained for each AI behavior. In some embodiments, a DNN is trained to model multiple AI behaviors.

At 2211, the trained deep neural network (DNN) of AI behaviors is downloaded. For example, the game development environment and AI tool receive the trained DNN. In some embodiments, the AI model is included with the game. In some embodiments, the game development environment is game development environment 2103 of FIG. 21 and AI tool is AI tool 2105 of FIG. 21. In some embodiments, the trained DNN is one or more trained DNNs. For example, each AI behavior may be modeled using its own corresponding DNN.

At 2213, the deep neural network (DNN) is integrated with the game logic. For example, a game developer integrates the DNN to control in-game characters of the game. In various embodiments, the integration utilizes an application programming interface (API) configured and/or generated by an AI tool of the game development environment. The mapping of AI actions to game actions allows the game characters to perform in-game actions based on inferred AI actions using the trained DNN. In some embodiments, one or more DNNs are integrated for one or more different in-game characters and/or AI behaviors.

Figure 23:
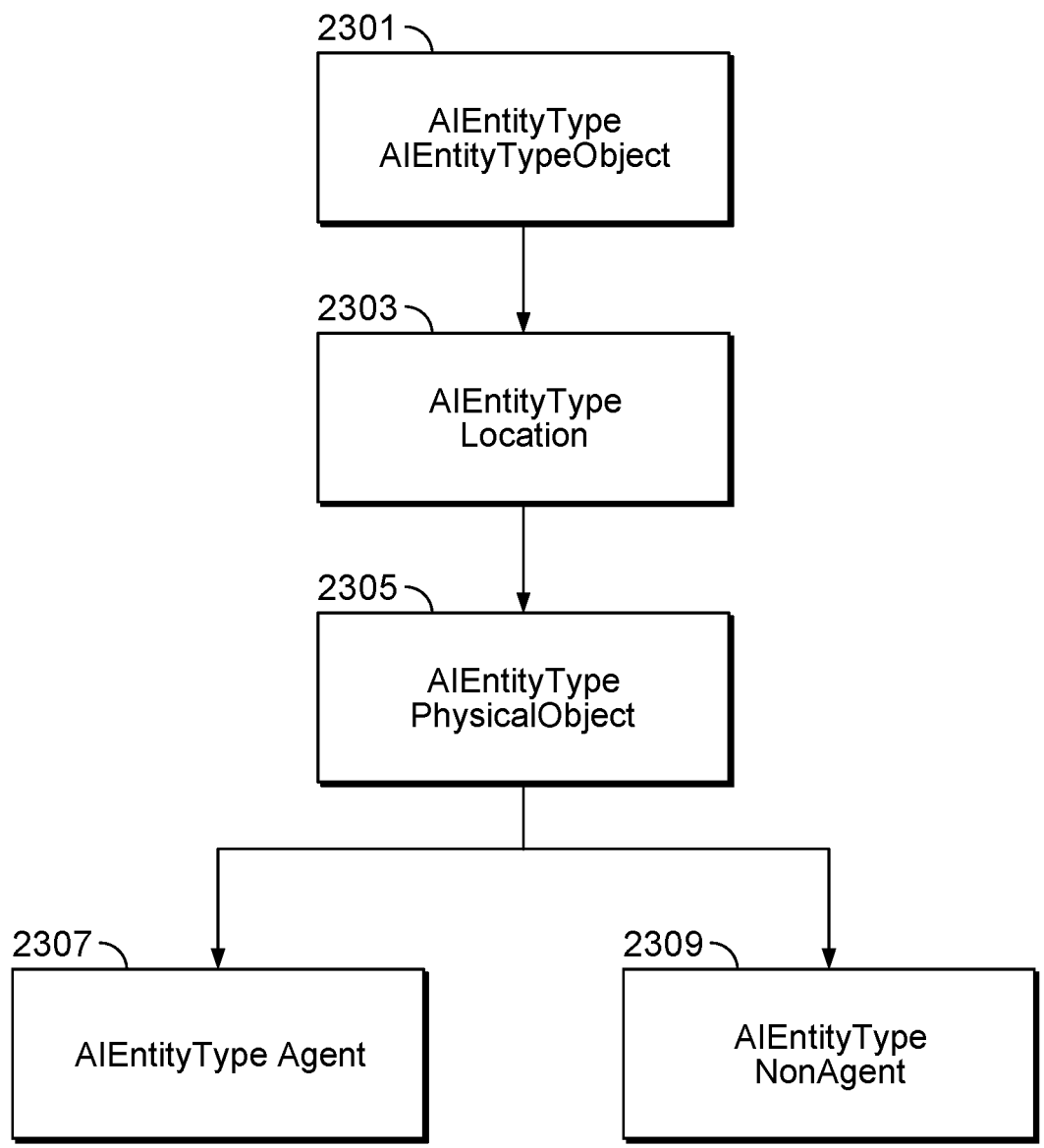
FIG. 23 is a diagram illustrating an embodiment of a class hierarchy for AI entity types.

FIG. 23 is a diagram illustrating an embodiment of a class hierarchy for AI entity types. The class hierarchy of FIG. 23 is used, in part, to bridge a game, such as game 2103 of FIG. 21, with AI logic of using an AI tool, such as AI tool 2105 of FIG. 21. For example, a game scene includes one or more game objects, such as non-player characters, obstacles, players, vehicles, door, rooms, etc. In some embodiments, the game objects that interface with the AI logic are classified using an AI entity type. The AI entity type can be used to construct and semantically align their game representations with their internal representations of the AI tool. Once the AI tool has an internal representation, the objects can be used for AI reasoning and decision making. In some embodiments, the AI entity types of FIG. 23 represent a basic built-in hierarchy of AI entity types from which a game developer can customize and extend. In various embodiments, an AI entity types hierarchy is used to configure an AI behavior for training an AI behavior model using the process of FIG. 22.

In the example, shown, the class hierarchy of FIG. 23 includes root AIEntityType AIEntityTypeObject 2301. AIEntityType Location 2303 inherits from AIEntityType AIEntityTypeObject 2301. AIEntityType PhysicalObject 2305 inherits from AIEntityType Location 2303. Both AIEntityType Agent 2307 and AIEntityType NonAgent 2309 inherit from AIEntityType PhysicalObject 2305. The four classes, Location 2303, PhysicalObject 2305, Agent 2307, or NonAgent 2309, all inherit (directly or indirectly) from root AIEntityTypeObject 2301. In some embodiments, a game developer must subclass or create a new class inheriting from one of the four classes AIEntityType Location 2303, AIEntityType PhysicalObject 2305, AIEntityType Agent 2307, or AIEntityType NonAgent 2309 for each new AI entity type.

In some embodiments, portions of the underlying AI model and knowledge representation may be generated using the AIEntityType inheritance hierarchy. Game objects associated with an AIEntityType are also used to generate part of the AI model and knowledge representation. Further, each AIEntityType can include properties, such as Boolean, numeric, object, and enumerated properties, among others. For example, a JSON enum: {"enum": {"name": "condition", "values": ["sleeping", "eating", "working", "idle"]}} can be used to generate an underlying AI model and knowledge presentation.

Figure 24:
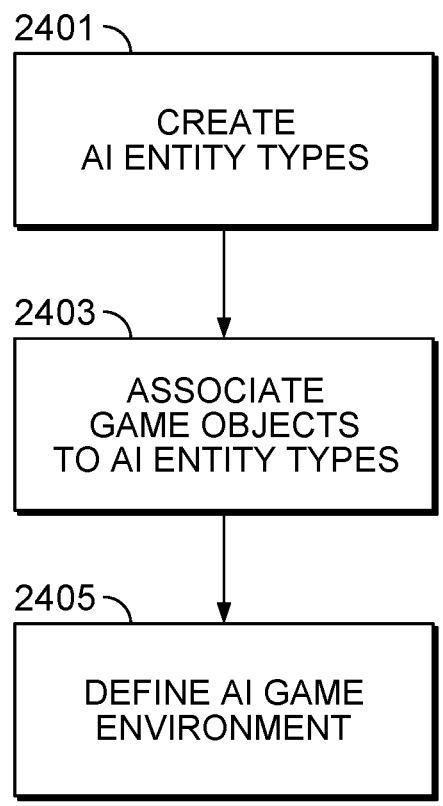
FIG. 24 is a flowchart illustrating an embodiment of a process for setting up scenes with deep learning based artificial intelligence (AI) control.

FIG. 24 is a flowchart illustrating an embodiment of a process for setting up scenes with deep learning based artificial intelligence (AI) control. In some embodiments, the process of FIG. 24 is performed at 2201 of FIG. 22 as part of a process to interface AI logic with game logic. Using the process of FIG. 24, a game scene of a game is enhanced into an AI scene where in-game characters can be controlled by a trained deep neural network. In some embodiments, the process of FIG. 24 is performed using an AI tool such as AI tool 2105 of FIG. 21. In various embodiments, the AI tool is a visual editor that allows a game developer to setup the scene using a graphical user interface (GUI) with limited AI and deep learning expertise.

At 2401, AI entity types are created. In some embodiments, the AI entity types are created using the built-in hierarchy of AI entity types of FIG. 23. The AI entity types may also extend the default built-in types. In various embodiments, AI entity types include both AI agent and AI non-agent types. Non-agent types may inform the AI logic but do not perform AI actions based on an AI behavior. In contrast, the actions of AI agents utilize a trained AI behavior model to determine the appropriate AI action to perform. In various embodiments, each AI entity type can have multiple properties. The properties may be of different types, such as Boolean, numeric, object values, enumeration, etc. In some embodiments, the properties may be functional or non-functional object-properties. For example, a "motherOf" property is typically modeled as a functional object-property and a "friendOf" property is typically modeled as a non-functional object-property.

At 2403, game objects are associated with AI entity types. Using the default and created AI entity types, game objects of a game scene are associated with available AI entity types. For example, an AI-controlled non-playing character (NPC) that is a sentry may be associated with a subclass of an AI agent. Similarly, a human player character may be associated with a subclass of an AI non-agent. Since a human player character informs the AI-controlled NPC, it is associated with an AI entity type to influence the AI logic. However, since the actions of the human player character are controlled by a human user (or in some situations the game logic), the human player character is classified as an AI non-agent and is not AI controlled. The human player character does not perform AI actions based on an AI behavior.

In some embodiments, a script must be specified for each game object associated with an AI entity type. A game object script is used to send and receive data from the AI application programming interface (API) and is used so the AI engine/logic can control the game object and/or receive information about it. In some embodiments, one or more default scripts are made available. The default scripts may include a default script useful for non-agents, a default agent script useful for AI agents, and a default environment script. In some embodiments, the default environment script initializes and updates the AI API and provides values for environment properties. The environment script is useful to represent the game environment so that agents can perceive and interact with the game environment. In various embodiments, additional scripts can be derived from the base scripts.

In some embodiments, sensors are added to game objects as part of associating the game object with an AI entity type. In some embodiments, sensors may only be added to AI agent entities or game objects that have a derived game object script. Examples of sensors include a self sensor (for an agent to perceive itself and its own properties), a visual sensor (for an agent to visually perceive its surrounding), and an auditory sensor (for an agent to perceive its surrounds through hearing). Additional custom sensor-types are possible as well. In various embodiments, each sensor is a game object script and multiple sensors can be attached to the same agent.

At 2405, an AI game environment is defined. For example, properties of the game environment relevant to the AI logic/engine are defined as part of the AI game environment. Environment properties such as the time of day and the current weather can be added to inform the AI logic. In various embodiments, the environment properties may be of different types, such as Boolean, numeric, object, and enumerated properties, among others.

Figure 25:
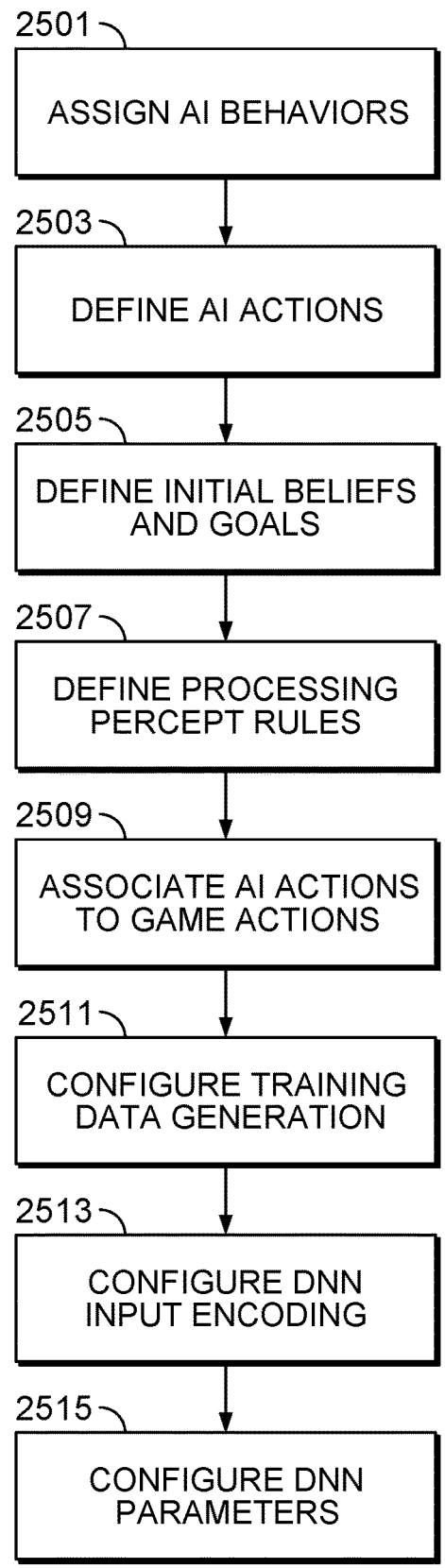
FIG. 25 is a flowchart illustrating an embodiment of a process for configuring AI behaviors for deep learning based artificial intelligence (AI) control.

FIG. 25 is a flowchart illustrating an embodiment of a process for configuring AI behaviors for deep learning based artificial intelligence (AI) control. In some embodiments, the process of FIG. 25 is performed at 2203 of FIG. 22 as part of a process to interface AI logic with game logic. The process of FIG. 25 is used to configure an AI behavior model and to configure the training of the model. In some embodiments, the process of FIG. 25 is performed using an AI tool such as AI tool 2105 of FIG. 21. In various embodiments, the AI tool is a visual editor that allows a game developer to setup the scene using a graphical user interface (GUI). In some embodiments, the visual editor simplifies the configuration and training of AI behaviors. For example, the visual editor is able to display the status of an AI behavior (e.g., not yet fully configured, not yet compiled, ready for training, training in progress, trained, etc.).

At 2501, AI behaviors are assigned. In various embodiments, an AI behavior is assigned by associating an AI behavior to a game object with an AI entity type and properties. For example, AI agents of an AI scene are associated with an AI behavior. New AI behaviors can be added and modified, if desired. For example, in some embodiments, AI behaviors can be duplicated and the duplicated AI behavior can be modified to create a new AI behavior. In various embodiments, each agent is limited to one AI behavior.

In some embodiments, a user selects which AI entity types should be included for AI reasoning by associating an AI behavior with an AI entity type. Based on the selected AI entity types, a user then selects which game objects of an associated AI entity type are included for the AI behavior. In various embodiments, some or all game objects may be excluded. In some embodiments, child AI entity types are excluded when a parent is excluded. In some embodiments, only user created AI entity types may be excluded.

In some embodiments, assigning an AI behavior includes selecting which properties, such as AI entity and environment properties to include. In various embodiments, selecting properties for inclusion include selecting the environment properties of the AI game environment and the properties of the AI entity type to include. In addition, in some embodiments, behavior specific properties may be selected. Behavior specific properties may be limited to the scope of the AI behavior. The selected properties are included in the AI reasoning for the associated AI behavior.

At 2503, AI actions are defined. In various embodiments, AI actions are defined with a unique identifier along with associated parameters, pre-conditions, and/or effects. For example, a unique name (e.g., "open-front-door" or "move-to-land") is assigned to each AI action. In some embodiments, AI actions can be added and/or edited. Once an AI action is added, parameters of the AI action are added, edited, and/or deleted. An AI action can have zero or more parameters. An example of an AI parameter is a start position parameter. In addition to parameters, in some embodiments, pre-conditions and effects of the AI action may be added, edited, and/or deleted. Effects may include regular and conditional effects.

In some embodiments, an AI tool includes an expression editor such as a visual expression editor for assigning and modifying precondition and effects of AI actions. The parameters may reference the preconditions and effects. Preconditions and conditions of conditional effects of AI actions may evaluate to true or false (e.g., Boolean, numeric, or object-comparison, etc.), while effects of AI actions can be Boolean, numeric, and/or object assignments.

In various embodiments, instantiated/grounded AI actions are selected for execution. For example, AI actions whose parameters and all references to those parameters are consistently instantiated with values are selected for execution. In various embodiments, an AI Action can be scheduled for execution by the AI logic (i.e., by the deep neural network (DNN) based agent-controller), if and only if its preconditions are true (satisfied) in the current belief state of the agent.

At 2505, initial beliefs and goals are defined. The initial values for an agent using the given AI belief are configured. A user can also set a goal for the specified agent. For example, a goal can be specified using a conjunction (and-relation) of conditions that should be true. If the goal formula is satisfied, the agent will believe that it has achieved its goal. Until the goal is satisfied, the AI logic/engine will continue to schedule AI actions for an agent based on the configured AI behavior in an attempt to bring the agent closer to achieving its goal. In various embodiments, an agent goal is achieved based on evaluating the goal formula from the perspective of the agent's belief, which may differ from the real game environment. In various embodiments, a user can add additional initial beliefs from properties of an AI entity type, behavior specific properties, and environment properties that are included in the particular AI behavior. For example, the environmental property "temperature" can be added as a belief. The initial values of each of the added properties can be modified. Goal conditions can be added, edited, and/or deleted. In order to train a deep neural network (DNN), at least one goal-condition must be configured for the AI behavior.

At 2507, processing percept rules are defined. For example, rules may be created and edited for processing initial, regular, and action-outcome percepts. In various embodiments, the processing percept rules define how sensory inputs are mapped to beliefs for a particular agent governed by the AI behavior. The beliefs are updated based on the sensory input. In various embodiments, percepts can originate from the environment (environment percepts), the agent (self percepts), visual sensors (visual percepts), auditory sensors (auditory percepts), and other custom sensors attached to an agent (custom sensory percepts). In various embodiments, the percepts may be initial, regular, action-outcome percepts, and/or another appropriate percept. Initial percepts are percepts related to the initial state of an AI entity in an AI scene. Initial percepts may be received once by all agents at the time a new AI scene is started. Regular percepts are percepts related to the state of AI entities as the AI scene is updated (i.e., as game time progresses). Regular percepts follow the initial percept. Action-outcome percepts are percepts related to the result of performing an AI action in the game environment.

In various embodiments, different percepts are provided based on the type of percept and using the associated attached game object script. For example, environment percepts are provided by querying each environment property defined in the current AI scene. In some embodiments, sensory percepts are provided by looping through each sensor attached to the agent and for each sensor, looping through each AI entity to determine if that AI entity is sensed. In various embodiments, an application programming interface (API) of an AI tool is used to query the game objects. In some embodiments, action-outcome percepts are pushed to the AI logic by the AI API rather than queried by the AI API. Action-outcome percepts may be used to tell the AI of agents what the outcome of a specific, previously scheduled action was. For example, in the event an AI agent sends an "Open Door" AI action to the game environment, there are multiple possible outcomes with differing results (successful or not). For example, a locked door may not open, an unlocked door that is jammed may not open, but an unlocked and unobstructed door will likely open. An action-outcome percept provides a way to notify an AI agent about the result of performing a requested AI action.

In various embodiments, an AI agent translates the received percepts to beliefs by executing the defined percept processing rules. Similar to an AI action, percept processing rules may include preconditions and effects. Effects may include conditional effects. A rule precondition defines the conditions a particular percept will be processed by a given rule. A rule effect defines the beliefs that will be injected into the beliefs of an agent for the particular AI behavior. Unlike an AI action, a user can define what happens in the event the conditions of a conditional effect are not met. In some embodiments, percept processing rules are ordered based on the order they are used to process an incoming percept.

At 2509, AI actions are associated with game actions. For example, a mapping from AI actions to sequences of game actions is created. Game actions are actions implemented in the game logic (or game code). AI actions are sent by the AI logic via an AI application programming interface (API) to the game logic using the specified action mappings. In the event an AI action is scheduled for execution by the AI of an agent, the associated game actions are executed. In some embodiments, the game actions are organized as a sequence of game actions. In some embodiments, the AI actions are provided by the agent to a ReceiveActionFromAI function of its own AIEntityAgent (or derived) game object script. The implementation of the ReceiveActionFromAI function calls the game code (depending on the game logic). Results can then be sent back as action-outcome percepts via the AI API to the AI of the agents.

At 2511, training data generation is configured. For example, deep learning training data generation is setup to define how training data is generated. The configuration may be used to configure how training on an AI server is performed to create a deep neural network (DNN). In various embodiments, the training data is generated by one or more AI servers such as AI servers 2107 of FIG. 21. This is especially helpful and greatly speeds up development time since typically no training data is available for newly developed games. In some embodiments, the training data generation is specified using a data generation configuration specification.

In some embodiments, an AI tool automatically calculates based on the previous steps the minimum and maximum number of possible training data points. A user may select a desired value from the calculated range to determine how many training data points to generate for deep learning training of the DNN. A user can determine whether each initial belief should be used to generate training data. If an initial belief is used for generating training data, a user can determine whether or not to loop over the possible property values and/or to loop over the possible parameters of the property when generating training data points. In some embodiments, a user can specify a set of values to loop through. In the case of object properties, an AI server loops through all possible object-values based on the range of the property (if the user wants to loop through the property-values) or the Cartesian-product of the domains of the parameters (if the user wants to loop through the parameter-values). In some embodiments, the configuration includes the ability to define a sequence of AI actions that can be executed automatically by the AI of agents for a particular AI behavior before each step and also for generating the final training data points.

At 2513, the encoding for the input to a deep neural network (DNN) is configured. For example, a configuration defines how to encode the training data points for the DNN. Since a DNN cannot directly read an AI agent's beliefs, the beliefs (e.g., belief sets or planning problems) are encoded for the DNN. This encoding format may be specified by the user, for example, using a visual editor. In some embodiments, the encoding in an image reflecting the planning problem. The user can define the size of a 2D or N-dimensional image that will be provided as input to the DNN.

In some embodiments, a user specifies for each cell (or pixel of an encoded image) a property defined within the given AI behavior whose value has to be encoded. For a rectangular encoding scheme, the encoded value defines the pixel value of each pixel in the given cell of the image. In various embodiments, a user can provide an immediate pixel value, bypassing any encoding. However, the cell-pixel-value no longer depends on the belief-state and will be constant over all DNN-inputs.

At 2515, deep neural network (DNN) parameters are configured. In some embodiments, the configured parameters are used to adjust AI server settings and include solver settings and training settings. Solver settings are used to configure an AI server-side solver that provides the reference behavior for the deep learning training of the AI behavior. The training settings are used to adjust various training related settings including the structure of the DNN (e.g., the number of layers, neurons, connectivity, etc.) and hyper-parameters. In some embodiments, the configuration is specified using a deep neural network configuration specification.

Figure 26:
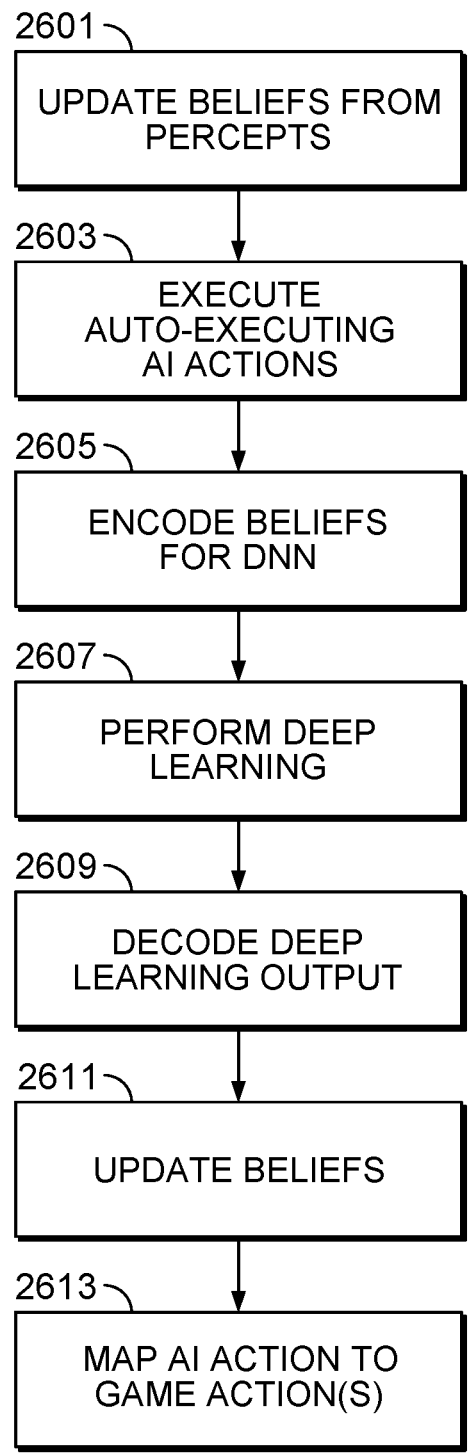
FIG. 26 is a flowchart illustrating an embodiment of a process for performing deep learning based artificial intelligence (AI) control.

FIG. 26 is a flowchart illustrating an embodiment of a process for performing deep learning based artificial intelligence (AI) control. The process of FIG. 26 may be performed by a game such as game 2103 developed using game development environment 2101, AI tool 2105, and AI servers 2107 of FIG. 21 for an AI agent such as a non-player character (NPC). In some embodiments, the process is performed using a deep neural network (DNN) trained by AI servers such as AI servers 2107 of FIG. 21 using the processes of FIGS. 22, 24, and/or 25.

In various embodiments, an in-game character utilizing AI control is an AI agent. An AI agent includes agent memory (or an agent memory store) that stores the current belief-state of the agent. For example, each AI agent in the game can have its own agent memory and thus its own belief-state. Sensors perceive the state of the environment and provide it to the AI agent for decision making using a trained deep neural network (DNN). The AI agent responds with an AI action selected during decision-making that corresponds to executing one or more game actions in the game environment. In some embodiments, effectors map the AI actions to game actions. Although AI control can be applied to in-game characters, it is also applicable to a questing system, an automated game master, and event generation, among others.

At 2601, an AI agent's beliefs are updated from percepts. In some embodiments, the beliefs are stored in the AI agent's personalized agent memory (or memory store). In some embodiments, an agent's personal memory is implemented using a memory graph data structure. In various embodiments, the percepts are provided to an AI agent via an AI application programming interface (API). For example, an AI API provides percept information via a JSON percept to a particular AI agent. In various embodiments, percepts can originate from the environment (environment percepts), the agent (self percepts), visual sensors (visual percepts), auditory sensors (auditory percepts), and other custom sensors attached to an agent (custom sensory percepts). The received percepts are processed into new beliefs and are used to update the belief state of the agent.

At 2603, auto-executing AI actions are executed. In the event the AI agent's AI behavior includes auto-executing AI actions, the auto-executing AI actions are executed in sequence over the current belief-state (memory) of the AI agent. New beliefs may update the belief state of the AI agent as a result of the effects of the performed AI actions.

At 2605, the AI agent's current beliefs are encoded for input to a deep neural network (DNN). For example, the current up-to-date belief state is read from agent memory and encoded for input to a compatible DNN modeling the configured AI behavior. The encoded beliefs are provided as input to a DNN. In some embodiments, the input is encoded as a 2D or N-dimensional image.

At 2607, deep learning is performed. For example, a deep neural network (DNN) performs inference on the encoded beliefs and responds with an encoded AI action. The encoded AI action is provided to a decoder.

At 2609, the output of deep learning is decoded. The encoded AI action provided by the deep neural network (DNN) at 2607 is decoded into a proper, parameterized AI action. In some embodiments, the AI action is represented as an instance of an AI action object.

At 2611, an AI agent's beliefs are updated by executing the decoded, parameterized AI action over the current belief-state (memory) of the agent. New beliefs may update the belief state of the AI agent as a result of the effects of the performed AI actions. In some embodiments, the execution of the AI action is a simulated execution since the corresponding game world actions have not been performed yet. In the event the execution fails or is interrupted, action-outcome percepts provide enough information for the AI agent to realize whether the AI action executed in the game environment is successful.

At 2613, the decoded, parameterized AI action is mapped to one or more game actions. For example, game actions corresponding to the AI action are received via an AI application programming interface (API) and translated into function calls (or similar game code) in the game. The function calls result in game world execution and may yield further percepts, such as action-outcome or regular percepts, for the AI agent and/or other AI agents. In various embodiments, one or more game actions are executed by game logic. The game actions correspond to AI behavior for an in-game AI-controlled character.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an encoded artificial intelligence behavior specification;
receiving a data generation configuration specification;
receiving a deep neural network configuration specification;
generating automatically for non-player character agents of a game, a training data set based on the data generation configuration specification;
training an artificial intelligence behavior deep neural network using at least a subset of the generated training data set, wherein the artificial intelligence behavior deep neural network conforms to the deep neural network configuration specification;
receiving associations between the non-player character agents and artificial intelligence entity types belonging to a class hierarchy of artificial intelligence entity types;
receiving associations between the artificial intelligence entity types of the non-player character agents and artificial intelligence behaviors enabled by the artificial intelligence behavior deep neural network, wherein at least one of the non-player character agents inherits at least one of the artificial intelligence behaviors based on the class hierarchy of the corresponding artificial intelligence entity type;
receiving a set of precept rules that are used to map sensor inputs to beliefs the non-player character agents that are inputs to the artificial intelligence behavior deep neural network;
and
integrating the trained artificial intelligence behavior deep neural network with game logic of the game, wherein the integration provides the artificial intelligence behaviors to the non-player character agents based on the associated artificial intelligence entity types and the beliefs of the non-player character agents, wherein at least a first portion of the non-player character agents has a different specified behavior goal associated with the artificial intelligence behaviors as compared to a second portion of the non-player character agents.

2. The method of claim 1, wherein the artificial intelligence behavior deep neural network is a convolutional deep neural network.

3. The method of claim 1, wherein the encoded artificial intelligence behavior specification includes a specification of an artificial intelligence problem specified using an artificial intelligence planning language.

4. The method of claim 1, wherein the trained artificial intelligence behavior deep neural network is provided to an artificial intelligence tool of a game development environment.

5. The method of claim 4, wherein the artificial intelligence tool is a visual editor.

6. The method of claim 4, wherein the artificial intelligence tool is a plug-in installed in the development environment.

7. The method of claim 4, wherein the game development environment is used to model objects in a three-dimensional game environment.

8. The method of claim 1, wherein generating the training data set based on the data generation configuration specification includes generating training, validation, and testing data values.

9. The method of claim 1, wherein the deep neural network configuration specification specifies a number of layers, a model size, an input size, or an output size.

10. The method of claim 1, wherein the encoded artificial intelligence behavior specification is associated with the non-player character agents for performing artificial intelligence actions.

11. The method of claim 10, wherein the artificial intelligence actions are mapped to one or more game actions.

12. The method of claim 10, wherein at least one of the non-player character agents has a personal agent memory for storing a belief state of the at least one of the non-player character agents.

13. The method of claim 10, wherein at least one of the non-player character agents has one or more attached sensors.

14. The method of claim 13, wherein the one or more attached sensors includes a self sensor, a visual sensor, an auditory sensor, or a custom sensor.

15. The method of claim 13, wherein the one or more attached sensors are configured to receive percepts.

16. The method of claim 15, wherein the percepts include environment, self, visual, or auditory percepts.

17. The method of claim 1, wherein an artificial intelligence behavior of the encoded artificial intelligence behavior specification is defined by one or more artificial intelligence actions, one or more beliefs, one or more percept processing rules, and one or more game actions.

18. The method of claim 17, wherein the artificial intelligence behavior is further defined by a goal condition.

19. A system, comprising:
a processor; and
a memory coupled with the processor, wherein the memory is configured to provide the processor with instructions which when executed cause the processor to:
receive an encoded artificial intelligence behavior specification;
receive a data generation configuration specification;
receive a deep neural network configuration specification;
generate automatically for non-player character agents of a game, a training data set based on the data generation configuration specification;
train an artificial intelligence behavior deep neural network using at least a subset of the generated training data set, wherein the artificial intelligence behavior deep neural network conforms to the deep neural network configuration specification;
receive associations between the non-player character agents and artificial intelligence entity types belonging to a class hierarchy of artificial intelligence entity types;
receive associations between the artificial intelligence entity types of the non-player character agents and artificial intelligence behaviors enabled by the artificial intelligence behavior deep neural network, wherein at least one of the non-player character agents inherits at least one of the artificial intelligence behaviors based on the class hierarchy of the corresponding artificial intelligence entity type;
receive a set of precept rules that are used to map sensor inputs to beliefs the non-player character agents that are inputs to the artificial intelligence behavior deep neural network;
and
integrate the trained artificial intelligence behavior deep neural network with game logic of the game, wherein the integration provides the artificial intelligence behaviors to the non-player character agents based on the associated artificial intelligence entity types and the beliefs of the non-player character agents, wherein at least a first portion of the non-player character agents has a different specified behavior goal associated with the artificial intelligence behaviors as compared to a second portion of the non-player character agents.

20. A computer program product, the computer program product being embodied in a non-transitory computer readable storage medium and comprising computer instructions for:
receiving an encoded artificial intelligence behavior specification;
receiving a data generation configuration specification;
receiving a deep neural network configuration specification;
generating automatically for non-player character agents of a game, a training data set based on the data generation configuration specification;
training an artificial intelligence behavior deep neural network using at least a subset of the generated training data set, wherein the artificial intelligence behavior deep neural network conforms to the deep neural network configuration specification;
receiving associations between the non-player character agents and artificial intelligence entity types belonging to a class hierarchy of artificial intelligence entity types;
receiving associations between the artificial intelligence entity types of the non-player character agents and artificial intelligence behaviors enabled by the artificial intelligence behavior deep neural network, wherein at least one of the non-player character agents inherits at least one of the artificial intelligence behaviors based on the class hierarchy of the corresponding artificial intelligence entity type;
and
receiving a set of precept rules that are used to map sensor inputs to beliefs the non-player character agents that are inputs to the artificial intelligence behavior deep neural network;
integrating the trained artificial intelligence behavior deep neural network with game logic of the game, wherein the integration provides the artificial intelligence behaviors to the non-player character agents based on the associated artificial intelligence entity types and the beliefs of the non-player character agents, wherein at least a first portion of the non-player character agents has a different specified behavior goal associated with the artificial intelligence behaviors as compared to a second portion of the non-player character agents.

* * * * *

UNITED STATES PATENT AND TRADEMARK OFFICE
CERTIFICATE OF CORRECTION

PATENT NO. : 11,763,143 B2  
APPLICATION NO. : 16/212161  
DATED : September 19, 2023  
INVENTOR(S) : Dániel László Kovács et al.

Page 1 of 1

It is certified that error appears in the above-identified patent and that said Letters Patent is hereby corrected as shown below:

On the Title Page

Item (73) assignee, address, insert --Seoul (KR)--.

In the Specification

In Column 5, Line(s) 21, after "separate", delete "of" and insert --from--, therefor.

In Column 20, Line(s) 19, after "1019", insert --.--.

In Column 25, Line(s) 32, after "and", delete "a" and insert --an--, therefor.

In Column 26, Line(s) 22, delete "another" and insert --other--, therefor.

In Column 39, Line(s) 37, delete "utilized" and insert --utilize--, therefor.

In Column 43, Line(s) 53, delete "include" and insert --includes--, therefor.

In Column 46, Line(s) 23, delete "reflecting" and insert --reflects--, therefor.

In the Claims

In Column 50, Line(s) 48, Claim 20, delete "and".

In Column 50, Line(s) 52, Claim 20, after "network;", insert --and--.

Signed and Sealed this  
Seventh Day of November, 2023

Katherine Kelly Vidal  
*Director of the United States Patent and Trademark Office*